United States Patent
Shibayama et al.

(10) Patent No.: US 11,635,603 B2
(45) Date of Patent: Apr. 25, 2023

(54) VARIABLE POWER OPTICAL SYSTEM, OPTICAL APPARATUS AND MANUFACTURING METHOD FOR VARIABLE POWER OPTICAL SYSTEM

(71) Applicant: Nikon Corporation, Tokyo (JP)

(72) Inventors: Atsushi Shibayama, Tokyo (JP); Kosuke Machida, Tokyo (JP)

(73) Assignee: Nikon Corporation, Tokyo (JP)

(*) Notice: Subject to any disclaimer, the term of this patent is extended or adjusted under 35 U.S.C. 154(b) by 305 days.

(21) Appl. No.: 16/995,196

(22) Filed: Aug. 17, 2020

(65) Prior Publication Data
US 2020/0379225 A1    Dec. 3, 2020

Related U.S. Application Data

(60) Division of application No. 15/004,931, filed on Jan. 23, 2016, now abandoned, which is a continuation of
(Continued)

(30) Foreign Application Priority Data

| Jul. 29, 2013 | (JP) | 2013-157106 |
| Jul. 29, 2013 | (JP) | 2013-157108 |
| Jul. 29, 2013 | (JP) | 2013-157109 |

(51) Int. Cl.
*G02B 15/14* (2006.01)
*G02B 15/22* (2006.01)
(Continued)

(52) U.S. Cl.
CPC ........... *G02B 15/22* (2013.01); *G02B 13/009* (2013.01); *G02B 15/1451* (2019.08); *G02B 15/1461* (2019.08); *G02B 15/173* (2013.01)

(58) Field of Classification Search
CPC ........ G02B 15/1451; G02B 15/145125; G02B 15/145109; G02B 15/1461; G02B 15/22; G02B 13/009
(Continued)

(56) References Cited

U.S. PATENT DOCUMENTS 5,499,141 A     3/1996 Ohtake
6,392,816 B1 *  5/2002 Hamano ........ G02B 15/145121
                                                        359/557
(Continued)

FOREIGN PATENT DOCUMENTS

EP     0562964 A1    9/1993
JP     10-48518 A    2/1998
(Continued)

OTHER PUBLICATIONS

Office Action dated Feb. 28, 2020, in Chinese Patent Application No. 201810239098.4.
(Continued)

*Primary Examiner* — Mahidere S Sahle
(74) *Attorney, Agent, or Firm* — Potomac Law Group, PLLC

(57) ABSTRACT

Provided is a variable power optical system (ZL) used for an optical apparatus such as a camera (1). The variable power optical system (ZL) includes, in order from an object: a first lens group having positive refractive power; a second lens group having negative refractive power; a third lens group having negative refractive power; a fourth lens group having positive refractive power; and a fifth lens group. Upon zooming from a wide-angle end state to a telephoto end state, a distance between each of the lens groups changes, and upon focusing from an object at infinity to an object at a close distance, the third lens group moves in the optical axis direction.

18 Claims, 57 Drawing Sheets

Related U.S. Application Data application No. PCT/JP2014/003955, filed on Jul. 28, 2014.

(51) Int. Cl.
*G02B 15/173* (2006.01)
*G02B 13/00* (2006.01)

(58) Field of Classification Search
USPC ................ 359/683–688, 694–706, 822–826
See application file for complete search history.

(56) References Cited

U.S. PATENT DOCUMENTS

| | | | |
|---|---|---|---|
| 8,432,621 B2* | 4/2013 | Imamura | G02B 15/145125 |
| | | | 359/686 |
| 2007/0070521 A1 | 3/2007 | Hayakawa | |
| 2009/0251781 A1 | 10/2009 | Adachi et al. | |
| 2013/0033759 A1 | 2/2013 | Takano et al. | |
| 2013/0107089 A1 | 5/2013 | Hatada | |
| 2013/0201565 A1 | 8/2013 | Yamanaka | |
| 2013/0301141 A1 | 11/2013 | Ryu | |
| 2013/0342716 A1 | 12/2013 | Yamamoto et al. | |

FOREIGN PATENT DOCUMENTS

| | | |
|---|---|---|
| JP | 2004-29617 A | 1/2004 |
| JP | 2007-93975 A | 4/2007 |
| JP | 2011-90099 A | 5/2009 |
| JP | 2009-122620 A | 6/2009 |
| JP | 2009-265652 A | 11/2009 |
| JP | 2011-123514 A | 6/2011 |
| JP | 2011-123515 A | 6/2011 |
| JP | 2011-141548 A | 7/2011 |
| JP | 2012-163914 A | 8/2012 |
| JP | 2012-173657 A | 9/2012 |
| JP | 2012-181436 A | 9/2012 |
| JP | 2013-037144 A | 2/2013 |
| JP | 2013-097184 A | 5/2013 |
| JP | 2013-160997 A | 8/2013 |
| JP | 2013-195748 A | 9/2013 |
| WO | WO 2012/121014 A1 | 9/2012 |

OTHER PUBLICATIONS

Office Action dated Sep. 10, 2019, in Japanese Patent Application No. 2018-133128.
Office Action dated Jun. 7, 2019, in Japanese Patent Application No. 2017-204936.
Office Action dated Apr. 26, 2019, in Japanese Patent Application No. 2018-133128.
Office Action dated Apr. 9, 2019, in Japanese Patent Application No. 2017-204935.
Examination Report dated Jan. 9, 2019, in Indian Patent Application No. 201617004238.
Office Action dated Sep. 14, 2018, in Japanese Patent Application No. 2017-204936.
Office Action dated Aug. 2, 2018, in Japanese Patent Application No. 2017-204935.
Office Action dated Sep. 26, 2017, in Japanese Patent Application No. 2013-157106.
Office Action dated May 11, 2017, in Japanese Patent Application No. 2013-157109.
Office Action dated May 11, 2017, in Japanese Patent Application No. 2013-157108.
Office Action dated May 11, 2017, in Japanese Patent Application No. 2013-157106.
English translation of International Preliminary Report on Patentability from International Patent Application No. PCT/JP2014/003955, dated Feb. 2, 2016.
International Search Report from International Patent Application No. PCT/JP2014/003955, dated Sep. 30, 2014.
Office Action dated Sep. 15, 2020, in Chinese Patent Application No. 201810239098.4.

* cited by examiner

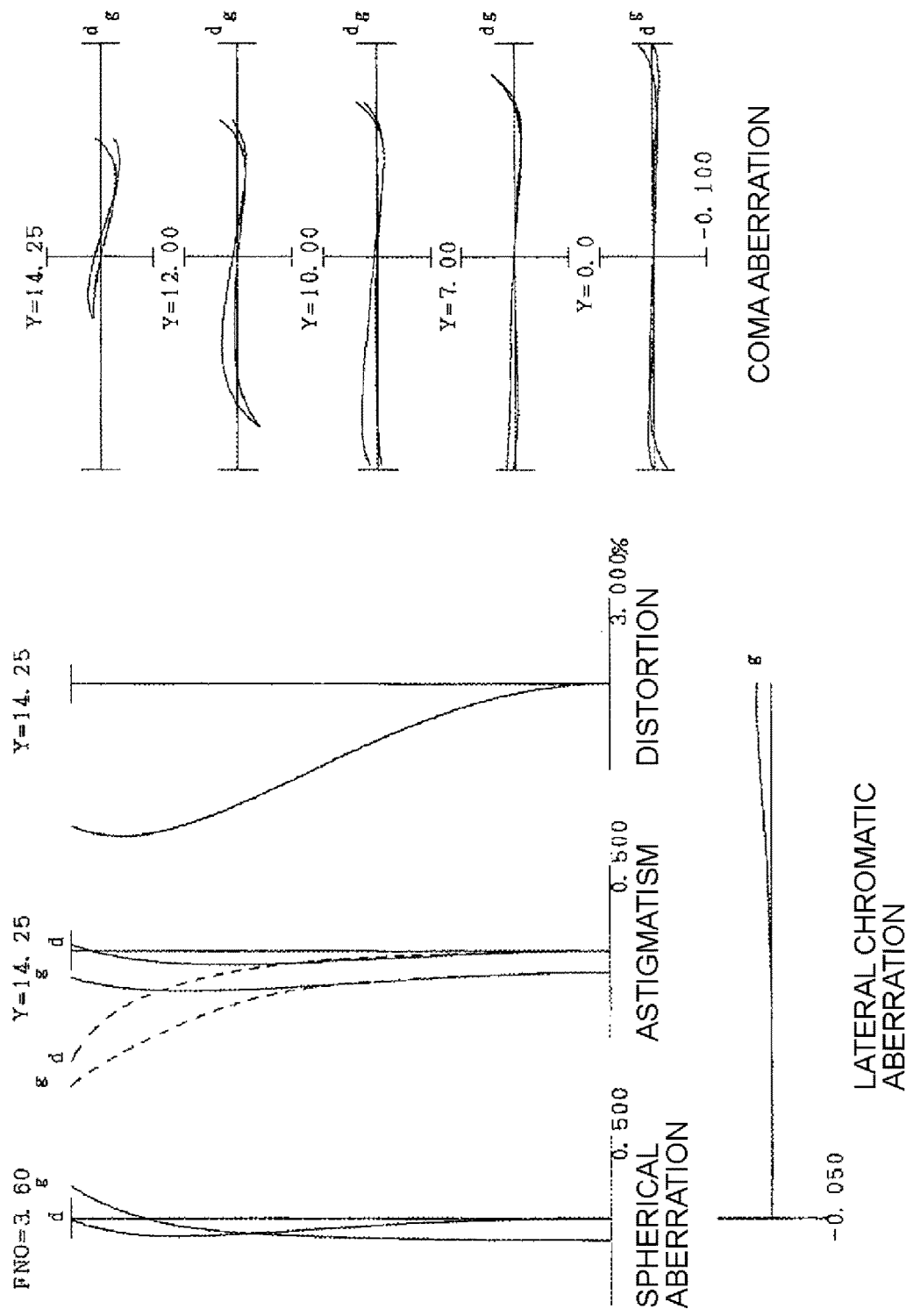

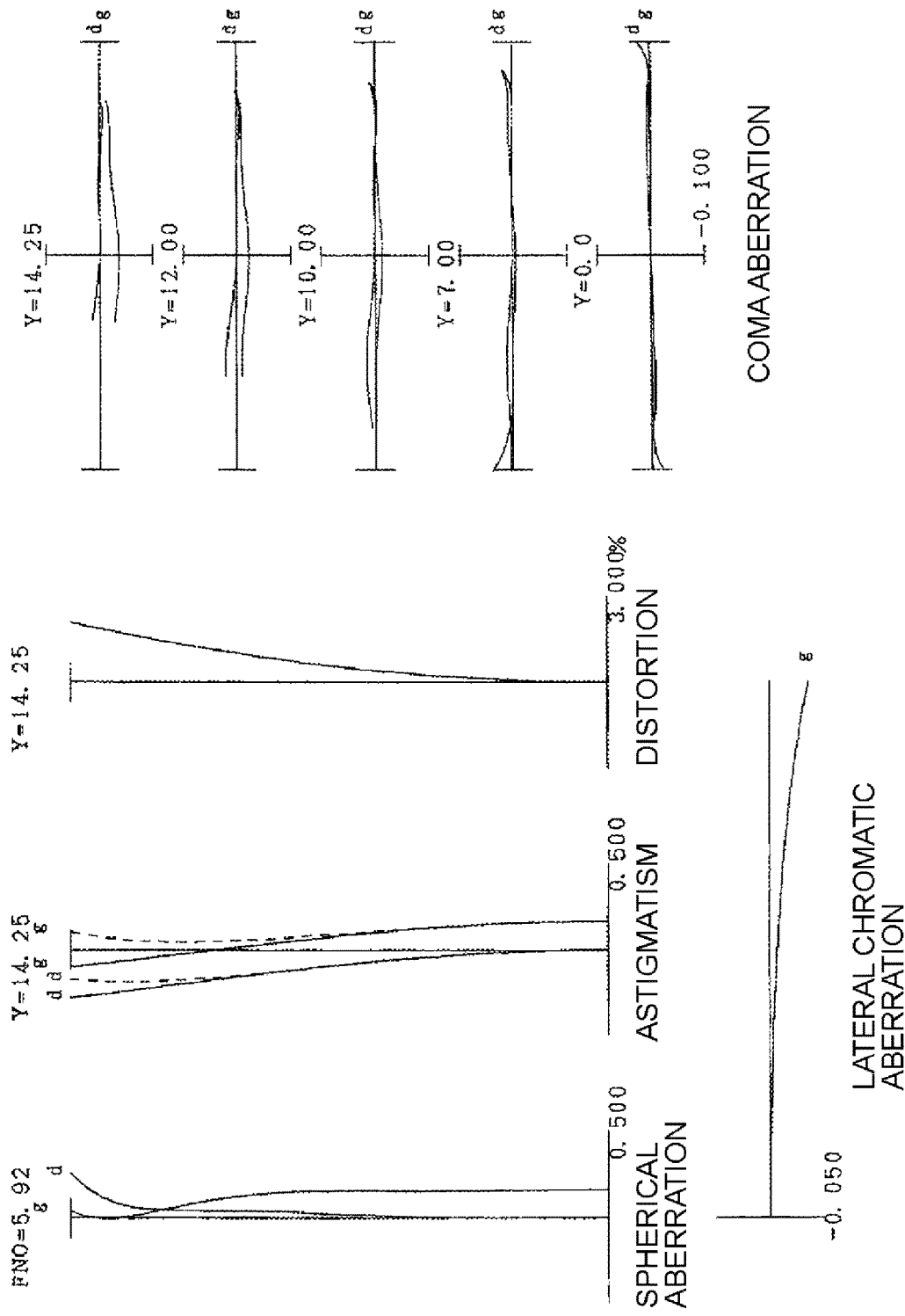

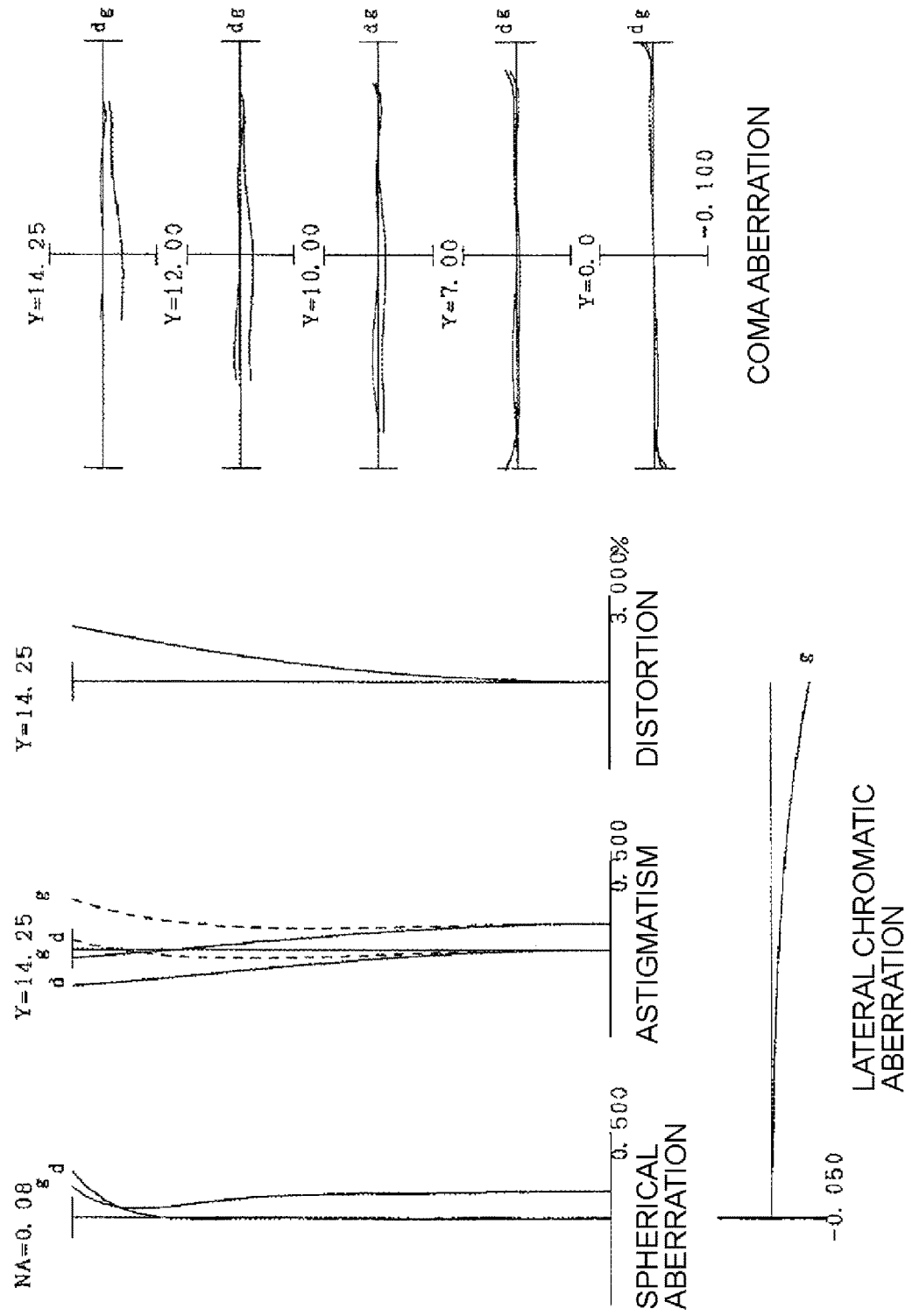

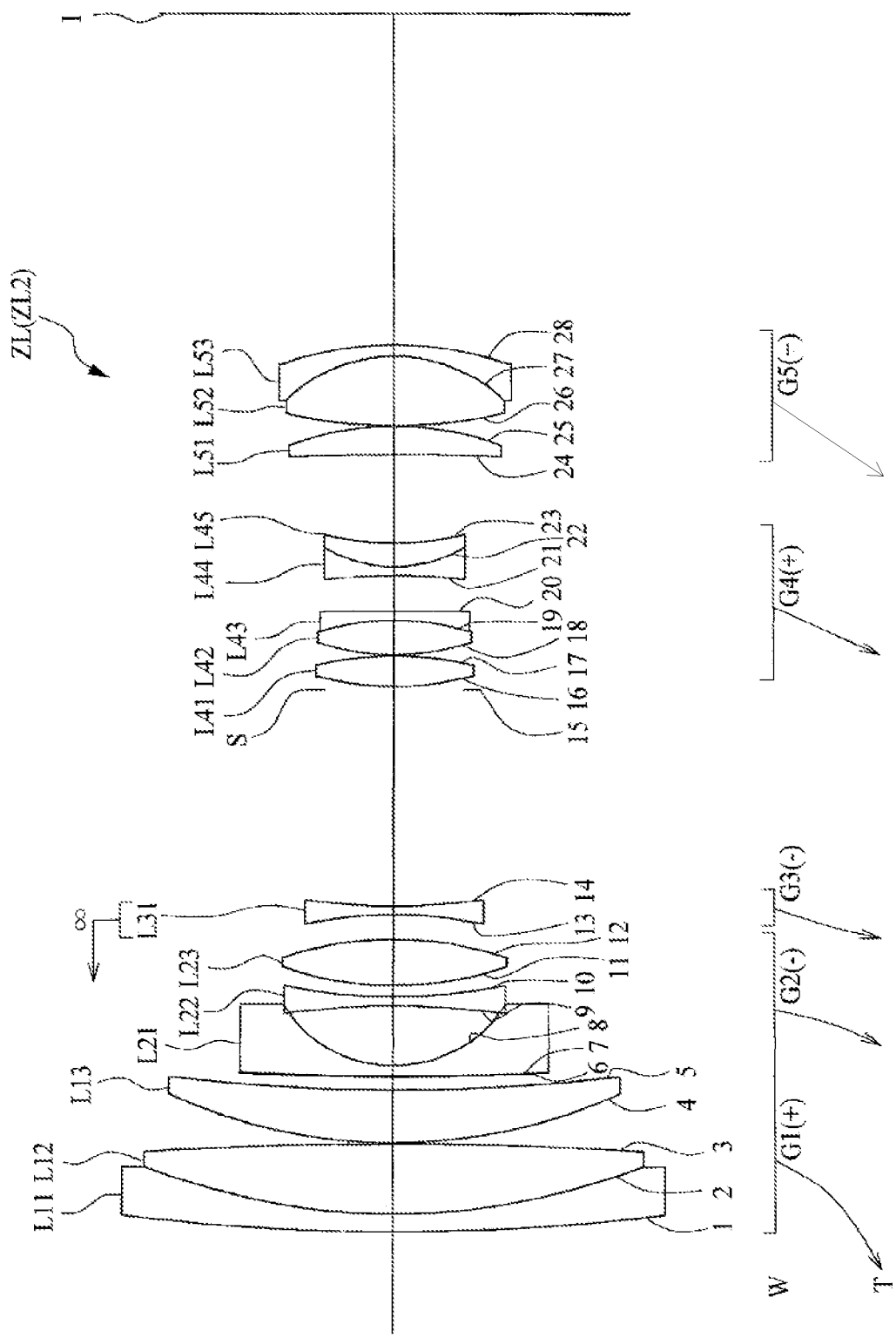

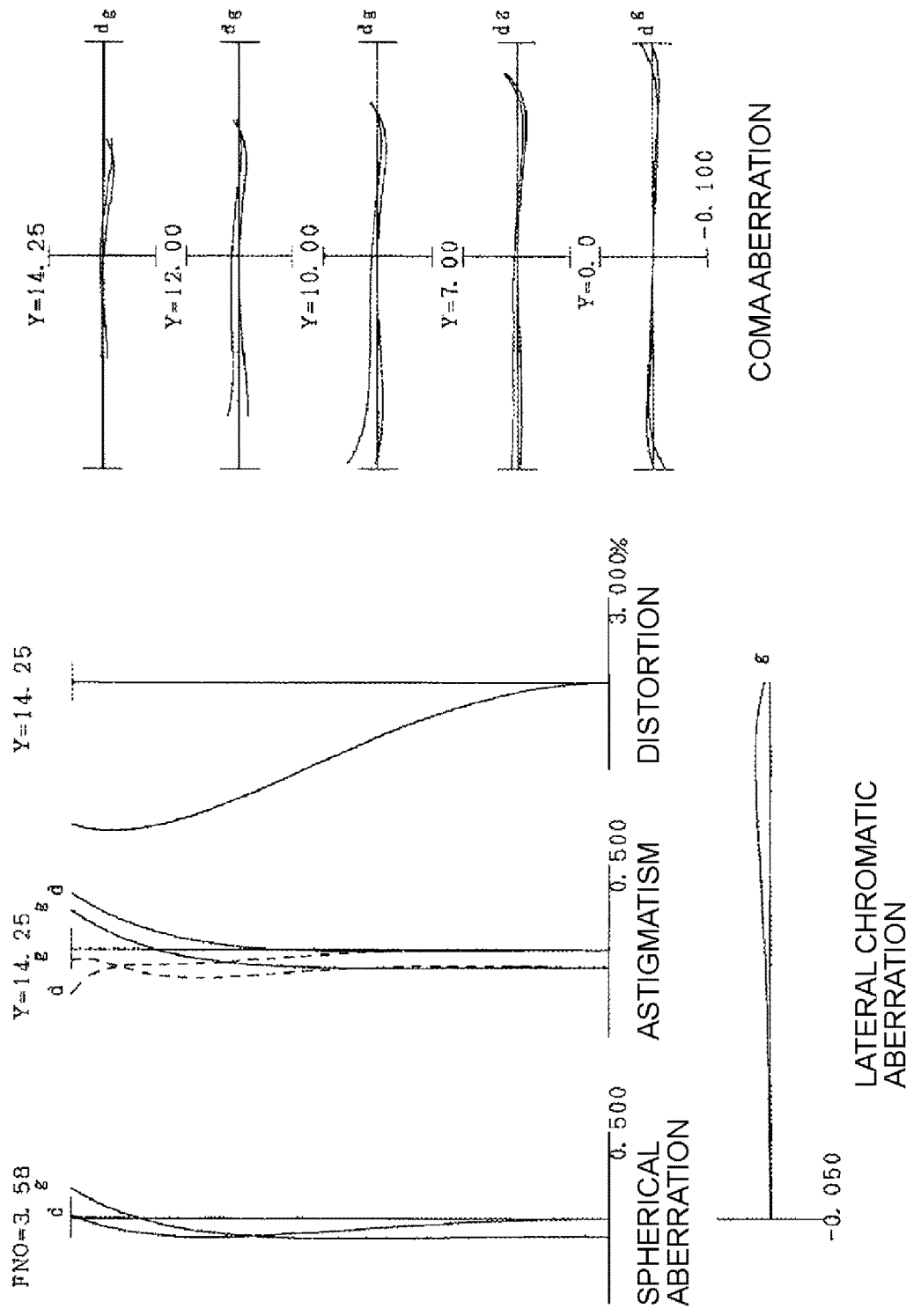

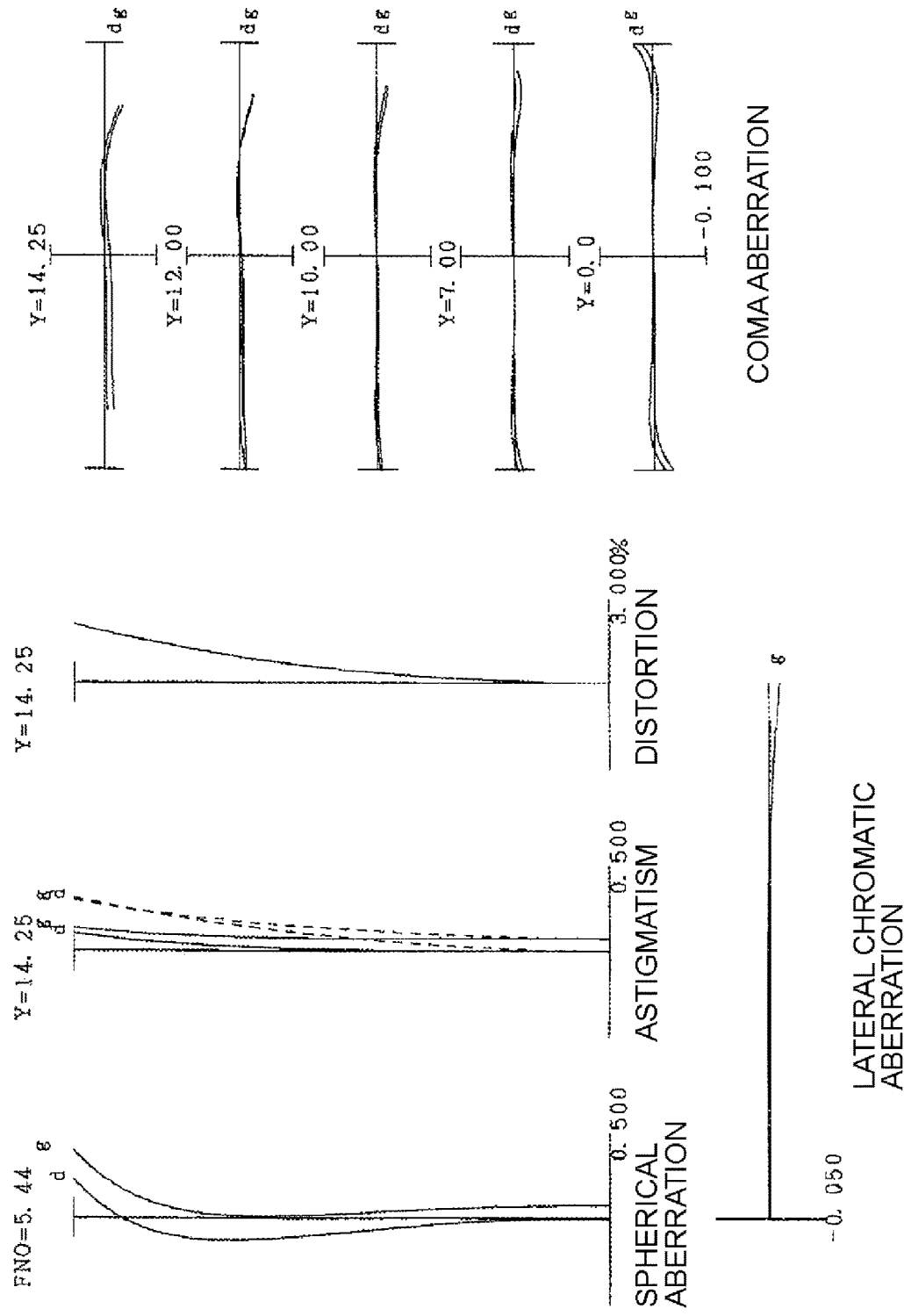

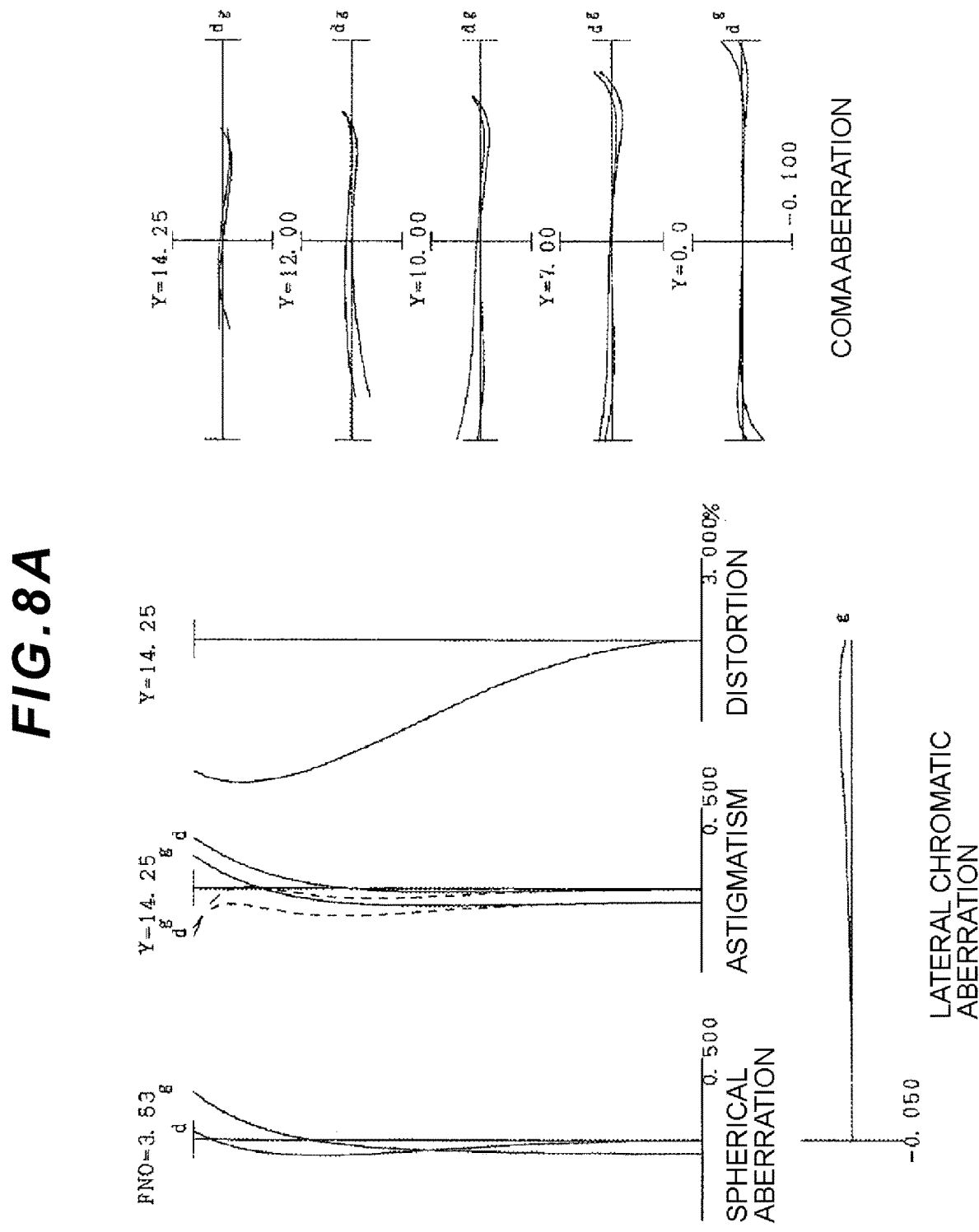

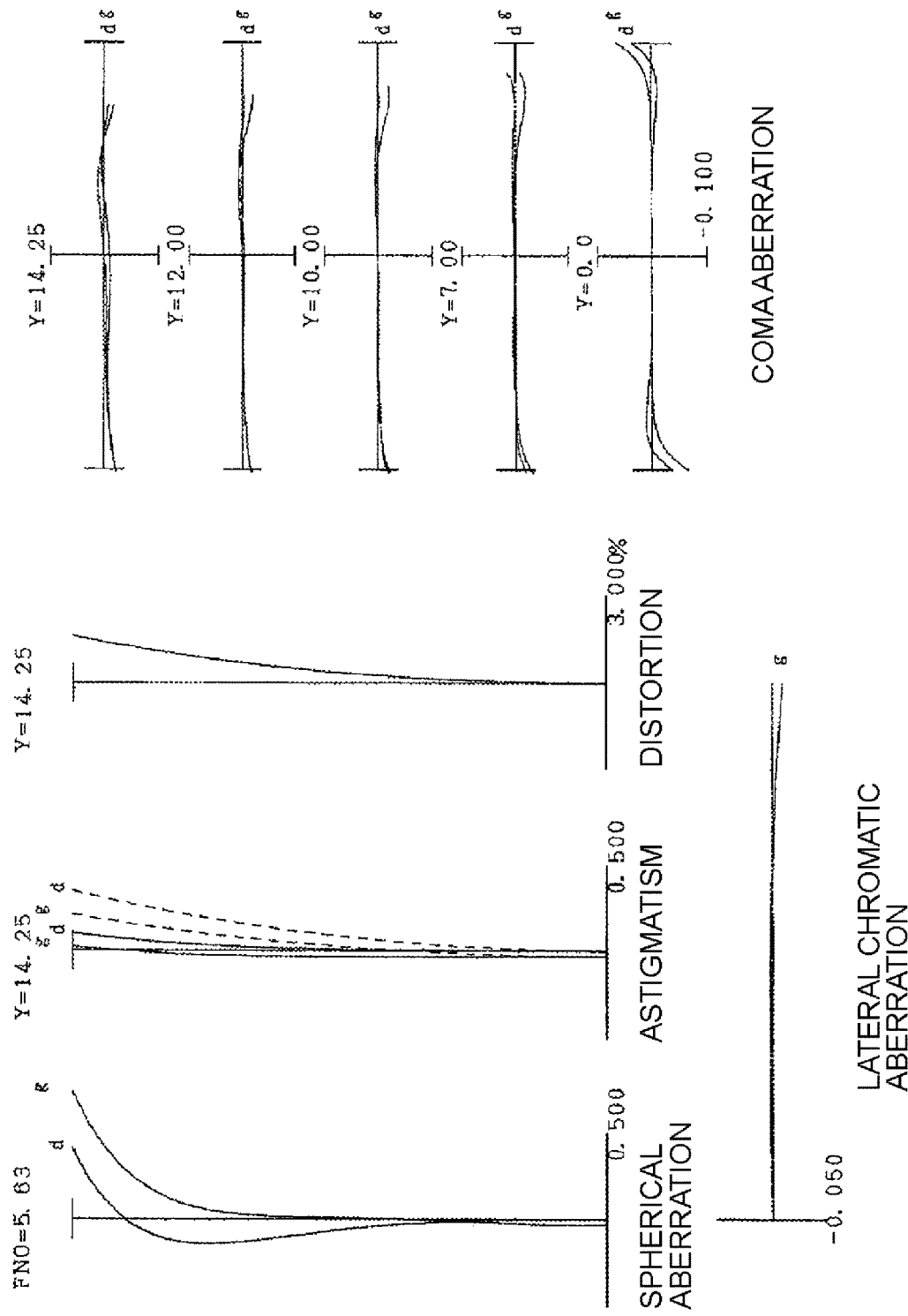

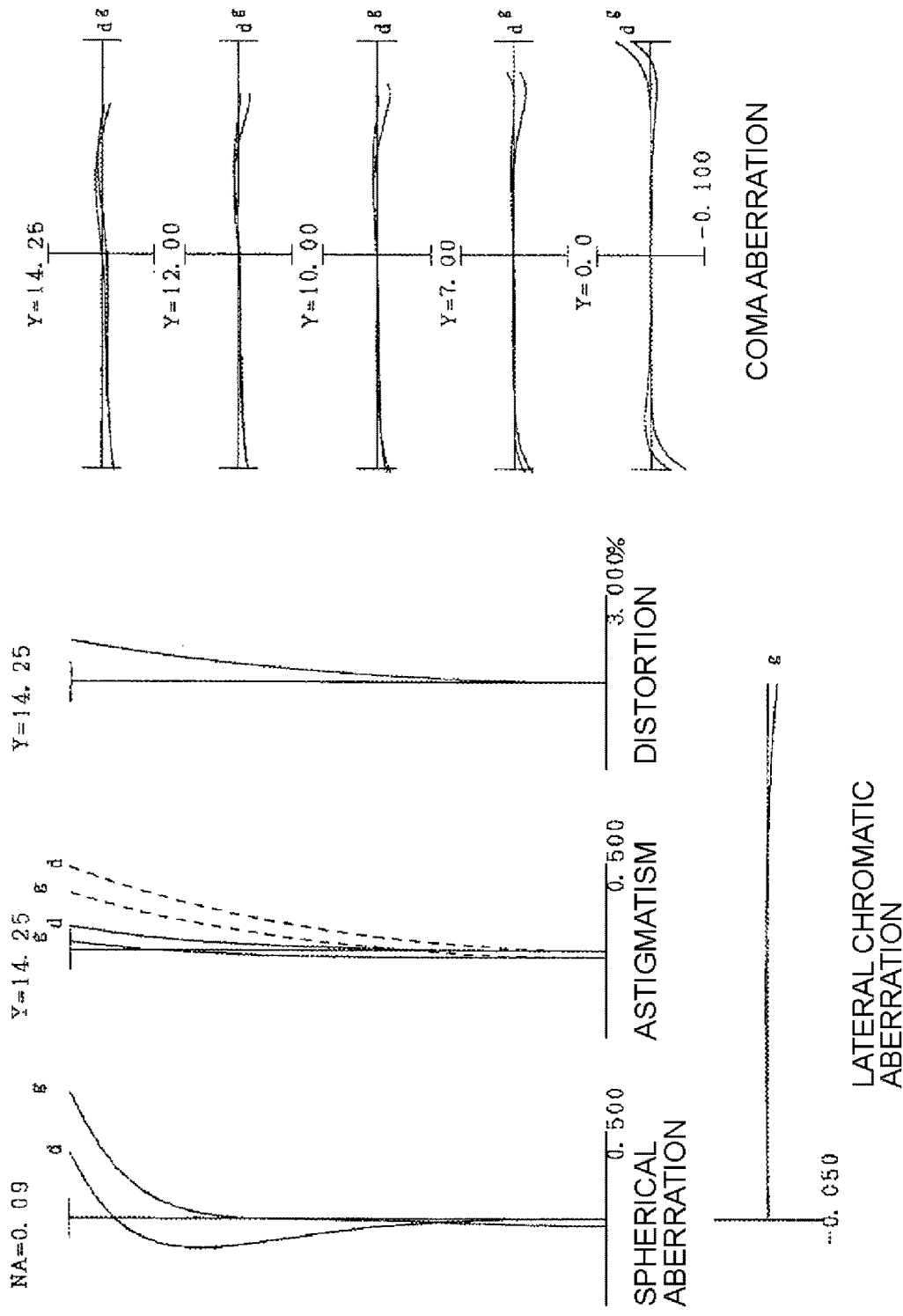

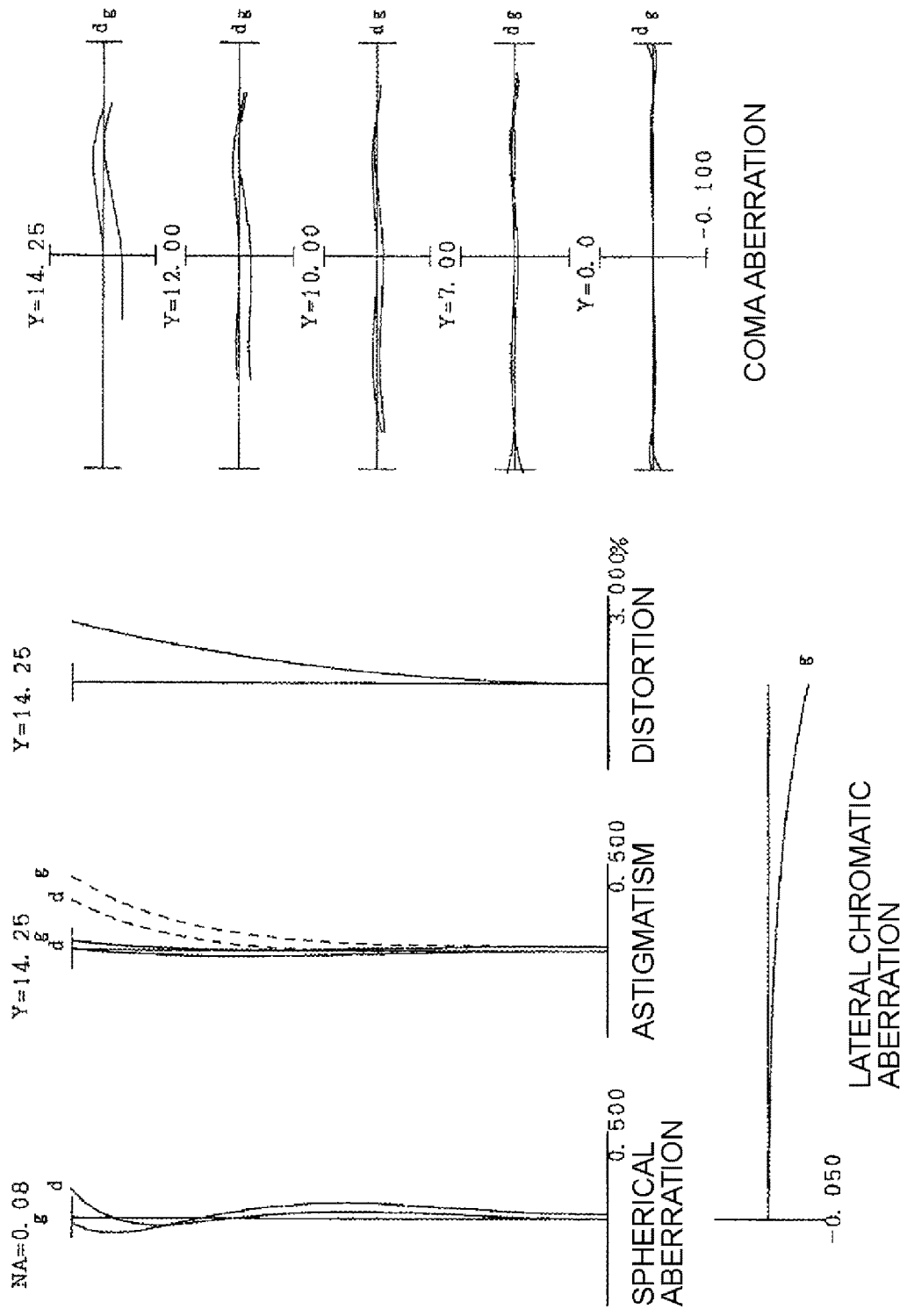

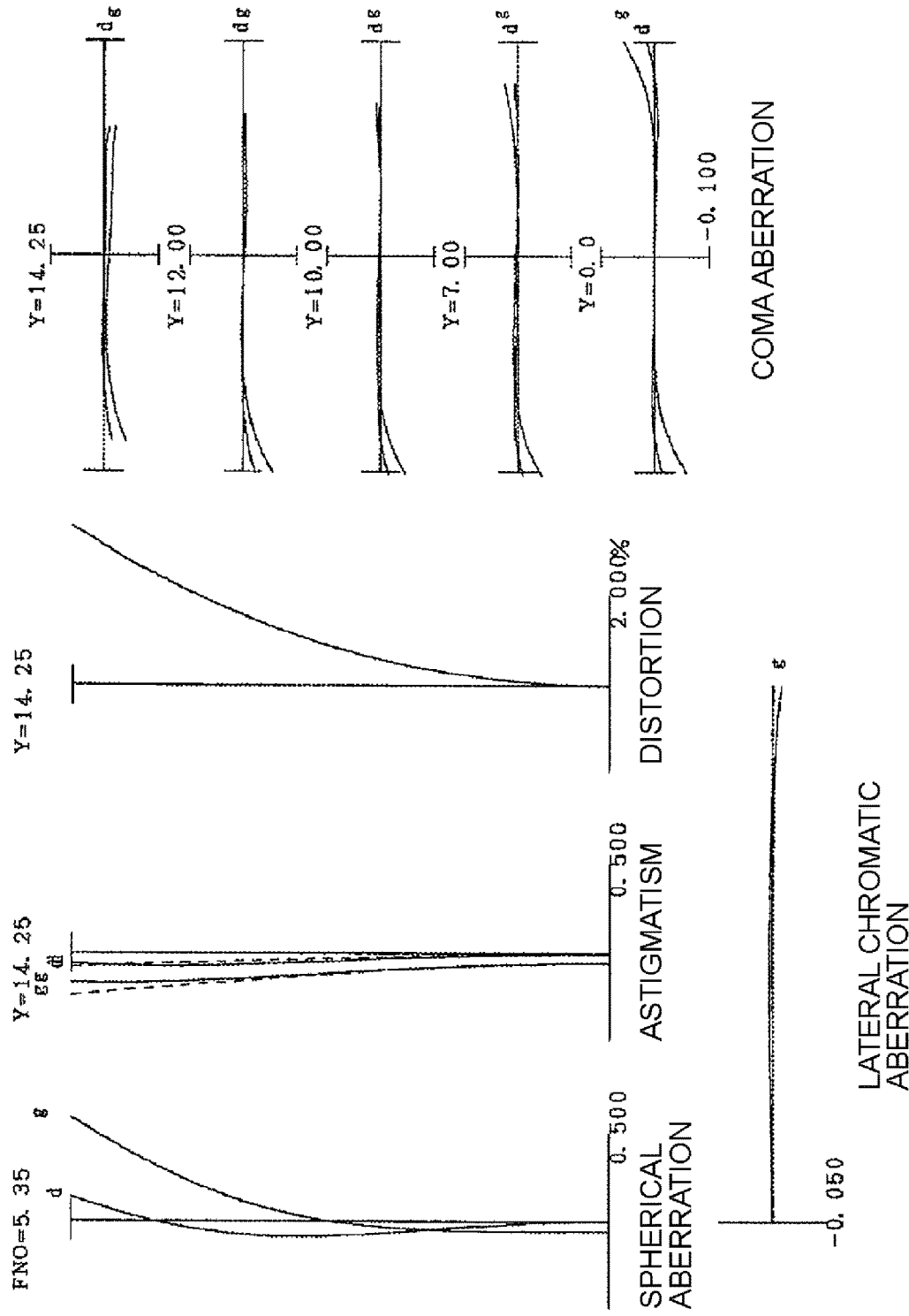

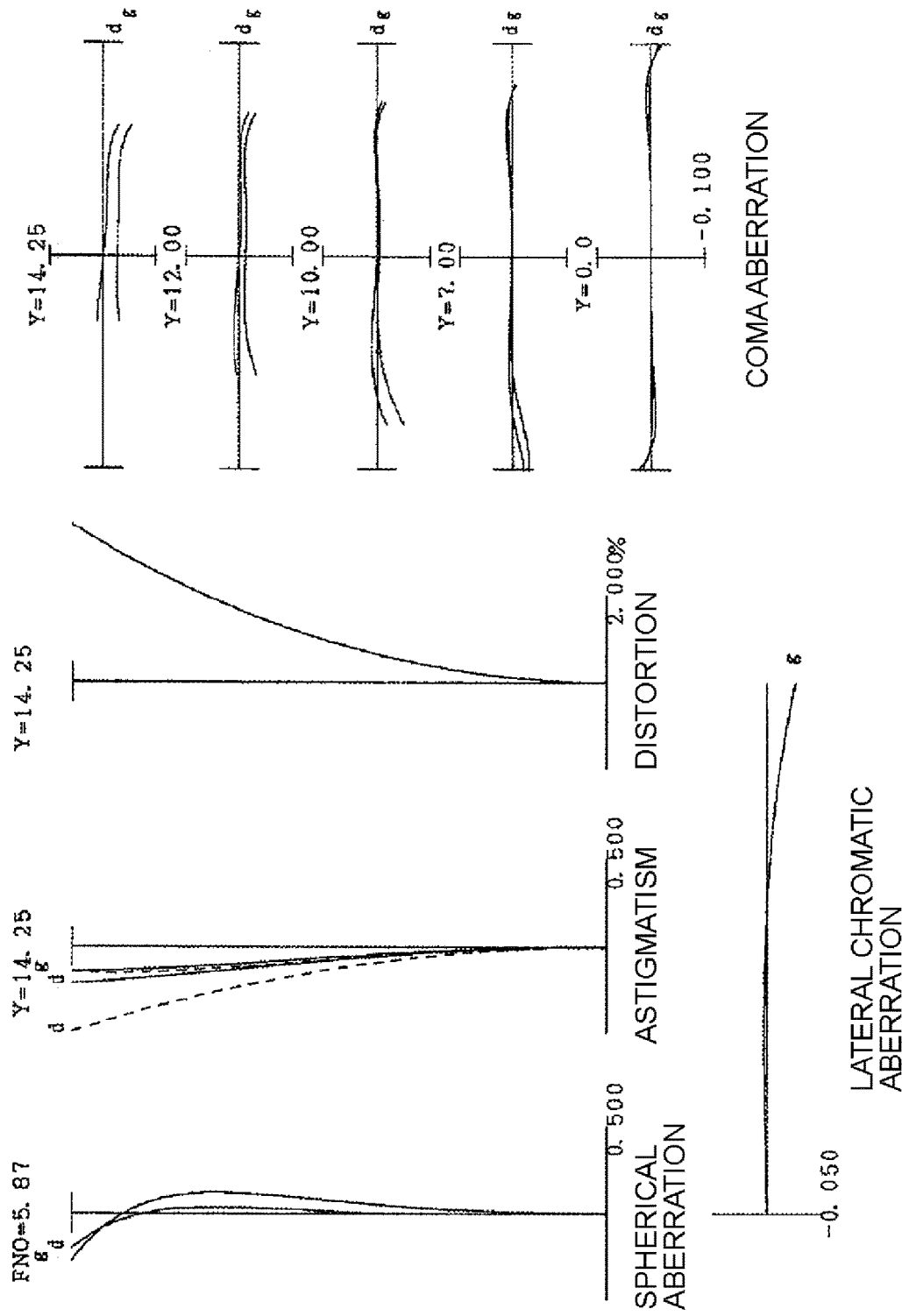

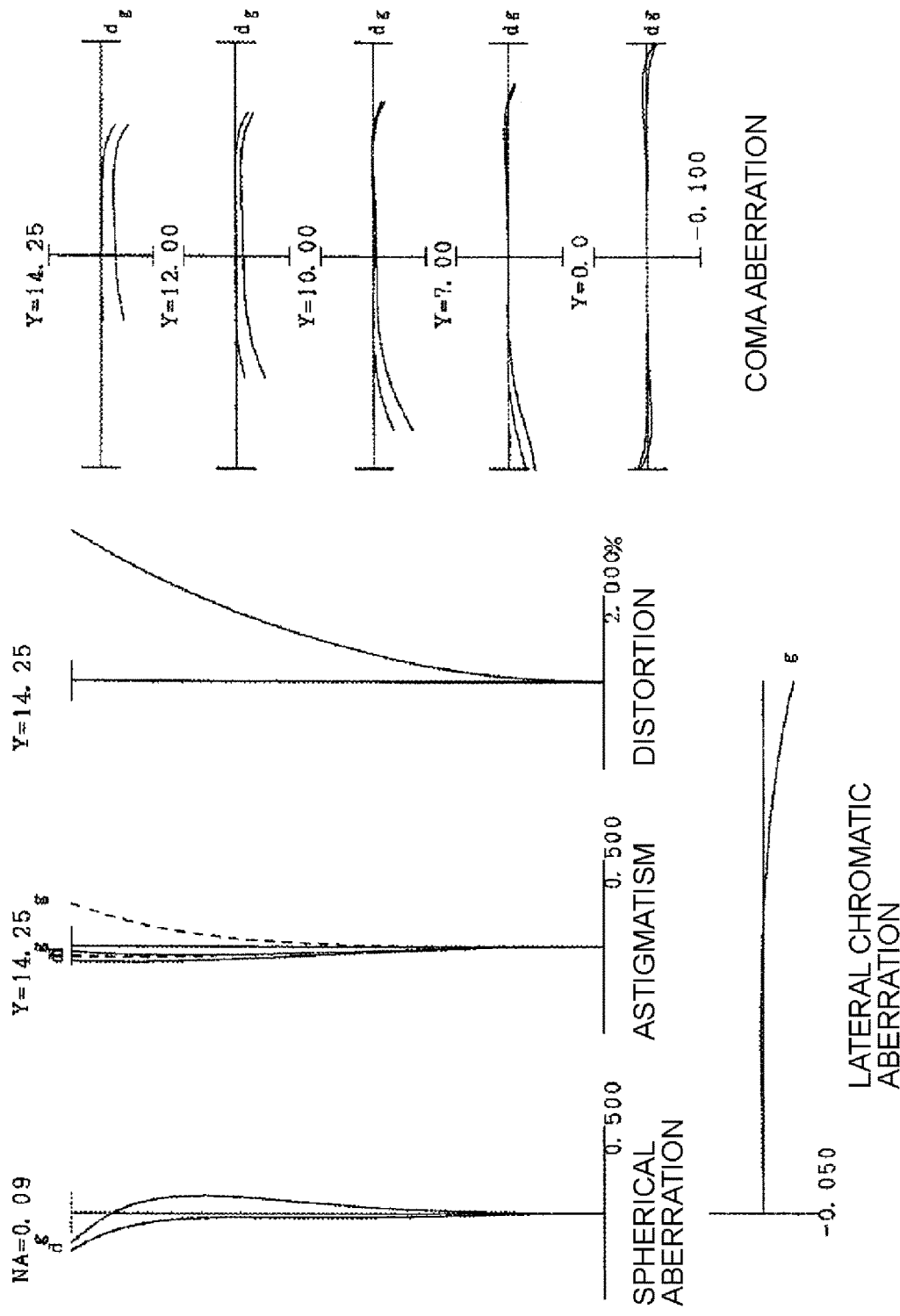

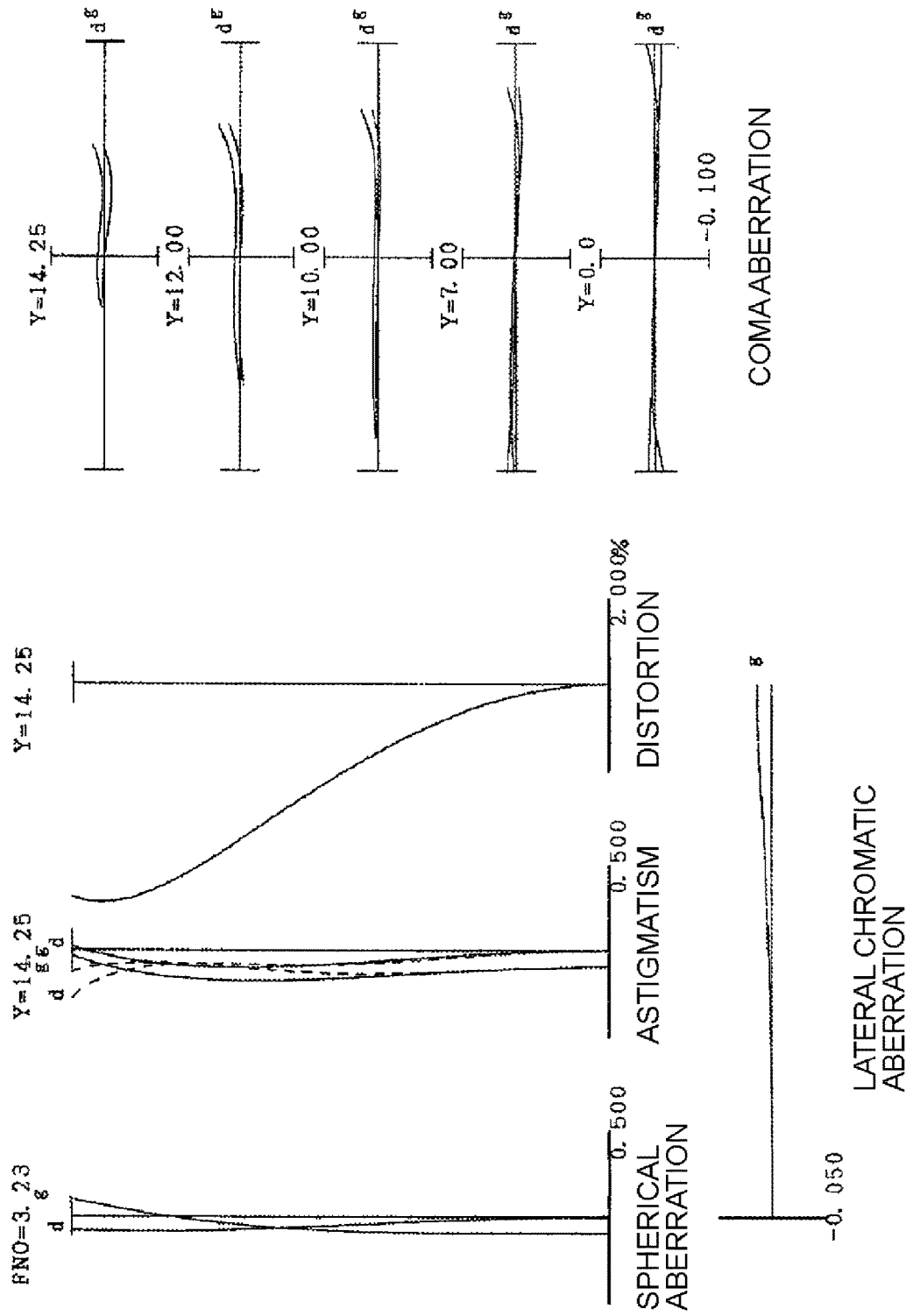

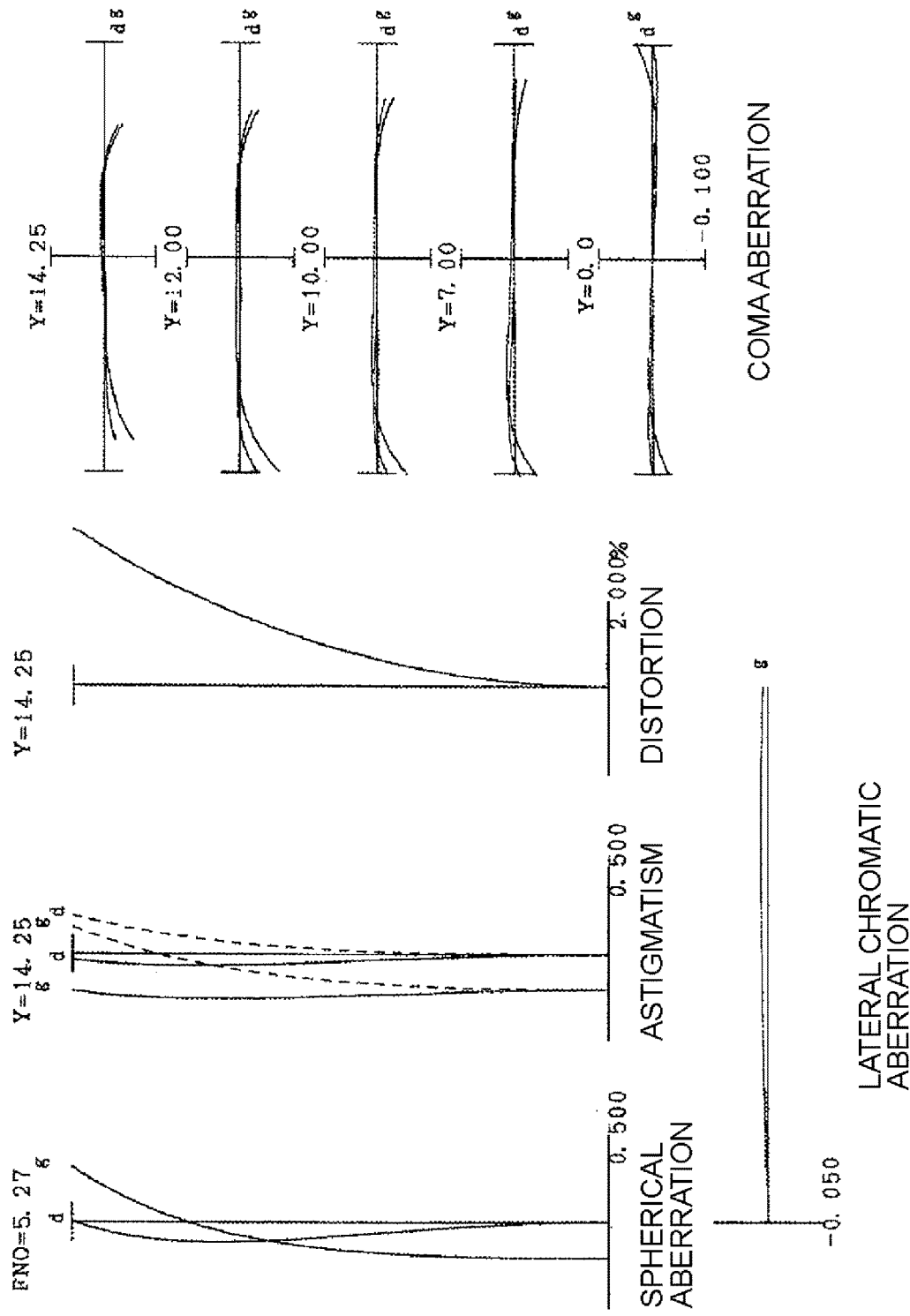

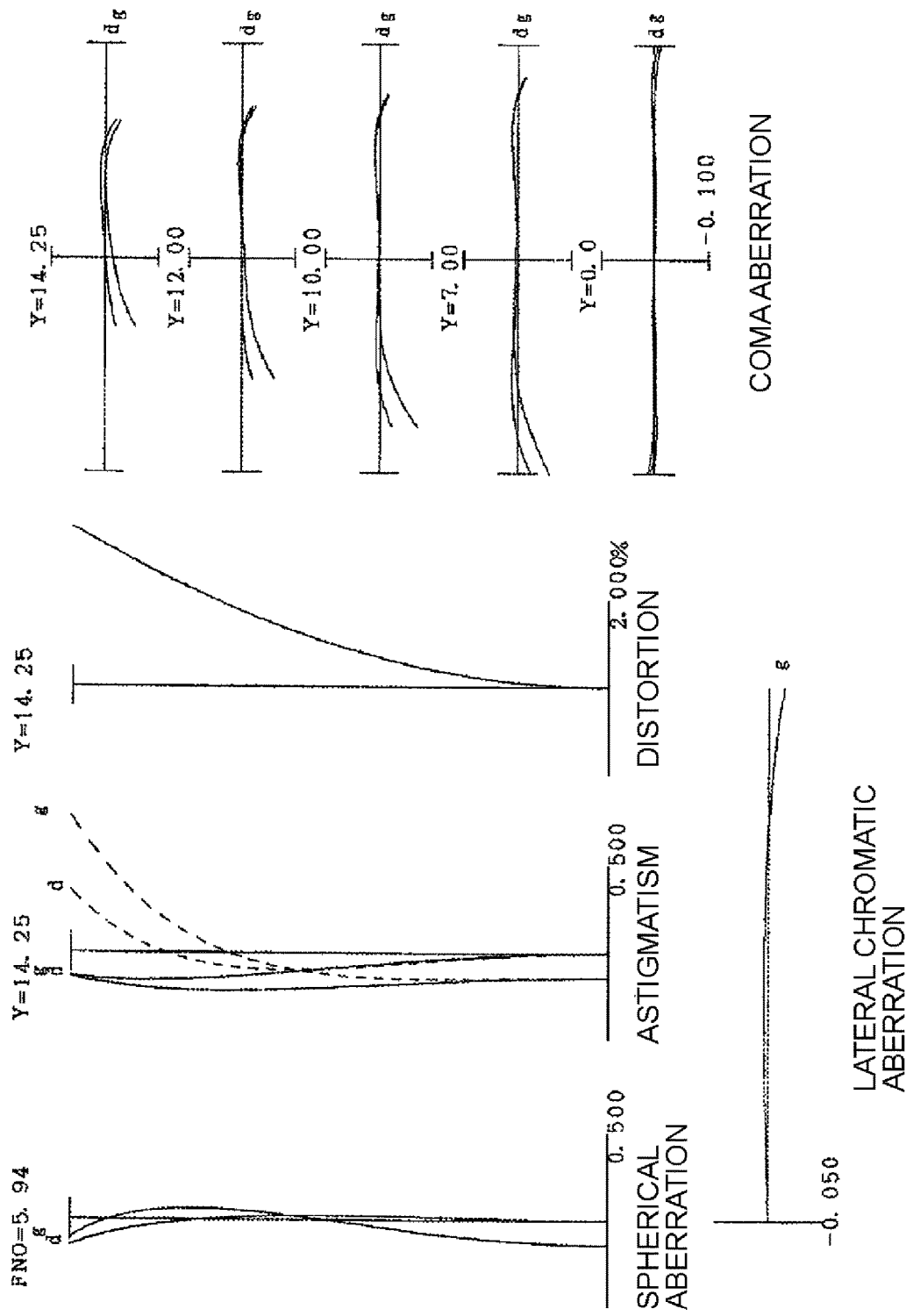

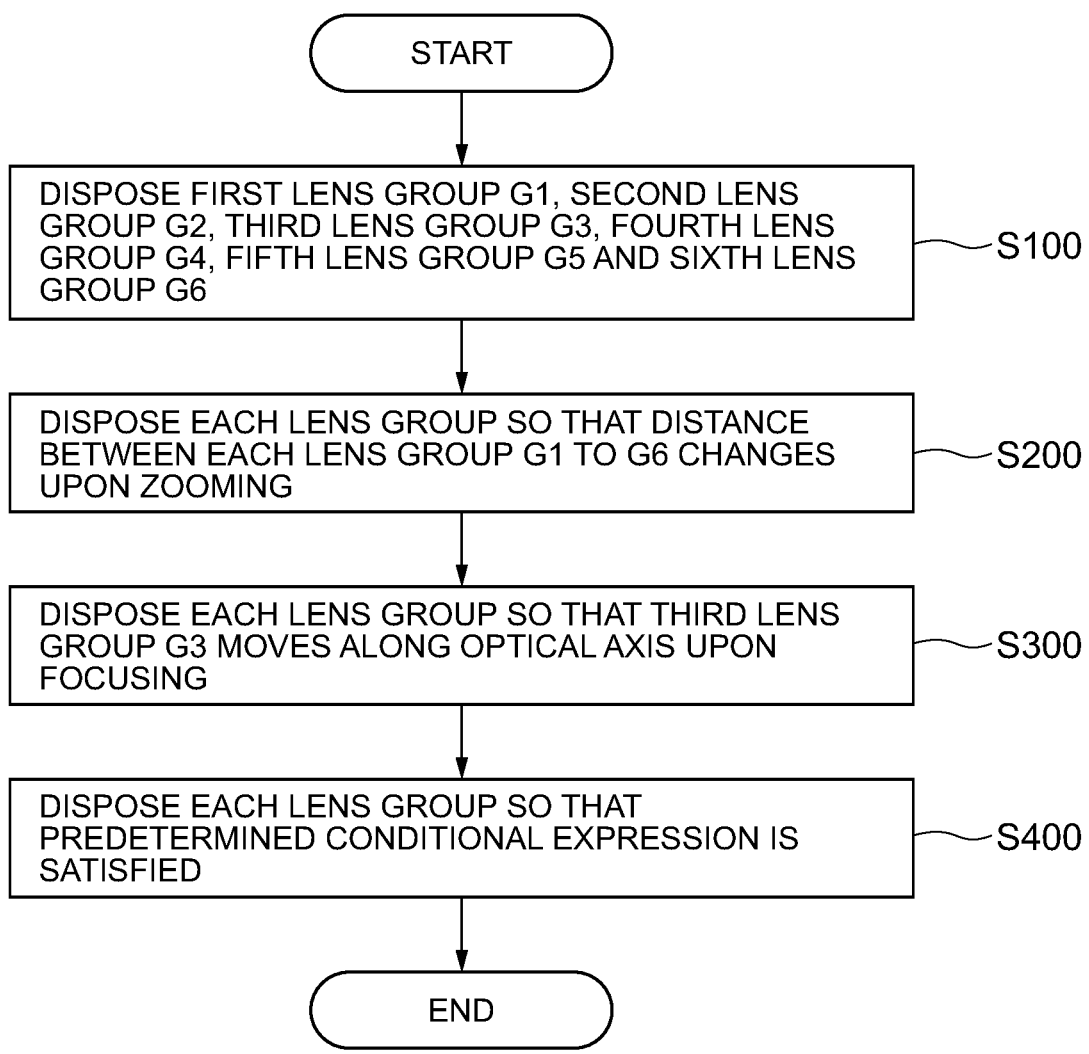

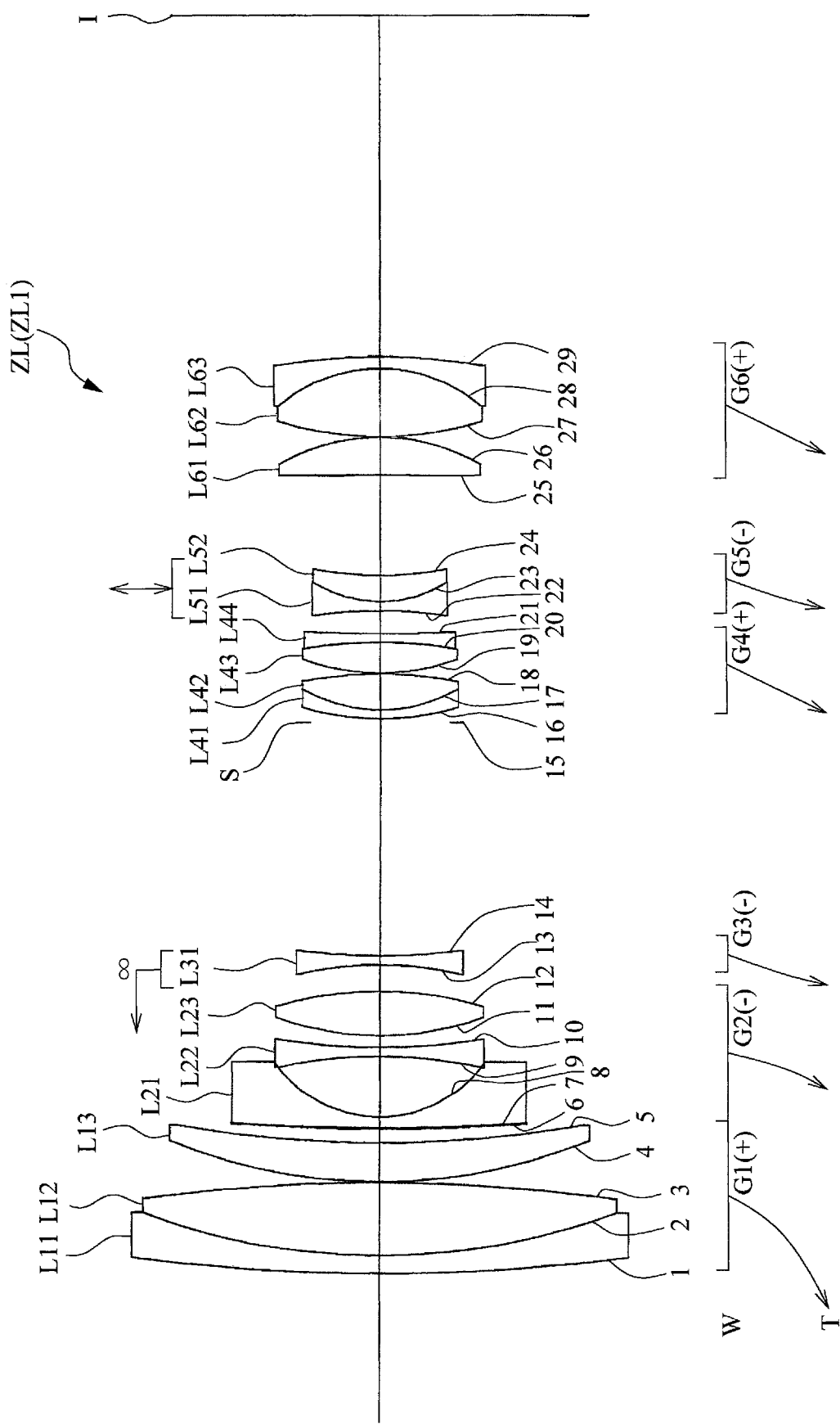

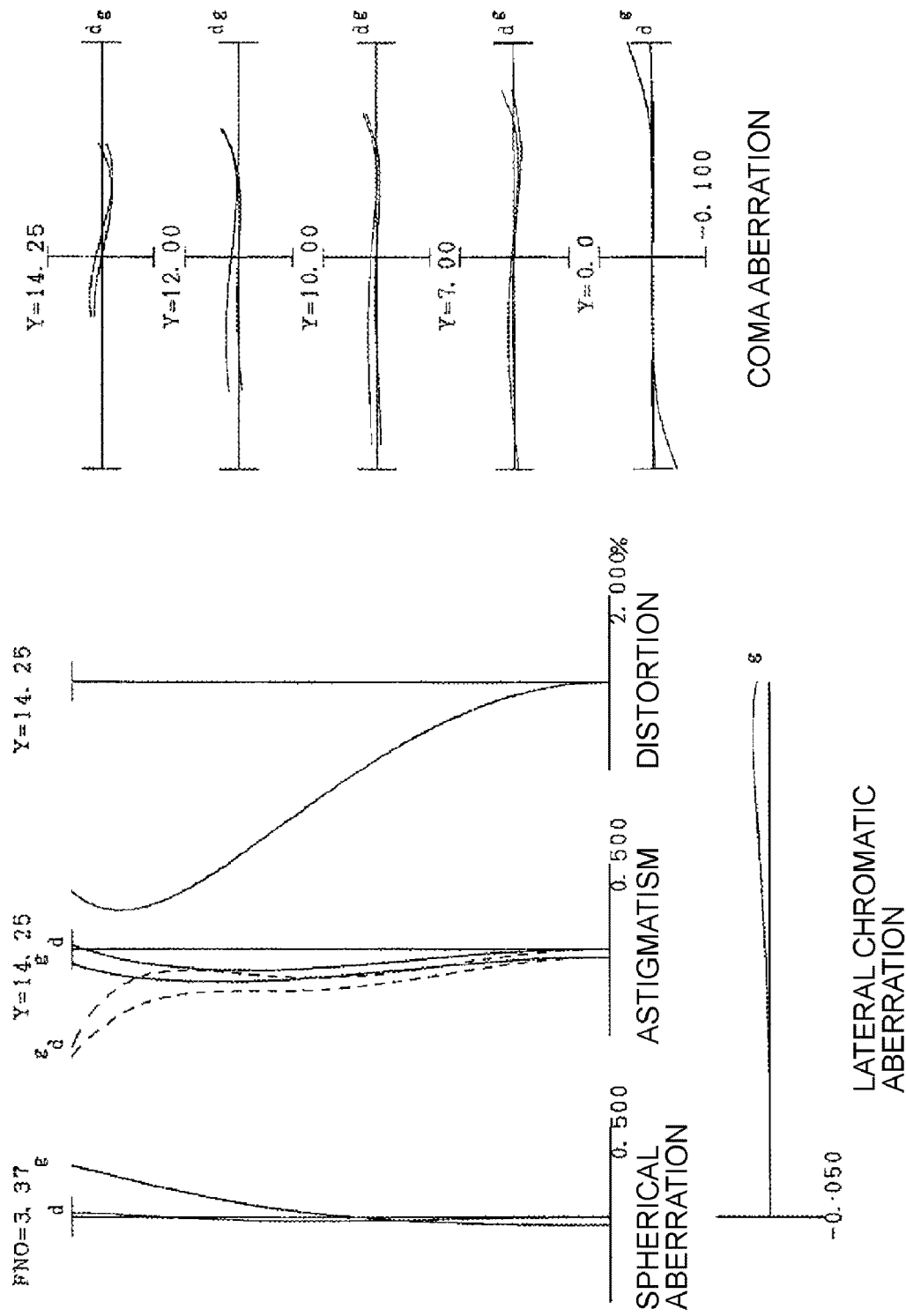

COMA ABERRATION

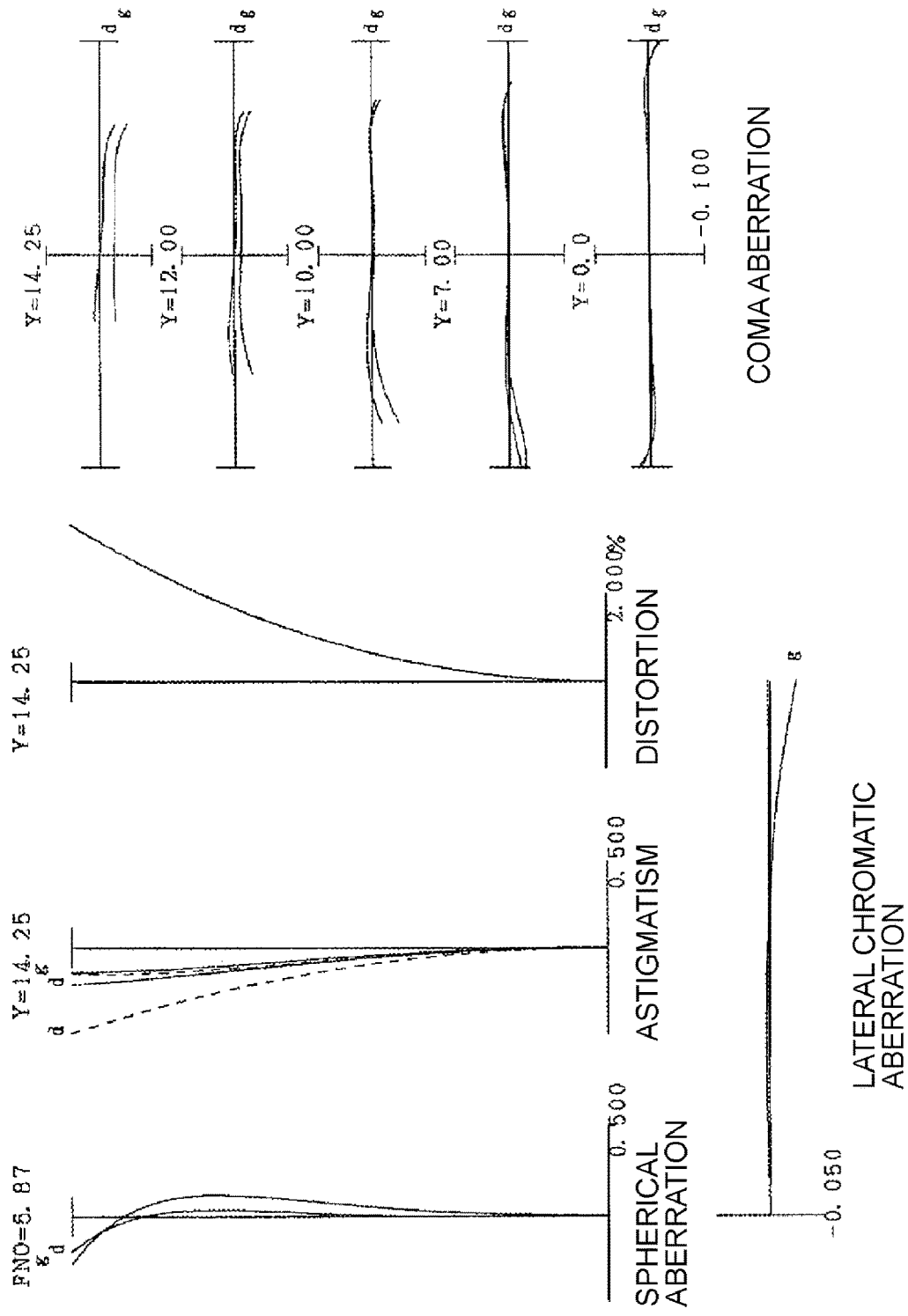

COMA ABERRATION

COMA ABERRATION

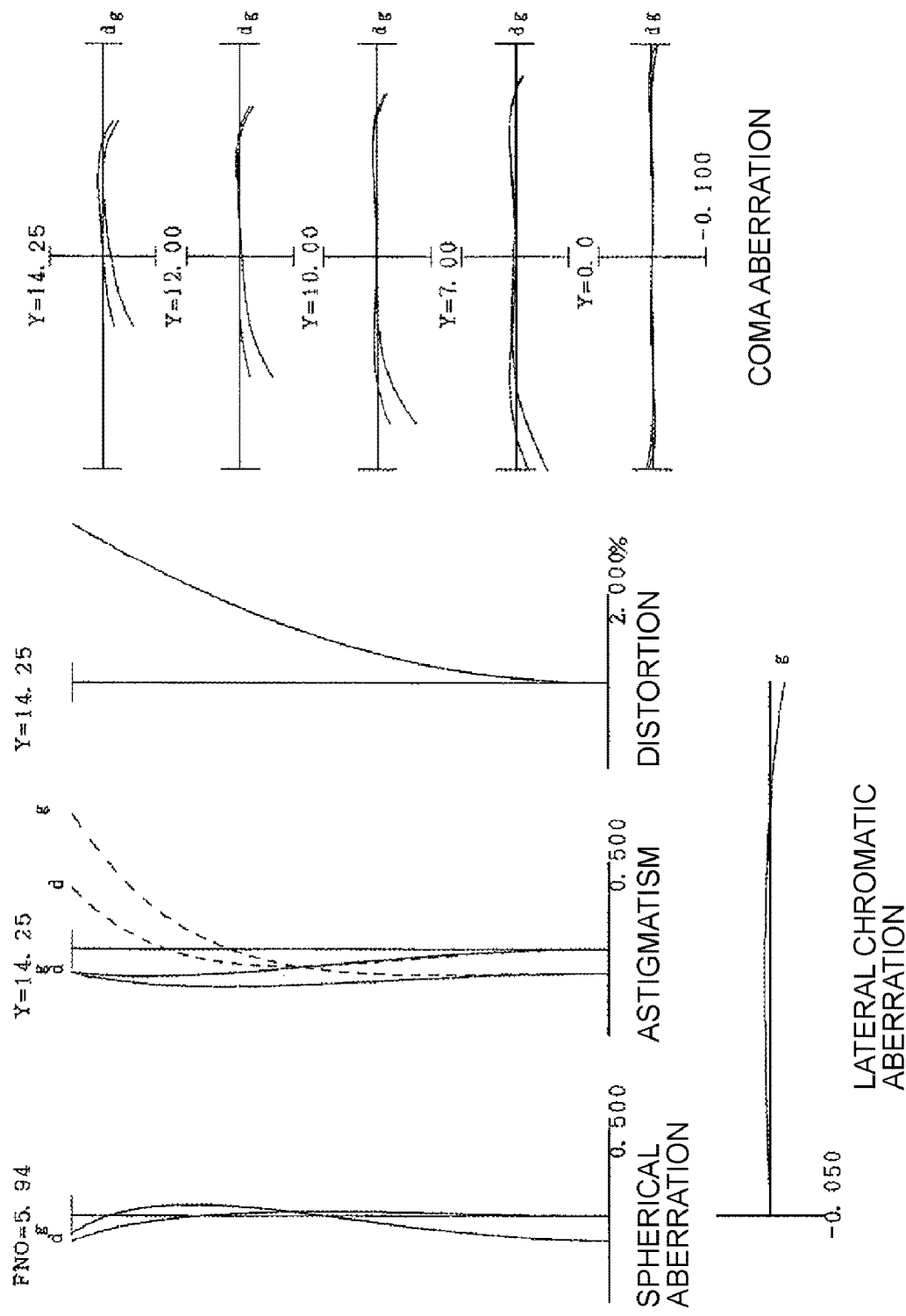

COMA ABERRATION

VARIABLE POWER OPTICAL SYSTEM, OPTICAL APPARATUS AND MANUFACTURING METHOD FOR VARIABLE POWER OPTICAL SYSTEM

TECHNICAL FIELD

The present invention relates to a variable power optical system, an optical apparatus and a manufacturing method for the variable power optical system.

TECHNICAL BACKGROUND

Variable power optical systems suitable for a photographic camera, an electronic still camera, a video camera and the like have been proposed (e.g. see Patent Document 1). In recent electronic still cameras and video cameras, a contrast AF is normally used, which performs focusing based on the contrast of an image by moving a focusing lens group and using the signal received from an image sensor.

PRIOR ARTS LIST

Patent Document

Patent Document 1: Japanese Laid-Open Patent Publication No. 2007-093975(A)

Further, as disclosed in the above patent document, variable power optical systems suitable for a photographic camera, an electronic still camera, a video camera and the like, of which weight of the focusing lens group is decreased by introducing an inner focus system, have been proposed.

SUMMARY OF THE INVENTION

Problems to be Solved by the Invention

However, in the case of the conventional variable power optical system, the size of the image changes considerably upon focusing using the contrast AF, which makes an image unnatural.

Furthermore, in the case of the conventional variable power optical system, weight reduction of the focusing lens group is not enough to implement sufficient quietness during auto focusing. However, since the weight of the focusing lens group is heavy, a large motor or an actuator is required to perform high-speed autofocusing, which increases the size of the lens barrel.

With the foregoing in view, it is an object of the present invention to provide a variable power optical system, an optical apparatus and a method for manufacturing the variable power optical system, for minimizing the change of the size of the image upon focusing, and ideally controlling aberration fluctuation upon zooming and focusing.

It is another object of the present invention to provide a variable power optical system, an optical apparatus and a method for manufacturing the variable power optical system for: making the focusing lens group small and light so as to implement high-speed autofocus and quietness during autofocus without increasing the size of the lens barrel; and ideally controlling the aberration fluctuation upon zooming from a wide-angle end state to a telephoto end state, and aberration fluctuation upon focusing from an object at infinity to an object at a close distance.

Means to Solve the Problems

To solve the above problems, a variable power optical system according to a first aspect of the invention includes, in order from an object: a first lens group having positive refractive power; a second lens group having negative refractive power; a third lens group having negative refractive power; a fourth lens group having positive refractive power; and a fifth lens group, and upon zooming from a wide-angle end state to a telephoto end state, a distance between the first lens group and the second lens group changes, a distance between the second lens group and the third lens group changes, a distance between the third lens group and the fourth lens group changes, and a distance between the fourth lens group and the fifth lens group changes, and upon focusing from an object at infinity to an object at a close distance, the third lens group moves in the optical axis direction, and moreover, the following conditional expression is satisfied:

$$1.10 < f1/(-f2) < 2.00$$

where
f1: focal length of the first lens group
f2: focal length of the second lens group.

In the variable power optical system according to the first aspect of the invention, the fifth lens group may have positive refractive power.

In the variable power optical system according to the first aspect of the invention, upon zooming from the wide-angle end state to the telephoto end state, the first lens group may move toward the object.

In the variable power optical system according to the first aspect of the invention, upon zooming from the wide-angle end state to the telephoto end state, the distance between the first lens group and the second lens group may increase, and the distance between the third lens group and the fourth lens group may decrease.

In the variable power optical system according to the first aspect of the invention, the following conditional expression may be satisfied:

$$0.990 < (A \times B)/(C \times D) < 1.013$$

where
$A = f3 \times (1-\beta 3w)^2 \times (1+\beta 3w) \times \beta bw^2 - \Delta \times \beta 3w^2$
$B = fbw \times (1-\beta bw) + \Delta$
$C = f3 \times (1-\beta 3w)^2 \times (1+\beta 3w) \times \beta bw^2 - \Delta \times \beta 3w$
$D = fbw \times (1-\beta bw) + \Delta/\beta bw$
$\Delta = Ymax/50$
$\beta 3w$: imaging magnification of the third lens group in the wide-angle end state
$\beta bw$: composite imaging magnification of the fourth and later lens groups in the wide-angle end state
Ymax: maximum image height
f3: focal length of the third lens group
fbw: composite focal length of the fourth and later lens groups in the wide-angle end state.

In the variable power optical system according to the first aspect of the invention, upon zooming from the wide-angle end state to the telephoto end state, the fourth lens group and the fifth lens group may move toward the object.

In the variable power optical system according to the first aspect of the invention, upon zooming from the wide-angle end state to the telephoto end state, the distance between the second lens group and the third lens group may increase, and the distance between the fourth lens group and the fifth lens group may decrease.

In the variable power optical system according to the first aspect of the invention, the following conditional expression may be satisfied:

$$0.35 < f3/f2 < 0.90$$

where
f3: focal length of the third lens group.

In the variable power optical system according to the first aspect of the invention, the following conditional expression may be satisfied:

$$3.50 < f1/fw < 5.50$$

where
fw: focal length of the variable power optical system in the wide-angle end state.

In the variable power optical system according to the first aspect of the invention, the following conditional expression may be satisfied:

$$0.72 < f4/f5 < 1.45$$

where
f4: focal length of the fourth lens group
f5: focal length of the fifth lens group.

In the variable power optical system according to the first aspect of the invention, the following conditional expression may be satisfied:

$$0.15 < (D45w - D45t)/fw < 0.40$$

where
D45w: distance between the fourth lens group and the fifth lens group in the wide-angle end state
D45t: distance between the fourth lens group and the fifth lens group in the telephoto end state
fw: focal length of the variable power optical system in the wide-angle end state.

In the variable power optical system according to the first aspect of the invention, a sixth lens group having positive refractive power may be further included, and the fifth lens group may have negative refractive power.

An optical apparatus according to the first aspect of the invention includes the variable power optical system according to the first aspect of the invention.

A variable power optical system according to a second aspect of the invention includes, in order from an object: a first lens group having positive refractive power; a second lens group having negative refractive power; a third lens group having negative refractive power; a fourth lens group having positive refractive power; a fifth lens group having negative refractive power; and a sixth lens group having positive refractive power, and upon zooming from a wide-angle end state to a telephoto end state, a distance between the first lens group and the second lens group changes, a distance between the second lens group and the third lens group changes, a distance between the third lens group and the fourth lens group changes, a distance between the fourth lens group and the fifth lens group changes, and a distance between the fifth lens group and the sixth lens group changes, and upon focusing from an object at infinity to an object at a close distance, the third lens group moves in the optical axis direction, and moreover, the following conditional expression is satisfied:

$$-0.25 < ft/f12t < 0.10$$

where
ft: focal length of the variable power optical system in the telephoto end state
f12t: composite focal length of the first lens group and the second lens group in the telephoto end state.

In the variable power optical system according to the second aspect of the invention, upon zooming from the wide-angle end state to the telephoto end state, the first lens group may move toward the object.

In the variable power optical system according to the second aspect of the invention, upon zooming from the wide-angle end state to the telephoto end state, the distance between the first lens group and the second lens group may increase, and the distance between the third lens group and the fourth lens group may decrease.

In the variable power optical system according to the second aspect of the invention, upon zooming from the wide-angle end state to the telephoto end state, the fourth lens group and the sixth lens group may move toward the object.

In the variable power optical system according to the second aspect of the invention, upon zooming from the wide-angle end state to the telephoto end state, the distance between the second lens group and the third lens group may increase, the distance between the fourth lens group and the fifth lens group may increase, and the distance between the fifth lens group and the sixth lens group may decrease.

In the variable power optical system according to the second aspect of the invention, the following conditional expression may be satisfied;

$$2.00 < f12w/f3 < 5.00$$

where
f12w: composite focal length of the first lens group and the second lens group in the wide-angle end state
f3: focal length of the third lens group.

In the variable power optical system according to the second aspect of the invention, the third lens group may be constituted only by one negative lens.

In the variable power optical system according to the second aspect of the invention, the surface closest to the object in the third lens group may be aspherical.

In the variable power optical system according to the second aspect of the invention, the following conditional expression may be satisfied:

$$0.45 < f1/ft < 0.90$$

where
f1: focal length of the first lens group.

In the variable power optical system according to the second aspect of the invention, the following conditional expression may be satisfied:

$$1.00 < f4/fw < 1.70$$

where
fw: focal length of the variable power optical system in the wide-angle end state
f4: focal length of the fourth lens group.

In the variable power optical system according to the second aspect of the invention, the following conditional expression may be satisfied:

$$1.40 < (-f5)/fw < 2.30$$

where
fw: focal length of the variable power optical system in the wide-angle end state
f5: focal length of the fifth lens group.

In the variable power optical system according to the second aspect of the invention, the following conditional expression may be satisfied:

$$1.60 < f6/fw < 2.60$$

where
fw: focal length of the variable power optical system in the wide-angle end state
f6: focal length of the sixth lens group.

In the variable power optical system according to the second aspect of the invention, at least a part of the fifth lens group may be moved so as to have a component in a direction orthogonal to the optical axis.

In the variable power optical system according to the second aspect of the invention, upon zooming from the wide-angle end state to the telephoto end state, the fourth lens group and the sixth lens group may move together.

In the variable power optical system according to the second aspect of the invention, the following conditional expression may be satisfied:

$$0.80 < f5/f3 < 1.30$$

where
f3: focal length of the third lens group
f5: focal length of the fifth lens group.

In the variable power optical system according to the second aspect of the invention, the fifth lens group may be constituted by a cemented lens created by cementing a biconcave lens and a positive meniscus lens having a convex surface facing the object in order from the object.

In the variable power optical system according to the second aspect of the invention, the surface closest to the object in the fifth lens group may be aspherical.

An optical apparatus according to the second aspect of the invention includes the variable power optical system according to the second aspect of the invention.

A variable power optical system according to a third aspect of the invention includes, in order from an object: a first lens group having positive refractive power; a second lens group having negative refractive power; a third lens group having negative refractive power; a fourth lens group having positive refractive power; a fifth lens group having negative refractive power; and a sixth lens group having positive refractive power, and upon zooming from a wide-angle end state to a telephoto end state, a distance between the first lens group and the second lens group changes, a distance between the second lens group and the third lens group changes, a distance between the third lens group and the fourth lens group changes, a distance between the fourth lens group and the fifth lens group changes, and a distance between the fifth lens group and the sixth lens group changes, and upon focusing from an object at infinity to an object at a close distance, the third lens group moves in the optical axis direction, and at least a part of the fifth lens group moves so as to have a component in a direction orthogonal to the optical axis, and moreover, the following conditional expression being satisfied:

$$0.80 < f5/f3 < 1.30$$

where
f3: focal length of the third lens group
f5: focal length of the fifth lens group.

An optical apparatus according to the third aspect of the invention includes the variable power optical system according to the third aspect of the invention.

A method for manufacturing a variable power optical system according to the first aspect of the invention is a method for manufacturing a variable power optical system including, in order from an object: a first lens group having positive refractive power; a second lens group having negative refractive power; a third lens group having negative refractive power; a fourth lens group having positive refractive power; and a fifth lens group, this method including: disposing each lens group so that, upon zooming from a wide-angle end state to a telephoto end state, a distance between the first lens group and the second lens group changes, a distance between the second lens group and the third lens group changes, a distance between the third lens group and the fourth lens group changes, and a distance between the fourth lens group and the fifth lens group changes; disposing each lens group so that, upon focusing from an object at infinity to an object at a close distance, the third lens group moves in the optical axis direction; and disposing each lens group so that the following conditional expression is satisfied:

$$1.10 < f1/(-f2) < 2.00$$

where
f1: focal length of the first lens group
f2: focal length of the second lens group.

In the manufacturing method for the variable power optical system according to the first aspect of the invention, the fifth lens group may have positive refractive power.

In the method for manufacturing the variable power optical system according to the first aspect of the invention, the following conditional expression may be satisfied:

$$0.35 < f3/f2 < 0.90$$

where
f3: focal length of the third lens group.

A method for manufacturing a variable power optical system according to the second aspect of the invention is a method for manufacturing a variable power optical system including, in order from an object: a first lens group having positive refractive power; a second lens group having negative refractive power; a third lens group having negative refractive power; a fourth lens group having positive refractive power; a fifth lens group having negative refractive power; and a sixth lens group having positive refractive power, this method including: disposing each lens group so that, upon zooming from a wide-angle end state to a telephoto end state, a distance between the first lens group and the second lens group changes, a distance between the second lens group and the third lens group changes, a distance between the third lens group and the fourth lens group changes, a distance between the fourth lens group and the fifth lens group changes, and a distance between the fifth lens group and the sixth lens group changes; disposing each lens group so that, upon focusing from an object at infinity to an object at a close distance, the third lens group moves in the optical direction; and disposing each lens group so that the following conditional expression is satisfied:

$$-0.25 < ft/f12t < 0.10$$

where
ft: focal length of the variable power optical system in the telephoto end state
f12t: composite focal length of the first lens group and the second lens group in the telephoto end state.

In the method for manufacturing the variable power optical system according to the second aspect of the invention, the following conditional expression may be satisfied:

$$2.00 < f12w/f3 < 5.00$$

where
f12w: composite focal length of the first lens group and the second lens group in the wide-angle end state
f3: focal length of the third lens group.

In the method for manufacturing the variable power optical system according to the second aspect of the invention, the following conditional expression may be satisfied:

$$0.45 < f1/ft < 0.90$$

where
f1: focal length of the first lens group.

In the method for manufacturing the variable power optical system according to the second aspect of the invention, the following conditional expression may be satisfied:

$$0.80 < f5/f3 < 1.30$$

where
f3: focal length of the third lens group
f5: focal length of the fifth lens group.

A method for manufacturing a variable power optical system according to the third aspect of the invention is a method for manufacturing a variable power optical system including, in order from an object: a first lens group having positive refractive power; a second lens group having negative refractive power; a third lens group having negative refractive power; a fourth lens group having positive refractive power; a fifth lens group having negative refractive power; and a sixth lens group having positive refractive power, this method including: disposing each lens group so that, upon zooming from a wide-angle end state to a telephoto end state, a distance between the first lens group and the second lens group changes, a distance between the second lens group and the third lens group changes, a distance between the third lens group and the fourth lens group changes, a distance between the fourth lens group and the fifth lens group changes, and a distance between the fifth lens group and the sixth lens group changes; disposing each lens group so that, upon focusing from an object at infinity to an object at a close distance, the third lens group moves in the optical axis direction; disposing each lens group so that at least a part of the fifth lens group moves so as to have a component in a direction orthogonal to the optical axis; and disposing each lens group so that the following conditional expression is satisfied:

$$0.80 < f5/f3 < 1.30$$

where
f3: focal length of the third lens group
f5: focal length of the fifth lens group.

Advantageous Effects of the Invention

Any one of the aspects of the invention can provide a variable power optical system, an optical apparatus and a method for manufacturing the variable power optical system, for minimizing the change of the size of the image upon focusing and ideally controlling the aberration fluctuation upon zooming and focusing.

Further, any one of the aspects of the invention can provide a variable power optical system, an optical apparatus and a method for manufacturing the variable power optical system for: making the focusing lens group small and light so as to implement high-speed autofocus and quietness during autofocus without increasing the size of the lens barrel; and ideally controlling the aberration fluctuation upon zooming from a wide-angle end state to a telephoto end state, and aberration fluctuation upon focusing from an object at infinity to an object at a close distance.

BRIEF DESCRIPTION OF THE DRAWINGS

FIGS. 2A, 2B and 2C are sets of graphs showing various aberrations of the variable power optical system according to Example 1 upon focusing on infinity, where FIG. 2A indicates the wide-angle end state, FIG. 2B indicates the intermediate focal length state, and FIG. 2C indicates the telephoto end state;

FIGS. 3A, 3B and 3C are sets of graphs showing various aberrations of the variable power optical system according to Example 1 upon focusing on a close point, where FIG. 3A indicates the wide-angle end state, FIG. 3B indicates the intermediate focal length state, and FIG. 3C indicates the telephoto end state;

FIG. 4 is a cross-sectional view depicting a lens configuration of a variable power optical system according to Example 2;

FIGS. 5A, 5B and 5C are sets of graphs showing various aberrations of the variable power optical system according to Example 2 upon focusing on infinity, where FIG. 5A indicates the wide-angle end state, FIG. 5B indicates the intermediate focal length state, and FIG. 5C indicates the telephoto end state;

FIGS. 8A, 8B and 8C are sets of graphs showing various aberrations of the variable power optical system according to Example 3 upon focusing on infinity, where FIG. 8A indicates the wide-angle end state, FIG. 8B indicates the intermediate focal length state, and FIG. 8C indicates the telephoto end state;

FIGS. 9A, 9B and 9C are sets of graphs showing various aberrations of the variable power optical system according to Example 3 upon focusing on a close point, where FIG. 9A indicates the wide-angle end state, FIG. 9B indicates the intermediate focal length state, and FIG. 9C indicates the telephoto end state;

FIGS. 13A, 13B and 13C are sets of graphs showing various aberrations of the variable power optical system according to Example 4 upon focusing on infinity, where FIG. 13A indicates the wide-angle end state, FIG. 13B indicates the intermediate focal length state, and FIG. 13C indicates the telephoto end state;

FIGS. 14A, 14B and 14C are sets of graphs showing various aberrations of the variable power optical system according to Example 4 upon focusing on a close point, where FIG. 14A indicates the wide-angle end state, FIG. 14B indicates the intermediate focal length state, and FIG. 14C indicates the telephoto end state;

FIGS. 16A, 16B and 16C are sets of graphs showing various aberrations of the variable power optical system according to Example 5 upon focusing on infinity, where FIG. 16A indicates the wide-angle end state, FIG. 16B indicates the intermediate focal length state, and FIG. 16C indicates the telephoto end state;

FIG. 18 is a flow chart depicting a method for manufacturing the variable power optical system according to Example 4 or 5;

FIG. 19 is a cross-sectional view depicting a lens configuration of a variable power optical system according to Example 6;

FIGS. 20A, and 20B are sets of graphs showing various aberrations of the variable power optical system according to Example 6 upon focusing on infinity in the wide-angle end state, where FIG. 20A indicates each graph showing spherical aberration, astigmatism, distortion, lateral chromatic aberration and coma aberration, and FIG. 20B indicates a graph showing coma aberration after blur correction is performed for a 0.60° rotation blur;

FIGS. 22A and 22B are sets of graphs showing various aberrations of the variable power optical system according to Example 6 upon focusing on infinity in the telephoto end state, where FIG. 22A indicates each graph showing spherical aberration, astigmatism, distortion, lateral chromatic aberration and coma aberration, and FIG. 22B indicates a graph showing coma aberration after blur correction is performed for a 0.20° rotation blur;

FIGS. 27A and 27B are sets of graphs showing various aberrations of the variable power optical system according to Example 7 upon focusing on infinity in the telephoto end state, where FIG. 27A indicates each graph showing spherical aberration, astigmatism, distortion, lateral chromatic aberration and coma aberration, and FIG. 27B indicates a graph showing coma aberration after blur correction is performed for a 0.20° rotation blur;

DESCRIPTION OF THE EMBODIMENTS

Figure 1:
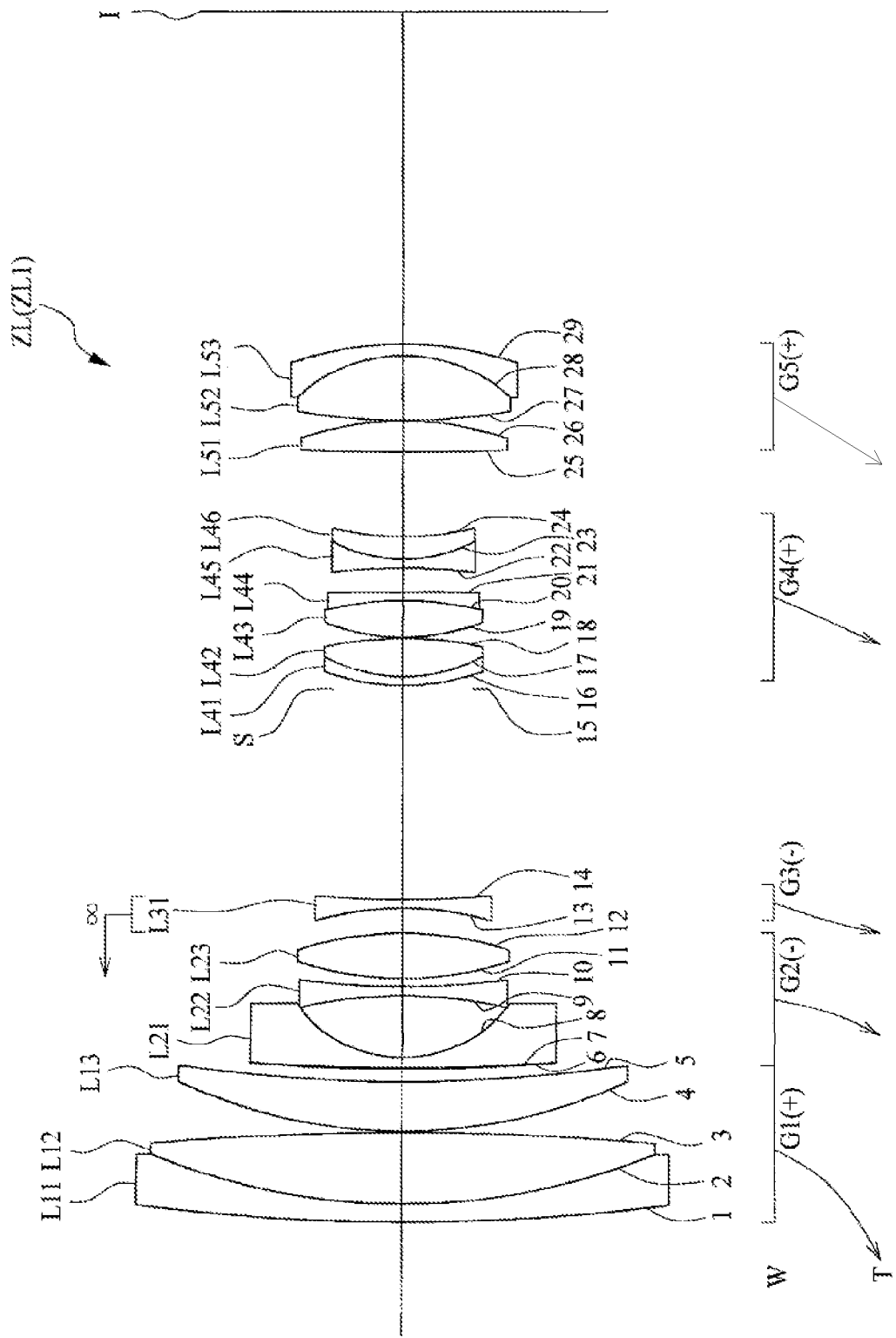
FIG. 1 is a cross-sectional view depicting a lens configuration of a variable power optical system according to Example 1.

Embodiment 1 of the present invention will now be described with reference to the drawings. As shown in FIG. 1, a variable power optical system ZL according to Embodiment 1 includes, in order from an object: a first lens group G1 having positive refractive power; a second lens group G2 having negative refractive power; a third lens group G3 having negative refractive power; a fourth lens group G4 having positive refractive power; and a fifth lens group G5 having positive refractive power. In this variable power optical system ZL, upon zooming from a wide-angle end state to a telephoto end state, the distance between the first lens group G1 and the second lens group G2 increases, the distance between the second lens group G2 and the third lens group G3 changes, the distance between the third lens group G3 and the fourth lens group G4 decreases, and the distance between the fourth lens group G4 and the fifth lens group G5 changes, whereby aberrations upon zooming can be corrected well.

In this variable power optical system ZL, if, upon zooming from the wide-angle end state to the telephoto end state, the distance between the first lens group G1 and the second lens group G2 is increased, and the distance between the third lens group G3 and the fourth lens group G4 is decreased, an ×5 or higher zoom ratio can be obtained. Further, if the first lens group G1 is moved toward the object upon zooming from the wide-angle end state to the telephoto end state, the total lens length can be decreased in the wide-angle end state, and the effective diameter of the first lens group G1 can be reduced, and as a result, the variable power optical system ZL can be downsized.

In this variable power optical system ZL, if the third lens group G3 is moved in the optical axis direction upon focusing from an object at infinity to an object at a close distance, the change of the size of the image upon focusing can be minimized.

In this variable power optical system ZL, it is preferable that the following conditional expression (1) is satisfied.

$$1.10 < f1/(-f2) < 2.00 \qquad (1)$$

where f1: focal length of the first lens group G1 f2: focal length of the second lens group G2.

The conditional expression (1) specifies an appropriate ratio between the focal length of the first lens group G1 and the focal length of the second lens group G2. By satisfying the conditional expression (1), the variable power optical system ZL according to Embodiment 1 can decrease in the total lens length and the effective diameter of the first lens group G1, and can correct various aberrations well, such as distortion, curvature of field and spherical aberration. If the lower limit value of the conditional expression (1) is not reached, the refractive power of the first lens group G1 increases, and it becomes difficult to correct various aberrations well, including spherical aberration. By setting the lower limit value of the conditional expression (1) to 1.20, the effect of the invention can be demonstrated with higher certainty. If the upper limit value of the conditional expression (1) is exceeded, on the other hand, the refractive power of the first lens group G1 decreases, and it becomes difficult to decrease the total lens length and the effective diameter of the first lens group G1. By setting the upper limit value of the conditional expression (1) to 1.90, the effect of the invention can be demonstrated with higher certainty.

In the variable power optical system ZL according to Embodiment 1, it is preferable that, upon zooming from the wide-angle end state to the telephoto end state, the fourth lens group G4 and the fifth lens group G5 move toward the object, the distance between the second lens group G2 and the third lens group G3 increases, and the distance between the fourth lens group G4 and the fifth lens group G5 decreases. By this configuration, the aberrations upon zooming from the wide-angle end state to the telephoto end state can be corrected well, and an ×5 or higher zoom ratio can be obtained with higher certainty.

In this variable power optical system ZL, it is preferable that the following conditional expression (2) is satisfied.

$$0.990 < (A \times B)/(C \times D) < 1.013 \quad (2)$$

where
$A = f3 \times (1-\beta 3w)^2 \times (1+\beta 3w) \times \beta bw^2 - \Delta \times \beta 3w^2$
$B = fbw \times (1-\beta bw) + \Delta$
$C = f3 \times (1-\beta 3w)^2 \times (1+\beta 3w) \times \beta bw^2 - \Delta \times \beta 3w$
$D = fbw \times (1-\beta bw) + \Delta/\beta bw$
$\Delta = Ymax/50$
$\beta 3w$: imaging magnification of the third lens group G3 in the wide-angle end state
$\beta bw$: composite imaging magnification of the fourth lens group G4 and later lens groups in the wide-angle end state
Ymax: maximum image height
f3: focal length of the third lens group G3
fbw: composite focal length of the fourth lens group G4 and later lens groups in the wide-angle end state.

The conditional expression (2) specifies a change of the size of the image in the wide-angle end state upon performing focusing by moving the third lens group G3 in the optical axis direction. In concrete terms, the conditional expression (3) specifies a ratio of the focal length of the third lens group G3 when defocusing is performed by a 1/50 amount of the maximum image height in the wide-angle end state. By satisfying the conditional expression (2), the variable power optical system ZL according to Embodiment 1 can decrease the change of the size of the image upon focusing in the wide-angle end state to an unrecognizable level. If the upper limit value of the conditional expression (2) is exceeded or if the lower limit value thereof is not reached, the change of the size of the image upon focusing increases and tends to stand out. By setting the lower limit value of the conditional expression (2) to 0.995, the effect of the invention can be demonstrated with higher certainty. Further, by setting the upper limit value of the conditional expression (2) to 1.010, the effect of the invention can be demonstrated with higher certainty.

By the above configuration, a variable power optical system ZL for minimizing the change of the size of the image upon focusing can be implemented.

In this variable power optical system ZL, it is preferable that the following conditional expression (3) is satisfied.

$$0.35 < f3/f2 < 0.90 \quad (3)$$

where
f2: focal length of the second lens group G2
f3: focal length of the third lens group G3.

The conditional expression (3) specifies an appropriate focal length of the third lens group G3 with respect to the focal length of the second lens group G2. By satisfying the conditional expression (3), the variable power optical system ZL according to Embodiment 1 can minimize the change of the size of the image upon focusing, and the aberration change upon focusing can be corrected well. If the lower limit value of the conditional expression (3) is not reached, the refractive power of the third lens group G3 increases, and the change of the size of the image upon focusing increases. By setting the lower limit value of the conditional expression (3) to 0.41, the effect of the invention can be demonstrated with higher certainty. If the upper limit value of the conditional expression (3) is exceeded, on the other hand, the refractive power of the third lens group G3 decreases, and the moving distance of the third lens group G3 upon focusing increases. As a result, changes of various aberrations, including the curvature of field, upon focusing increases. By setting the upper limit value of the conditional expression (3) to 0.63, the effect of the invention can be demonstrated with higher certainty.

In this variable power optical system ZL, it is preferable that the following conditional expression (4) is satisfied.

$$3.50 < f1/fw < 5.50 \quad (4)$$

where
fw: focal length of the variable power optical system ZL in the wide-angle end state
f1: focal length of the first lens group G1.

The conditional expression (4) prescribes an appropriate focal length of the first lens group G1 with respect to the focal length of the variable power optical system ZL in the wide-angle end state. By satisfying the conditional expression (4), the variable power optical system ZL according to Embodiment 1 can decrease the total lens length and the effective diameter of the first lens group G1, and can correct various aberrations well, such as distortion, curvature of field and spherical aberration. If the lower limit value of the conditional expression (4) is not reached, the refractive power of the first lens group G1 increases and it becomes difficult to correct various aberrations well, including distortion, curvature of field and spherical aberration. By setting the lower limit value of the conditional expression (4) to 3.80, the effect of the invention can be demonstrated with higher certainty. If the upper limit value of the conditional expression (4) is exceeded, on the other hand, the refractive power of the first lens group G1 decreases, and it becomes difficult to decrease the total lens length and the effective diameter of the first lens group G1. By setting the upper limit value of the conditional expression (4) to 5.10, the effect of the invention can be demonstrated with higher certainty.

In the variable power optical system ZL according to Embodiment 1, the fourth lens group G4 and the fifth lens group G5 have a structure to be approximately afocal in the wide-angle end state, and the distance between each lens group is decreased upon zooming from the wide-angle end state to the telephoto end state, whereby various aberrations can be corrected well throughout the wide-angle end state to the telephoto end state. The focal length of the fourth lens group G4 and that of the fifth lens group G5, and the air distance between the fourth lens group G4 and the fifth lens group G5 should preferably satisfy the conditions described herein below.

In this variable power optical system ZL, it is preferable that the following conditional expression (5) is satisfied.

$$0.72 < f4/f5 < 1.45 \quad (5)$$

where
f4: focal length of the fourth lens group G4
f5: focal length of the fifth lens group G5.

The conditional expression (5) specifies an appropriate ratio between the focal length of the fourth lens group G4 and the focal length of the fifth lens group G5. By satisfying the conditional expression (5), the variable power optical system ZL according to Embodiment 1 can correct curvature of field, distortion and spherical aberration well. If the lower limit value of the conditional expression (5) is not reached, the refractive power of the fourth lens group G4 becomes higher than the refractive power of the fifth lens group G5, which makes it difficult to correct various aberrations, including spherical aberration. By setting the lower limit value of the conditional expression (5) to 0.80, the effect of the invention can be demonstrated with higher certainty. If the upper limit value of the conditional expression (5) is exceeded, on the other hand, the refractive power of the fourth lens group G4 becomes lower than the refractive power of the fifth lens group G5, which makes it difficult to correct various aberrations, including curvature of field. By setting the upper limit value of the conditional expression (5) to 1.45, the effect of the invention can be demonstrated with higher certainty.

In this variable power optical system ZL, it is preferable that the following conditional expression (6) is satisfied.

$$0.15 < (D45w - D45t)/fw < 0.40 \quad (6)$$

where
D45w: distance between the fourth lens group G4 and the fifth lens group G5 in the wide-angle end state
D45t: distance between the fourth lens group G4 and the fifth lens group G5 in the telephoto end state
fw: focal length of the variable power optical system ZL in the wide-angle end state.

The conditional expression (6) specifies an appropriate range of difference between the air distance of the fourth lens group G4 and the fifth lens group G5 in the wide-angle end state and that in the telephoto end state. By satisfying the conditional expression (6), the variable power optical system ZL according to Embodiment 1 can minimize the change of curvature of field upon zooming from the wide-angle end state to the telephoto end state, and can decrease the total lens length. If the lower limit value of the conditional expression (6) is not reached, the difference between the air distance of the fourth lens group G4 and the fifth lens group G5 in the wide-angle end state and that in the telephoto end state becomes small, and it becomes difficult to correct the change of curvature of field well, upon zooming from the wide-angle end state to the telephoto end state. By setting the lower limit value of the conditional expression (6) to 0.15, the effect of the invention can be demonstrated with higher certainty. If the upper limit value of the conditional expression (6) is exceeded, the difference between the air distance of the fourth lens group G4 and the fifth lens group G5 in the wide-angle end state and that in the telephoto end state increases, and the total lens length in the wide-angle end state increases. By setting the upper limit value of the conditional expression (6) is 0.34, the effect of the invention can be demonstrated with higher certainty.

A camera, which is an optical apparatus including the variable power optical system ZL according to Embodiment 1, will be described with reference to FIG. 10. This camera 1 is an interchangeable lens type mirrorless camera that includes the variable power optical system ZL according to Embodiment 1 as an image capturing lens 2. In this camera 1, the light from an object (not illustrated) is collected by the image capturing lens 2, and forms an object image on an image plane of the imaging unit 3 via an OLPF (optical low-pass filter), which is not illustrated. Then the object image is photo-electric converted by a photo-electric conversion element disposed in the imaging unit 3, whereby the image of the object is generated. This image is displayed on an EVF (electronic view finder) 4 disposed in the camera 1. Thereby the user can view the object via the EVF 4.

If a release button (not illustrated) is pressed by the user, the photo-electric converted image is stored in a memory (not illustrated) by the imaging unit 3. Thus the user can capture the image of the object using this camera 1. In Embodiment 1, an example of the mirrorless camera was described, but an effect similar to the case of this camera 1 can be demonstrated even when the variable power optical system ZL according to Embodiment 1 is included in a single lens reflex type camera, which has a quick return mirror in the camera main unit and views the object using a finder optical system.

Thus the optical apparatus according to Embodiment 1, which includes the variable power optical system ZL having the above mentioned configuration, can minimize the change of the size of the image upon focusing, and can implement an optical apparatus which can ideally control aberration fluctuation upon zooming and focusing.

The following content can be adopted within a range where the optical performance is not diminished.

In Embodiment 1, the variable power optical system ZL constituted by five lens groups was shown, but the above mentioned configuration conditions can also be applied to a configuration using a different number of lens groups, such as six lens groups or seven lens groups. A lens or a lens group may be added to the configuration on the side closest to the object, or a lens or a lens group may be added to the configuration on the side closest to the image. "Lens group" refers to a portion having at least one lens isolated by air spaces which change upon zooming.

A single lens group or plurality of lens groups or a partial lens group may be designed to be a focusing lens group, which performs focusing from an object at infinity to an object at a close distance by moving in the optical axis direction. This focusing lens group can be applied to auto-focus, and is suitable for driving a motor for autofocusing (driving using an ultrasonic motor or the like). It is particularly preferable that the third lens group G3 is designed to be the focusing lens group as mentioned above.

A lens group or a partial lens group may be designed to be a vibration-isolating lens group, which corrects image blurs generated by camera shake, by moving the lens group or the partial lens group so as to have a component in a direction orthogonal to the optical axis or rotating (oscillating) the lens group or the partial lens group in an in-plane direction that includes the optical axis. It is particularly preferable that at least a part of the fourth lens group G4 is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error generated in the processing, assembly and adjustment can be prevented. Even if the image plane is shifted, deterioration of the drawing performance is not great, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or a plastic lens.

It is preferable that the aperture stop S is disposed near the fourth lens group G4, but the role of the aperture stop may be substituted by the frame of the lens without disposing a separate member as the aperture stop.

Each lens surface may be coated with an anti-reflection film, which has high transmittance in a wide wavelength region, in order to decrease flares and ghosts, and implement high optical performance with high contrast.

The zoom ratio of the variable power optical system ZL of Embodiment 1 is about 5 to 15.

Figure 11:
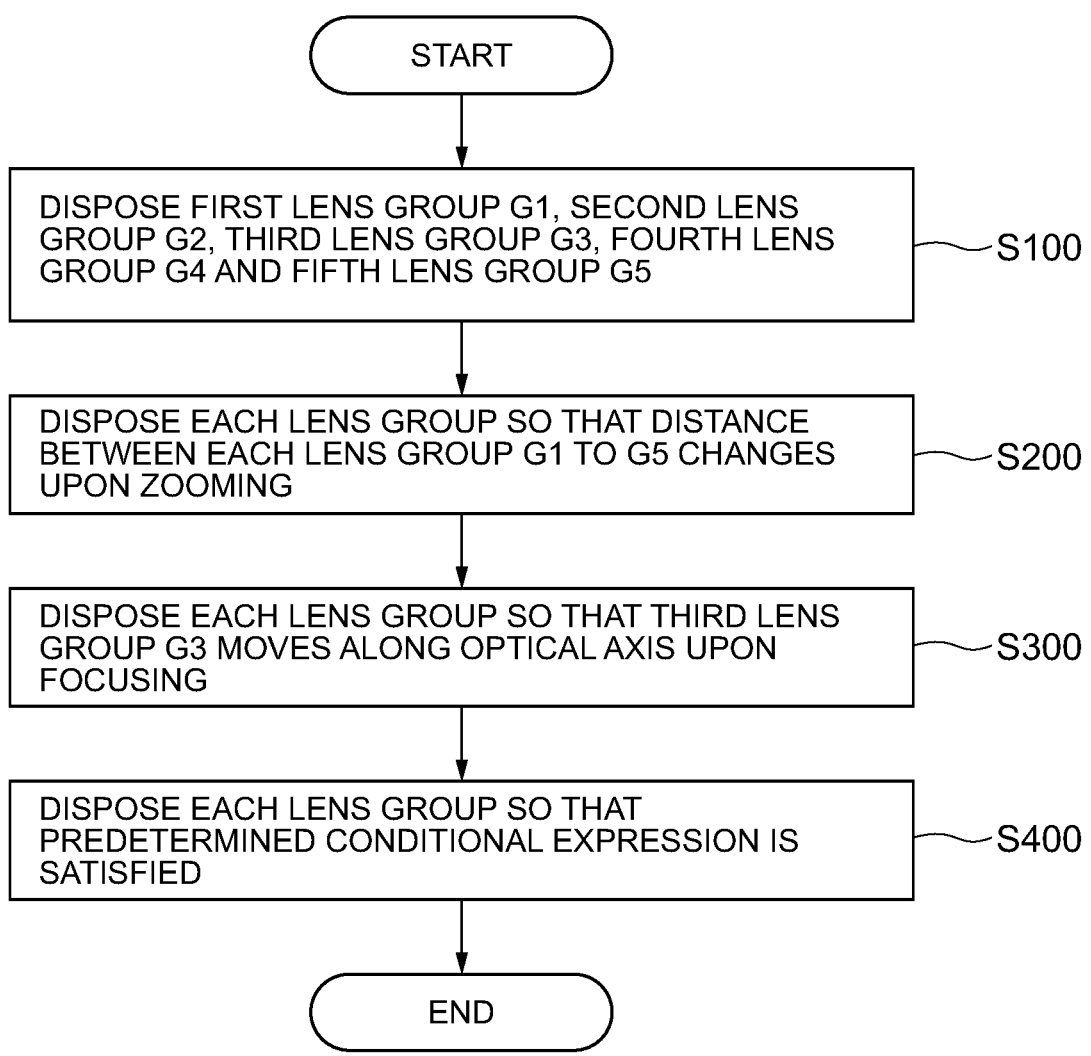
FIG. 11 is a flow chart depicting a method for manufacturing the variable power optical system according to Example 1, 2 or 3.

An outline of a method for manufacturing the variable power optical system ZL according to Embodiment 1 will now be described with reference to FIG. 11. Each lens is disposed to prepare the first to fifth lens groups G1 to G5 respectively (step S100). Each lens group is disposed so that, upon zooming from the wide-angle end state to the telephoto end state, the distance between the first lens group G1 and the second lens group G2 changes, the distance between the second lens group G2 and the third lens group G3 changes, the distance between the third lens group G3 and the fourth lens group G4 changes, and the distance between the fourth lens group G4 and the fifth lens group G5 changes (step S200). Each lens group is disposed so that the third lens group G3 moves in the optical axis direction upon focusing from an object at infinity to an object at a close distance (step S300). Then each lens group G1 to G6 is disposed so as to satisfy the above mentioned conditional expression (1) (step S400).

As shown in FIG. 1, which is a concrete example of Embodiment 1, the first lens group G1 is prepared by disposing, in order from the object: a cemented positive lens where a negative meniscus lens L11 having a convex surface facing the object and a biconvex positive lens L12 are cemented; and a positive meniscus lens L13 having a convex surface facing the object. The second lens group G2 is prepared by disposing: a negative meniscus aspherical negative lens L21 having a convex surface facing the object; a biconcave negative lens L22; and a biconvex positive lens L23. The third lens group G3 is prepared by disposing a concave aspherical negative lens L31. The fourth lens group G4 is prepared by disposing: a cemented positive lens where a negative meniscus lens L41 having a convex surface facing the object and a biconvex positive lens L42 are cemented; a cemented positive lens where a biconvex positive lens L43 and a negative meniscus lens L44 having a concave surface facing the object are cemented; and a cemented negative lens where a biconcave aspherical negative lens L45 and a positive meniscus lens L46 having a convex surface facing the object are cemented. The fifth lens group G5 is prepared by disposing: a biconvex positive lens L51; and a cemented positive lens where a biconvex positive lens L52 and a negative meniscus lens L53 having a concave surface facing the object are cemented. Each lens group prepared like this is disposed according to the above mentioned procedure, whereby the variable power optical system ZL is manufactured.

Examples of Embodiment 1

Figure 7:
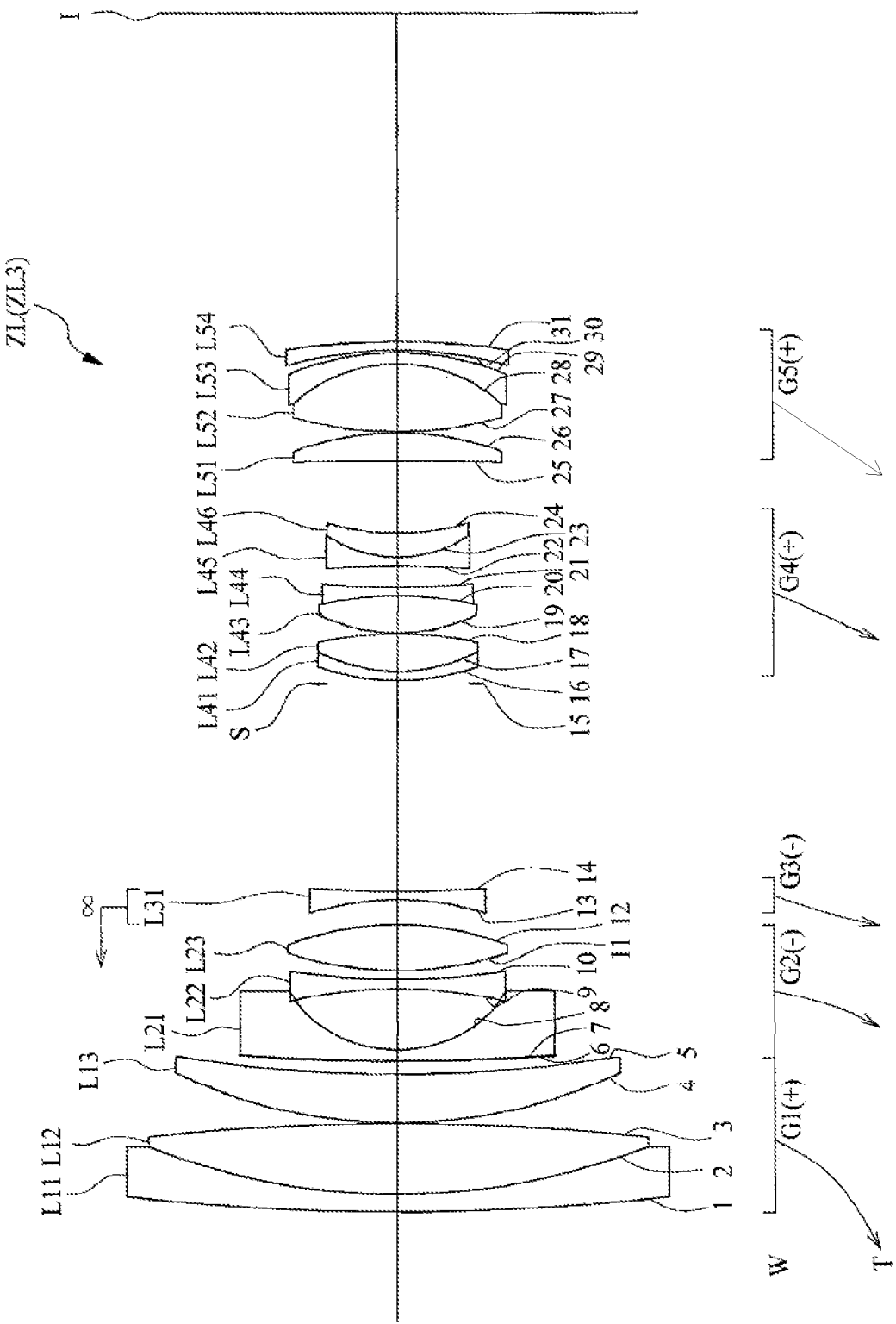
FIG. 7 is a cross-sectional view depicting a lens configuration of a variable power optical system according to Example 3.

Each example of this embodiment will now be described with reference to the drawings. FIG. 1, FIG. 4 and FIG. 7 are cross-sectional views depicting the configuration and refractive power allocation of the variable optical system ZL (ZL1 to ZL3) according to each example. In the lower part of the cross-sectional views of the variable power optical systems ZL1 to ZL3, the moving direction of each lens group G1 to G5, along the optical axis upon zooming from the wide-angle end state (W) to the telephoto end state (T), is indicated by an arrow mark.

In all the examples to be described herein below, an aspherical surface is expressed by the following expression (a), where y denotes a height in the direction orthogonal to the optical axis, S(y) denotes a distance (sag) along the optical axis from the tangential plane at the vertex of each aspherical surface to the position on the aspherical surface at height y, r denotes a radius of curvature (paraxial radius of curvature) of the reference spherical surface, K denotes a conical coefficient, and An denotes an aspherical coefficient at degree n. In the following examples, "E-n" indicates "$\times 10^{-n}$".

$$S(y)=(y^2/r)/\{1+(1-K\times y^2/r^2)^{1/2}\}+A4\times y^4+A6\times y^6+A8\times y^8+A10\times y^{10} \qquad (a)$$

In all the examples to be described herein below, the aspherical coefficient at degree 2 (A2) is 0. In the tables of all the examples to be described herein below, * is attached at the right side of the surface number if the surface is aspherical.

EXAMPLE 1

FIG. 1 shows a configuration of a variable power optical system ZL1 according to Example 1. The variable power optical system ZL1 shown in FIG. 1 includes, in order from an object: a first lens group G1 having positive refractive power; a second lens group G2 having negative refractive power; a third lens group G3 having negative refractive power; a fourth lens group G4 having positive refractive power; and a fifth lens group G5 having positive refractive power.

In the variable power optical system ZL1, the first lens group G1 is constituted by, in order from the object: a cemented positive lens where a negative meniscus lens L11 having a convex surface facing the object and a biconvex positive lens L12 are cemented; and a positive meniscus lens L13 having a convex surface facing the object. The second lens group G2 is constituted by, in order from the object: a negative meniscus aspherical negative lens L21 having a convex surface facing the object; a biconcave negative lens L22; and a biconvex positive lens L23. The aspherical negative lens L21 is a second lens group G2 has a thin aspherical plastic resin layer on the object side lens surface. The third lens group G3 is constituted by a biconcave aspherical negative lens L31. The object side lens surface of the aspherical negative lens L31 of the third lens group G3 is aspherical. The fourth lens group G4 is constituted by, in order from the object: a cemented positive lens where a negative meniscus lens L41 having a convex surface facing the object and a biconvex positive lens L42 are cemented; a cemented positive lens where a biconvex positive lens L43 and a negative meniscus lens L44 having a concave surface facing the object are cemented; and a cemented negative lens where a biconcave aspherical negative lens L45 and a positive meniscus lens L46 having a convex surface facing the object are cemented. The object side lens surface of the aspherical negative lens L45 of the fourth lens group G4 is aspherical. The fifth lens group G5 is constituted by, in order from the object: a biconvex positive lens L51; and a cemented positive lens where a biconvex positive lens L52 and a negative meniscus lens L53 having a concave surface facing the object are cemented.

In the variable power optical system ZL1 according to Example 1, upon zooming from the wide-angle end state to the telephoto end state, the first lens group G1 to the fifth lens group G5 move toward the object respectively, so that the air distance between the first lens group G1 and the second lens group G2 increases, the air distance between the second lens group G2 and the third lens group G3 increases, the air distance between the third lens group G3 and the fourth lens group G4 decreases, and the air distance between the fourth lens group G4 and the fifth lens group G5 decreases. An aperture stop S is disposed between the third lens group and the fourth lens group, and the aperture stop S moves together with the fourth lens group G4 upon zooming.

In the variable power optical system ZL1 according to Example 1, focusing from an object at a long distance to an object at a close distance is performed by moving the third lens group G3 toward the object.

Table 1 shows the data values of the variable power optical system ZL1 according to Example 1. In [General Data] in Table 1, f indicates a focal length of the variable power optical system, FNO indicates an F number, 2ω indicates an angle of view, Ymax indicates a maximum image height, and TL indicates a total length. The total length TL here indicates a distance on the optical axis from the first surface of the lenses to the image plane I upon focusing on infinity. The first column m in [Lens Data] indicates the sequential number assigned to the lens surface (surface number) counted from the object side along the light traveling direction, the second column r indicates a radius of curvature of each lens surface, the third column d indicates a distance from each optical surface to the next optical surface on the optical axis (surface distance), and the fourth column vd and the fifth column nd indicate an Abbe number and a refractive index at d-line (λ=587.6 nm). The radius of curvature ∞ indicates a plane, and the refractive index of air 1.00000 is omitted. The surface numbers 1 to 29 in Table 1 correspond to the numbers 1 to 29 in FIG. 1. The [Lens Group Focal Length] indicates the first surface and the focal length of the first to fifth lens group G1 to G5 respectively.

For all the data values, "mm" is normally used as a unit of focal length f, radius of curvature r, surface distance d and other lengths, but unit is not limited to "mm" since an equivalent optical performance is acquired even if an optical system is proportionally expanded or proportionally reduced. The description on the symbols and the description on the data table are the same for the other examples herein below.

TABLE 1

[General Data]

Zoom ratio = 7.41

|  | Wide-angle end state | Intermediate focal length state | Telephoto end state |
|---|---|---|---|
| f = | 18.5~ | 69.8~ | 137.1 |
| FNO = | 3.60~ | 5.48~ | 5.92 |
| 2ω = | 78.1~ | 22.67~ | 11.62 |
| Ymax = | 14.25~ | 14.25~ | 14.25 |
| TL = | 138.32~ | 181.60~ | 200.88 |

TABLE 1-continued

[General Data]

[Lens Data]

| m | r | d | nd | vd |
|---|---|---|---|---|
| Object plane | ∞ | | | |
| 1 | 211.4444 | 2.000 | 1.846660 | 23.78 |
| 2 | 65.7391 | 8.100 | 1.593190 | 67.90 |
| 3 | −279.8993 | 0.100 | | |
| 4 | 52.3714 | 5.642 | 1.816000 | 46.62 |
| 5 | 145.4440 | d5 | | |
| 6* | 200.0000 | 0.150 | 1.553890 | 38.23 |
| 7 | 209.8495 | 1.200 | 1.772499 | 49.61 |
| 8 | 13.1450 | 7.067 | | |
| 9 | −44.1409 | 1.000 | 1.882997 | 40.76 |
| 10 | 73.4990 | 0.972 | | |
| 11 | 33.3323 | 5.131 | 1.846660 | 23.78 |
| 12 | −33.7584 | d12 | | |
| 13* | −30.5788 | 1.000 | 1.816000 | 46.62 |
| 14 | 91.7167 | d14 | | |
| 15 | ∞ | 0.400 | | Aperture stop S |
| 16 | 23.1362 | 1.000 | 1.902650 | 35.70 |
| 17 | 16.0830 | 4.400 | 1.528284 | 56.95 |
| 18 | −34.2215 | 0.100 | | |
| 19 | 21.5394 | 4.256 | 1.497820 | 82.51 |
| 20 | −30.0815 | 1.000 | 1.903660 | 31.27 |
| 21 | −404.9013 | 2.791 | | |
| 22* | −56.4055 | 1.000 | 1.729157 | 54.66 |
| 23 | 14.6457 | 2.576 | 1.850260 | 32.35 |
| 24 | 30.4317 | d24 | | |
| 25 | 306.4339 | 3.550 | 1.487490 | 70.40 |
| 26 | −29.9125 | 0.100 | | |
| 27 | 62.6797 | 7.421 | 1.487490 | 70.40 |
| 28 | −15.5000 | 1.301 | 1.882997 | 40.76 |
| 29 | −34.7471 | BF | | |
| Image plane | ∞ | | | |

[Lens Group Focal Length]

| Lens group | First surface | Focal length |
|---|---|---|
| First lens group | 1 | 80.000 |
| Second lens group | 6 | −54.309 |
| Third lens group | 13 | −28.001 |
| Fourth lens group | 16 | 41.026 |
| Fifth lens group | 25 | 39.356 |

In this variable power optical system ZL1 according to Example 1, the lens surfaces of Surface 6, Surface 13 and Surface 22 are aspherical. Table 2 shows aspherical data, that is, the values of the conical coefficient K and each aspherical coefficient A4 to A10.

TABLE 2

[Aspherical Data]

| | K | A4 | A6 | A8 | A10 |
|---|---|---|---|---|---|
| Surface 6 | 22.2541 | 2.37311E−06 | −3.87675E−09 | −4.25245E−11 | 9.37969E−14 |
| Surface 13 | −0.1061 | 9.88612E−07 | −4.78288E−08 | 1.14604E−09 | −6.39255E−12 |
| Surface 22 | 0.5764 | 4.90141E−06 | 6.98139E−08 | −4.01292E−10 | 0.00000E+00 |

In the variable power optical system ZL1 according to Example 1, the axial air distance d5 between the first lens group G1 and the second lens group G2, the axial air distance d12 between the second lens group G2 and the third lens group G3, the axial air distance d14 between the third lens group G3 and the fourth lens group G4, the axial air distance d24 between the fourth lens group G4 and the fifth lens group G5, and the back focus BF change upon zooming, as mentioned above. Table 3 shows the variable distance and the back focus value in each focal length state of the wide-angle end state, the intermediate focal length state and the telephoto end state upon focusing on infinity and upon focusing on a close point. The back focus BF indicates a distance on the optical axis from the lens surface closest to the image (surface 29 in FIG. 1) to the image plane I. This description is the same for the other examples herein below.

TABLE 3

[Variable Distance Data]

| | Focusing on infinity | | | Focusing on close point | | |
|---|---|---|---|---|---|---|
| | Wide-angle end | Intermediate | Telephoto end | Wide-angle end | Intermediate | Telephoto end |
| f | 18.5 | 69.8 | 137.1 | 18.5 | 69.8 | 137.1 |
| d5 | 1.500 | 26.470 | 40.393 | 1.500 | 26.470 | 40.393 |
| d12 | 2.800 | 4.647 | 7.254 | 2.397 | 4.325 | 6.749 |
| d14 | 24.136 | 7.594 | 3.000 | 24.539 | 7.917 | 3.505 |
| d24 | 9.609 | 5.561 | 5.000 | 9.609 | 5.561 | 5.000 |
| BF | 38.02 | 75.07 | 82.97 | 38.02 | 75.07 | 82.97 |

Table 4 shows each conditional expression correspondence value of the variable power optical system ZL1 according to Example 1. Table 4 shows the value of each focal length in the wide-angle end state, the intermediate focal length state and the telephoto end state, for fb (composite focal length of the fourth lens group G4 and later lens groups), β3 (imaging magnification of the third lens group G3), and βb (composite imaging magnification of the fourth lens group G4 and later lens groups) respectively. A, B, C and D are variables shown in the above mentioned conditional expression (1), fw denotes a focal length of the variable power optical system in the wide-angle end state, f1 denotes a focal length of the first lens group G1, f2 denotes a focal length of the second lens group G2, f3 denotes a focal length of the third lens group G3, f4 denotes a focal length of the fourth lens group G4, f5 denotes a focal length of the fifth lens group G5, D45w denotes a distance between the fourth lens group G4 and the fifth lens group G5 in the wide-angle end state, and D45t denotes a distance between the fourth lens group G4 and the fifth lens group G5 in the telephoto end state. This description on the reference symbols is the same for the other examples herein below.

TABLE 4

| | Wide-angle end state | Intermediate focal length state | Telephoto end state |
|---|---|---|---|
| fb | 32.415 | 29.979 | 29.670 |
| β3 | 0.1334 | 0.0616 | −0.0603 |
| βb | −1.0824 | −2.3284 | −2.6091 |

[Conditional Expression Correspondence Value]

| | |
|---|---|
| (1) | f1/(−f2) = 1.437 |
| (2) | (A × B)/(C × D) = 1.0070 |
| (3) | f3/f2 = 0.516 |
| (4) | f1/fw = 4.325 |
| (5) | f4/f5 = 1.042 |
| (6) | (D45w − D45t)/fw = 0.249 |

Thus the variable power optical system ZL1 according to Example 1 satisfies all the conditional expressions (1) to (6).

Figure 2B:
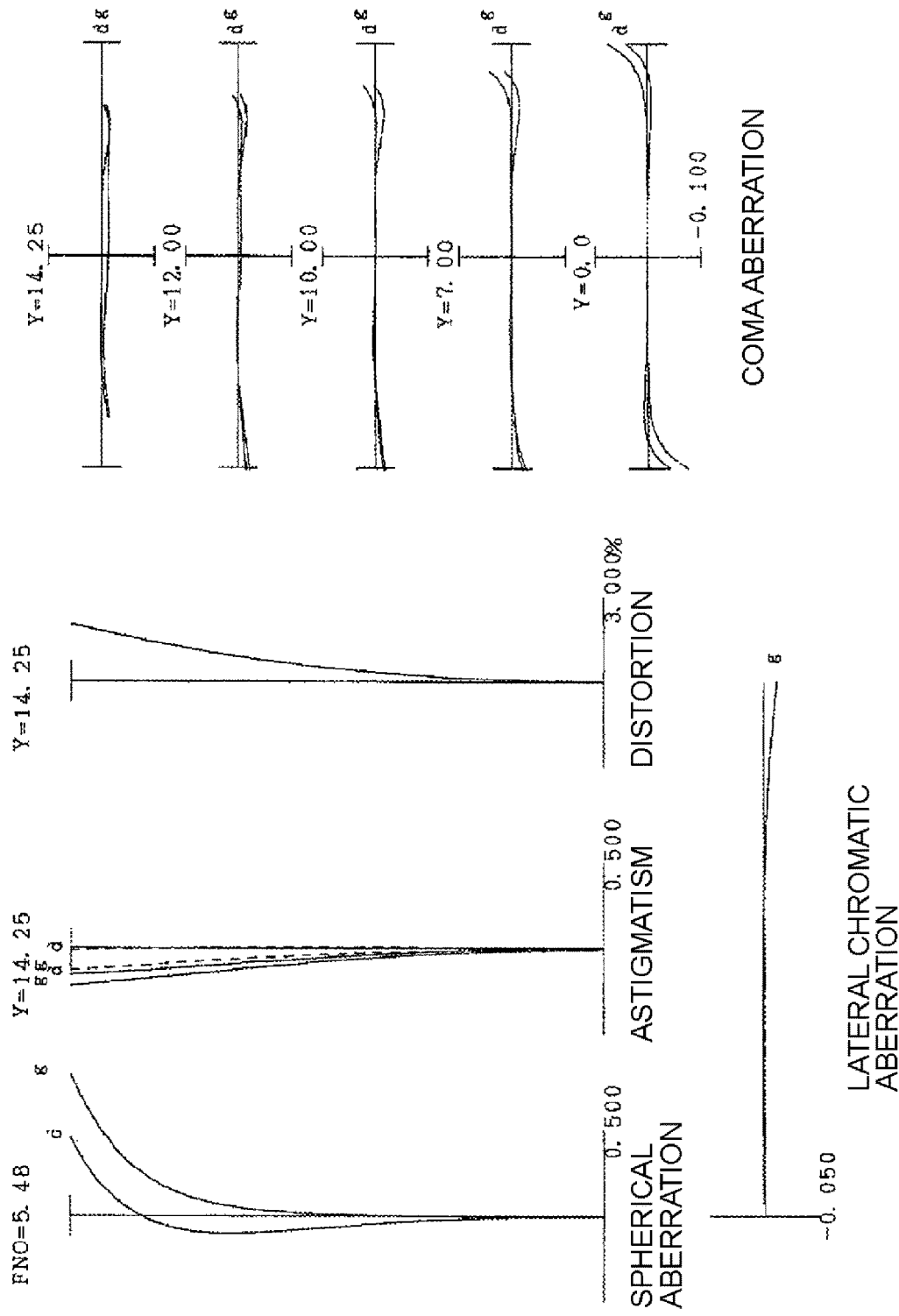
Figure 3A:
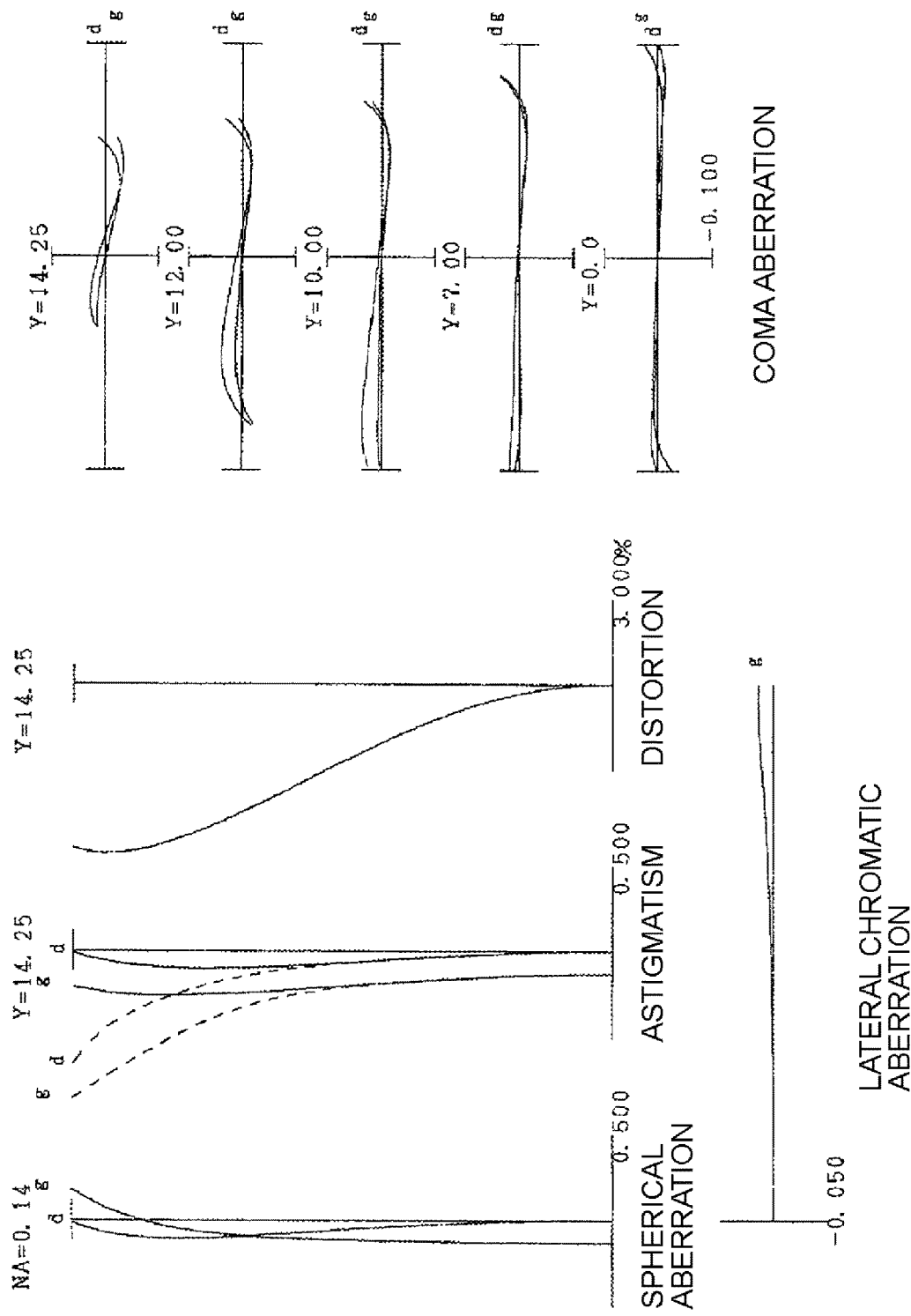
Figure 3B:
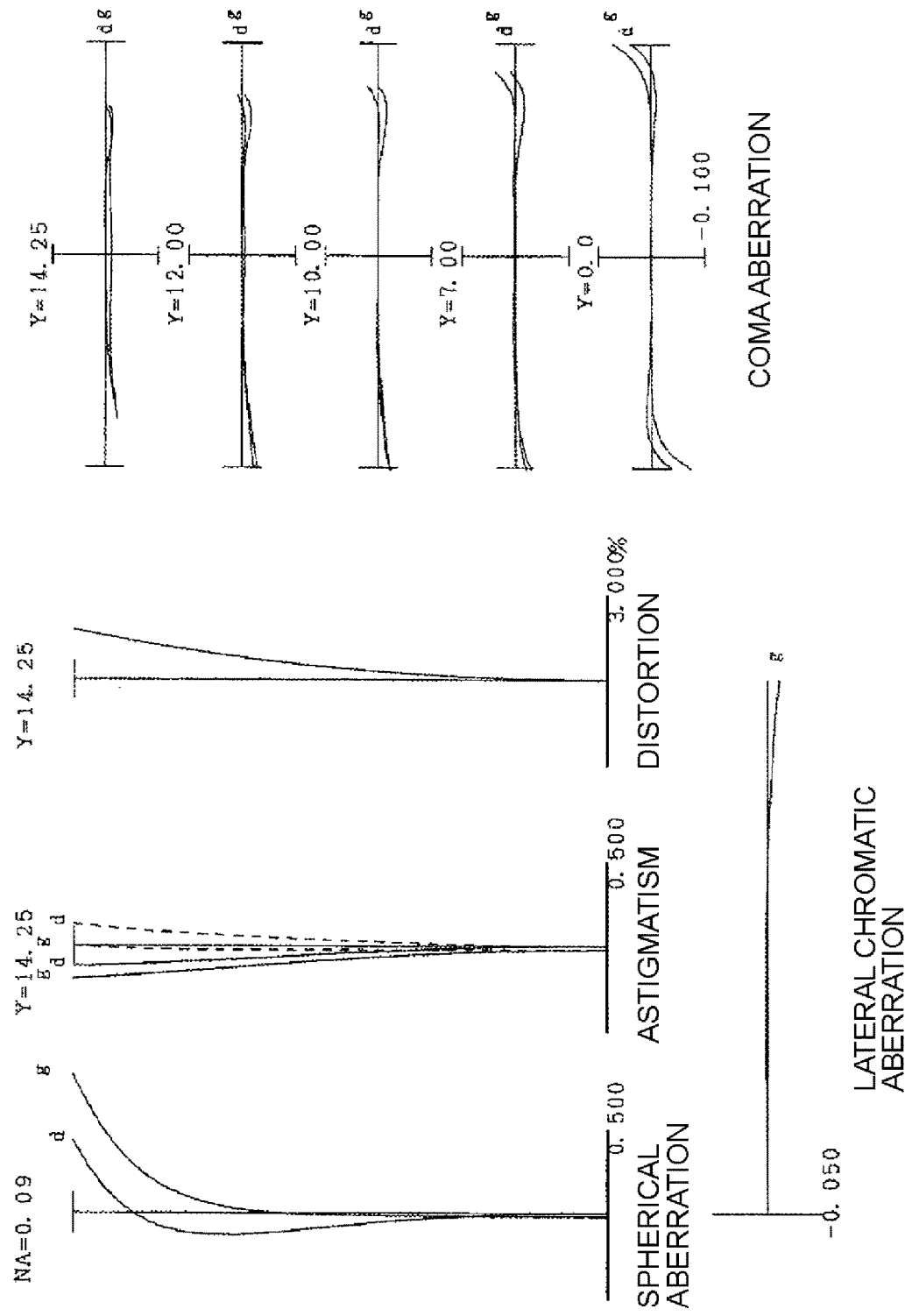

FIG. 2 is a set of graphs showing various aberrations of the variable power optical system ZL1 according to Example 1 upon focusing on infinity in the wide-angle end state, intermediate focal length state and telephoto end state, and FIG. 3 is a set of graphs showing various aberrations thereof upon focusing on a close point in the wide-angle end state, intermediate focal length state and telephoto end state. In each graph showing aberration, FNO indicates an F number, NA indicates a numerical aperture, and Y indicates an image height. In the graph showing spherical aberration, an F number or a value of a numerical aperture corresponding to the maximum aperture is shown, in the graphs showing astigmatism and distortion, the maximum value of the image height is shown, and in the graphs showing coma aberration, a value of each image height is shown. d indicates d-line (λ=587.6 nm) and g indicates g-line (λ=435.8 nm). In each graph showing astigmatism, the solid line indicates the sagittal image plane, and the broken line indicates the meridional image plan. The same reference symbols as this example are also used for the graphs showing aberration of the other examples herein below. As these graphs showing various aberrations clarify, the variable power optical system ZL1 according to Example 1 has excellent image forming performance, with correcting various aberrations well throughout the wide-angle end state to the telephoto end state, and also demonstrates excellent image forming performance even upon focusing on a close point.

EXAMPLE 2

FIG. 4 shows a configuration of a variable power optical system ZL2 according to Example 2. The variable power optical system ZL2 shown in FIG. 4 includes, in order from an object: a first lens group G1 having positive refractive power; a second lens group G2 having negative refractive power; a third lens group G3 having negative refractive power; a fourth lens group G4 having positive refractive power; and a fifth lens group G5 having positive refractive power.

In the variable power optical system ZL2, the first lens group G1 is constituted by, in order from the object: a cemented positive lens where a negative meniscus lens L11 having a convex surface facing the object and a biconvex positive lens L12 are cemented; and a positive meniscus lens L13 having a convex surface facing the object. The second lens group G2 is constituted by, in order from the object: a negative meniscus aspherical negative lens L21 having a convex surface facing the object; a biconcave negative lens L22; and a biconvex positive lens L23. The aspherical negative lens L21 of the second lens group G2 has a thin aspherical plastic resin layer on the object side lens surface. The third lens group G3 is constituted by a biconcave aspherical negative lens L31. The object side lens surface of the aspherical negative lens L31 of the third lens group G3 is aspherical. The fourth lens group G4 is constituted by, in order from the object: a biconvex positive lens L41; a cemented positive lens where a biconvex positive lens L42 and a negative meniscus lens L43 having a concave surface facing the object are cemented; and a cemented negative lens where a biconcave negative aspherical lens L44 and a positive meniscus lens L45 having a convex surface facing the object are cemented. The object side lens surface of the aspherical negative lens L44 of the fourth lens group G4 is aspherical. The fifth lens group G5 is constituted by, in order from the object: a positive meniscus lens L51 having a concave surface facing the object; and a cemented positive lens where a biconvex positive lens L52 and a negative meniscus lens L53 having a concave surface facing the object are cemented.

In the variable power optical system ZL2 according to Example 2, upon zooming from the wide-angle end state to the telephoto end state, the first lens group G1 to the fifth lens group G5 move toward the object respectively, so that the air distance between the first lens group G1 and the second lens group G2 increases, the air distance between the second lens group G2 and the third lens group G3 increases, the air distance between the third lens group G3 and the fourth lens group G4 decreases, and the air distance between the fourth lens group G4 and the fifth lens group G5 decreases. An aperture stop S is disposed between the third lens group G3 and the fourth lens group G4, and the aperture stop S moves together with the fourth lens group G4 upon zooming.

In the variable power optical system ZL2 according to Example 2, focusing from an object at a long distance to an object at a close distance is performed by moving the third lens group G3 toward the object.

Table 5 shows the data values of the variable power optical system ZL2 according to Example 2. The surface numbers 1 to 28 in Table 5 correspond to the numbers 1 to 28 in FIG. 4.

TABLE 5

[General Data]

Zoom ratio = 7.42

|  | Wide-angle end state | Intermediate focal length state | Telephoto end state |
|---|---|---|---|
| f = | 18.5~ | 70.5~ | 137.2 |
| FNO = | 3.58~ | 5.44~ | 5.85 |
| 2ω = | 78.1~ | 22.42~ | 11.57 |
| Ymax = | 14.25~ | 14.25~ | 14.25 |
| TL = | 139.32~ | 181.02~ | 199.97 |

TABLE 5-continued

[General Data]

[Lens Data]

| m | r | d | nd | vd |
|---|---|---|---|---|
| Object plane | ∞ | | | |
| 1 | 215.0175 | 2.000 | 1.846660 | 23.78 |
| 2 | 64.9243 | 8.100 | 1.593190 | 67.90 |
| 3 | −376.0612 | 0.100 | | |
| 4 | 53.5780 | 5.984 | 1.816000 | 46.62 |
| 5 | 179.2635 | d5 | | |
| 6* | 200.0000 | 0.150 | 1.553890 | 38.23 |
| 7 | 300.6098 | 1.200 | 1.772499 | 49.61 |
| 8 | 13.3131 | 6.828 | | |
| 9 | −69.6142 | 1.000 | 1.882997 | 40.76 |
| 10 | 52.3687 | 1.331 | | |
| 11 | 34.6867 | 5.185 | 1.846660 | 23.78 |
| 12 | −34.7377 | d12 | | |
| 13* | −38.0000 | 1.000 | 1.816000 | 46.62 |
| 14 | 57.9782 | d14 | | |
| 15 | ∞ | 0.400 | | Aperture stop S |
| 16 | 29.8741 | 3.478 | 1.541617 | 63.72 |
| 17 | −32.8953 | 0.100 | | |
| 18 | 23.2358 | 3.970 | 1.497820 | 82.51 |
| 19 | −24.0338 | 1.000 | 1.903660 | 31.27 |
| 20 | −927.0383 | 4.133 | | |
| 21* | −59.0463 | 1.000 | 1.729157 | 54.66 |
| 22 | 13.2866 | 2.719 | 1.850260 | 32.35 |
| 23 | 29.1334 | d23 | | |
| 24 | −248.1379 | 3.288 | 1.563839 | 60.68 |
| 25 | −29.4441 | 0.100 | | |
| 26 | 49.5575 | 7.799 | 1.487490 | 70.40 |
| 27 | −16.1456 | 1.301 | 1.902650 | 35.70 |
| 28 | −34.4375 | BF | | |
| Image plane | ∞ | | | |

[Lens Group Focal Length]

| Lens group | First surface | Focal length |
|---|---|---|
| First lens group | 1 | 79.998 |
| Second lens group | 6 | −60.013 |
| Third lens group | 13 | −28.000 |
| Fourth lens group | 16 | 42.588 |
| Fifth lens group | 24 | 36.790 |

In this variable power optical system ZL2 according to Example 2, the lens surfaces of Surface 6, Surface 13 and Surface 21 are aspherical. Table 6 shows aspherical data, that is, the values of the conical coefficient K and each aspherical coefficient A4 to A10.

TABLE 6

[Aspherical Data]

| | K | A4 | A6 | A8 | A10 |
|---|---|---|---|---|---|
| Surface 6 | 22.2541 | −3.64184E−06 | 8.39882E−09 | −3.74047E−11 | 7.81914E−14 |
| Surface 13 | −1.9332 | 5.71903E−06 | 1.09072E−08 | 1.92007E−10 | 2.33529E−13 |
| Surface 21 | 0.5764 | 5.28102E−06 | 3.16504E−08 | −2.35183E−10 | 0.00000E+00 |

In the variable power optical system ZL2 according to Example 2, the axial air distance d5 between the first lens group G1 and the second lens group G2, the axial air distance d12 between the second lens group G2 and the third lens group G3, the axial air distance d14 between the third lens group G3 and the fourth lens group G4, the axial air distance d23 between the fourth lens group G4 and the fifth lens group G5, and the back focus BF change upon zooming, as mentioned above. Table 7 shows the variable distance and the back focus value in each focal length state of the wide-angle end state, the intermediate focal length state and the telephoto end state upon focusing on infinity and upon focusing on a close point.

TABLE 7

[Variable Distance Data]

| | Focusing on infinity | | | Focusing on close point | | |
|---|---|---|---|---|---|---|
| | Wide-angle end | Intermediate | Telephoto end | Wide-angle end | Intermediate | Telephoto end |
| f | 18.5 | 70.5 | 137.2 | 18.5 | 70.5 | 137.2 |
| d5 | 1.500 | 26.692 | 40.261 | 1.500 | 26.692 | 40.261 |
| d12 | 2.837 | 4.356 | 7.527 | 2.416 | 4.012 | 6.987 |
| d14 | 24.771 | 7.722 | 3.000 | 25.192 | 8.065 | 3.541 |
| d23 | 10.025 | 5.509 | 5.000 | 10.025 | 5.509 | 5.000 |
| BF | 38.02 | 74.58 | 82.02 | 38.02 | 74.58 | 82.02 |

Table 8 shows each conditional expression correspondence value of the variable power optical system ZL2 according to Example 2.

TABLE 8

| | Wide-angle end state | Intermediate focal length state | Telephoto end state |
|---|---|---|---|
| fb | 33.565 | 30.604 | 30.303 |
| β3 | 0.1117 | 0.0349 | −0.0925 |
| βb | −1.0548 | −2.2679 | −2.5273 |

[Conditional Expression Correspondence Value]

| (1) | f1/(−f2) = 1.333 |
| (2) | (A × B)/(C × D) = 1.0070 |
| (3) | f3/f2 = 0.467 |
| (4) | f1/fw = 4.324 |
| (5) | f4/f5 = 1.158 |
| (6) | (D45w − D45t)/fw = 0.272 |

Thus the variable power optical system ZL2 according to Example 2 satisfies all the conditional expressions (1) to (6).

Figure 5C:
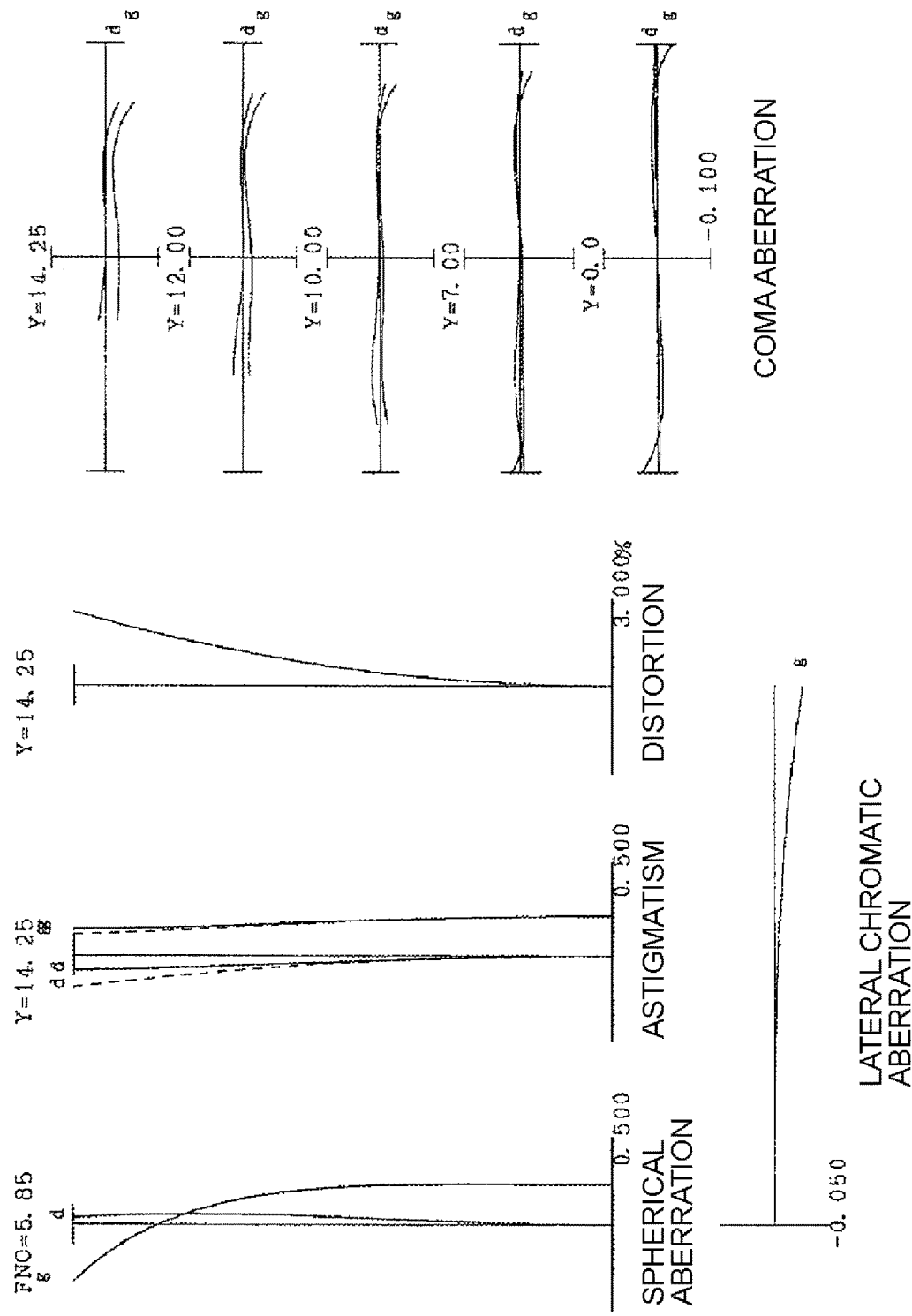
Figure 6A:
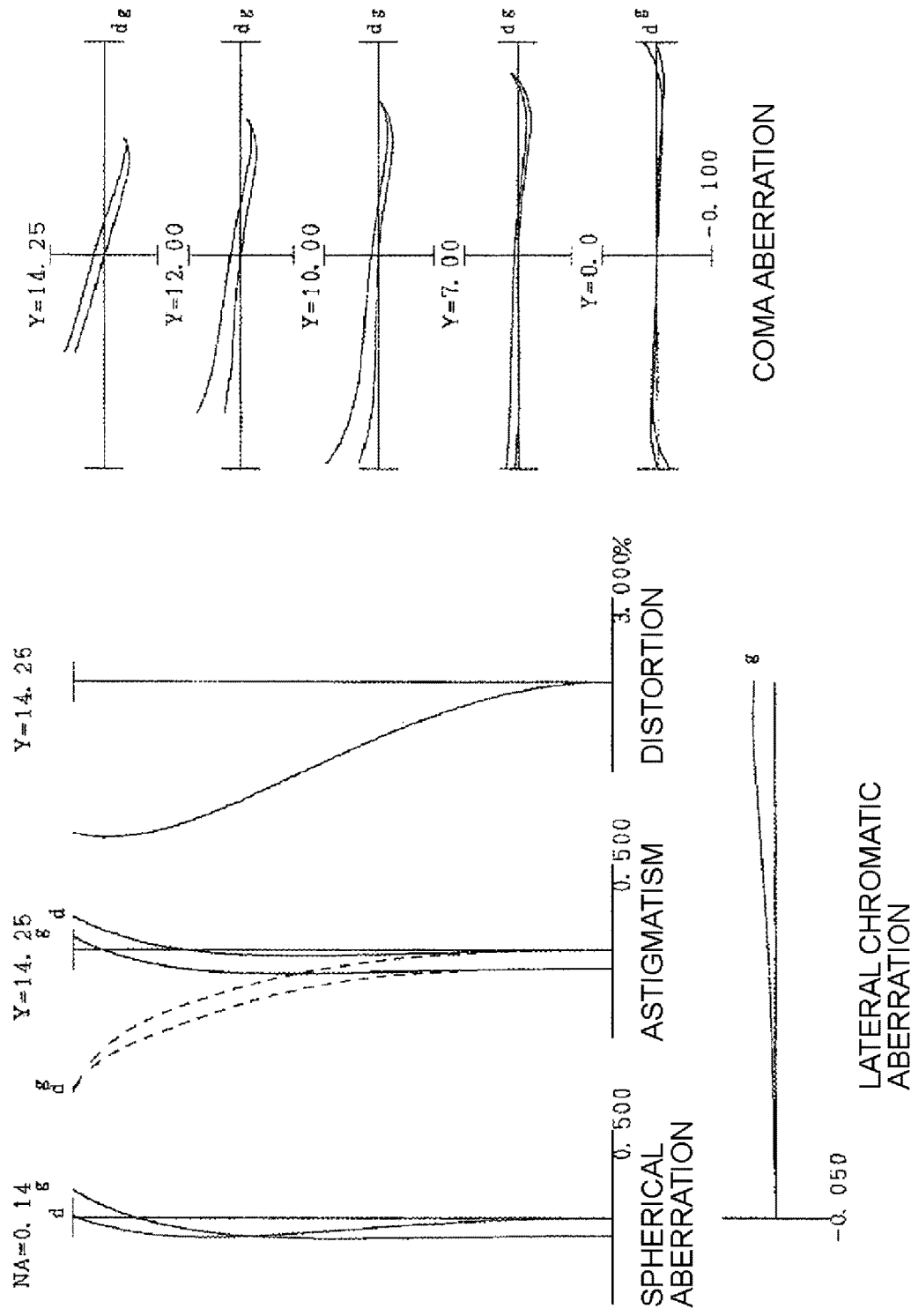
FIGS. 6A, 6B and 6C are sets of graphs showing various aberrations of the variable power optical system according to Example 2 upon focusing on a close point, where FIG. 6A indicates the wide-angle end state, FIG. 6B indicates the intermediate focal length state, and FIG. 6C indicates the telephoto end state.
Figure 6B:
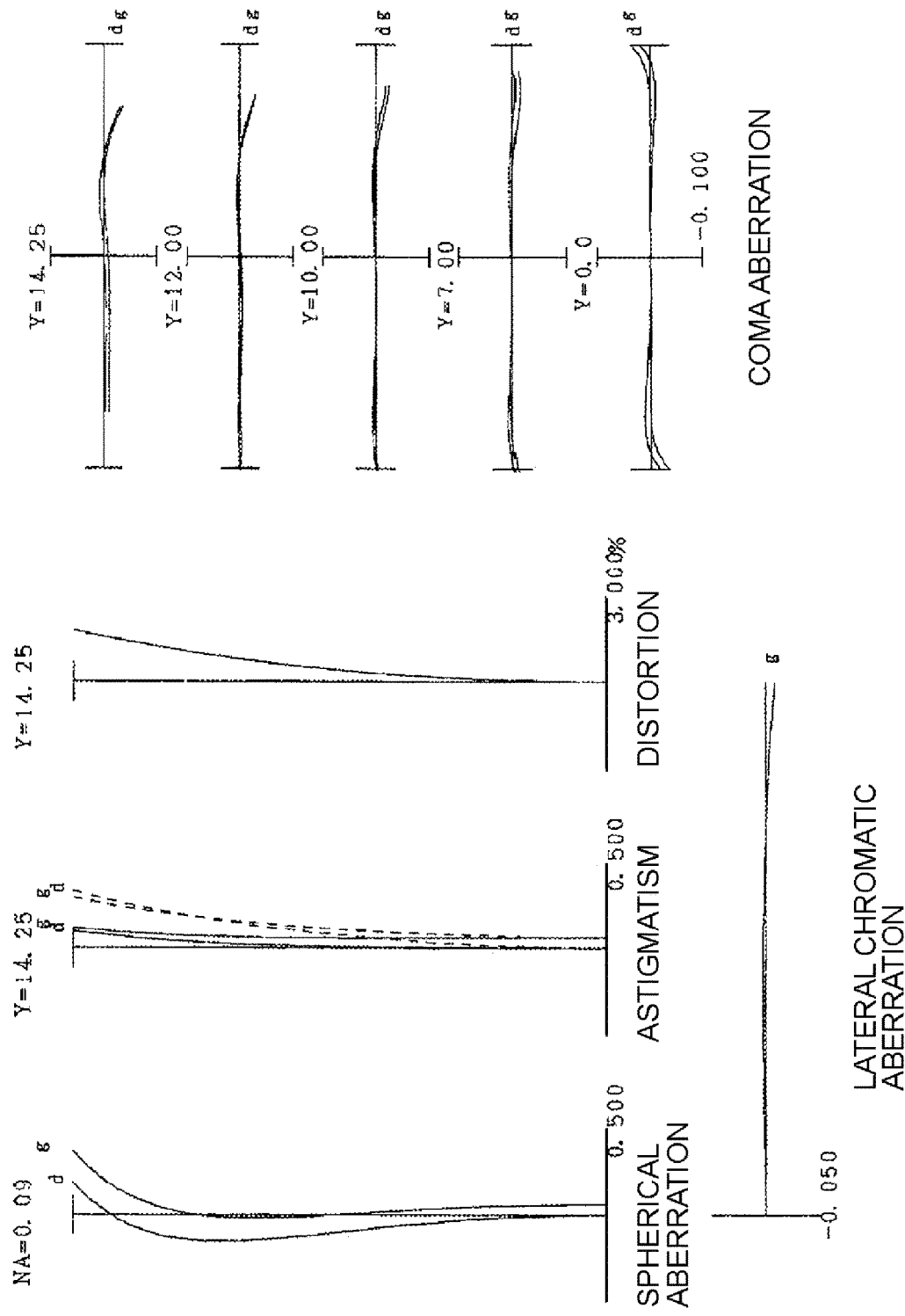
Figure 6C:
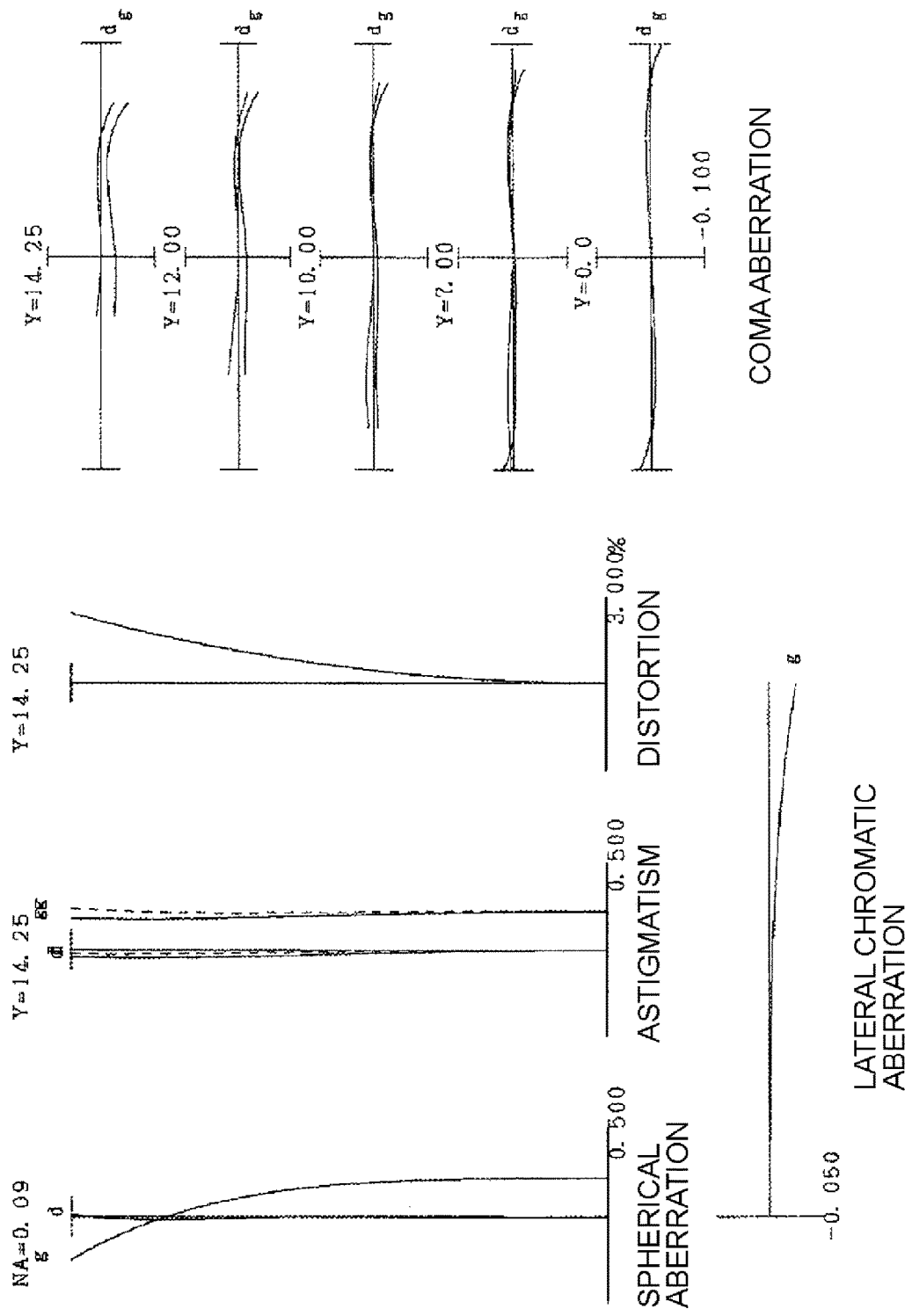

FIG. 5 is a set of graphs showing various aberrations of the variable power optical system ZL2 according to Example 2 upon focusing on infinity in the wide-angle end state, intermediate focal length state and telephoto end state, and FIG. 6 is a set of graphs showing various aberrations thereof upon focusing on a close point in the wide-angle end state, intermediate focal length state and telephoto end state.

As these graphs showing various aberrations clarify, the variable power optical system ZL2 according to Example 2 has excellent image forming performance, with correcting various aberrations well throughout the wide-angle end state to the telephoto end state, and also demonstrates excellent image forming performance even upon focusing on a close point.

EXAMPLE 3

FIG. 7 shows a configuration of a variable power optical system ZL3 according to Example 3. The variable power optical system ZL3 shown in FIG. 7 includes, in order from an object: a first lens group G1 having positive refractive power; a second lens group G2 having negative refractive power; a third lens group G3 having negative refractive power; a fourth lens group G4 having positive refractive power; and a fifth lens group G5 having positive refractive power.

In the variable power optical system ZL3, the first lens group G1 is constituted by, in order from the object: a cemented positive lens where a negative meniscus lens L11 having a convex surface facing the object and a biconvex positive lens L12 are cemented; and a positive meniscus lens L13 having a convex surface facing the object. The second lens group G2 is constituted by, in order from the object: a negative meniscus aspherical negative lens L21 having a convex surface facing the object; a biconcave negative lens L22; and a biconvex positive lens L23. The aspherical negative lens L21 of the second lens group G2 has a thin aspherical plastic resin layer on the object side lens surface. The third lens group G3 is constituted by a biconcave aspherical negative lens L31. The object side lens surface of the aspherical negative lens L31 of the third lens group G3 is aspherical. The fourth lens group G4 is constituted by, in order from the object: a cemented positive lens where a negative meniscus lens L41 having a convex surface facing the object and a biconvex positive lens L42 are cemented; a cemented positive lens where a biconvex positive lens L43 and a negative meniscus lens L44 having a concave surface facing the object are cemented; and a cemented negative lens where a biconcave aspherical negative lens L45 and a positive meniscus lens L46 having a convex surface facing the object are cemented. The object side lens surface of the aspherical negative lens L45 of the fourth lens group G4 is aspherical. The fifth lens group G5 is constituted by, in order from the object: a positive meniscus lens L51 having a concave surface facing the object; a cemented positive lens where a biconvex positive lens L52 and a negative meniscus lens L53 having a concave surface facing the object are cemented; and a negative meniscus lens L54 having a concave surface facing the object.

In the variable power optical system ZL3 according to Example 3, upon zooming from the wide-angle end state to the telephoto end state, the first lens group G1 to the fifth lens group G5 move toward the object respectively, so that the air distance between the first lens group G1 and the second lens group G2 increases, the air distance between the second lens group G2 and the third lens group G3 increases, the air distance between the third lens group G3 and the fourth lens group G4 decreases, and the air distance between the fourth lens group G4 and the fifth lens group G5 decreases. An aperture stop S is disposed between the third lens group G3 and the fourth lens group G4, and the aperture stop S moves together with the fourth lens group G4 upon zooming.

In the variable power optical system ZL3 according to Example 3, focusing from an object at a long distance to an object at a close distance is performed by moving the third lens group G3 toward the object.

Table 9 shows the data values of the variable power optical system ZL3 according to Example 3. The surface numbers 1 to 31 in Table 9 correspond to the numbers 1 to 31 in FIG. 7.

TABLE 9

[General Data]

Zoom ratio = 7.41

|  | Wide-angle end state | Intermediate focal length state | Telephoto end state |
|---|---|---|---|
| f = | 18.5~ | 69.5~ | 137.1 |
| FNO = | 3.53~ | 5.63~ | 5.88 |
| 2ω = | 78.1~ | 22.81~ | 11.60 |
| Ymax = | 14.25~ | 14.25~ | 14.25 |
| TL = | 138.31~ | 183.34~ | 201.92 |

[Lens Data]

| m | r | d | nd | vd |
|---|---|---|---|---|
| Object plane | ∞ | | | |
| 1 | 240.0000 | 2.000 | 1.846660 | 23.78 |
| 2 | 67.9585 | 8.100 | 1.593190 | 67.90 |
| 3 | −228.3587 | 0.100 | | |
| 4 | 50.9478 | 5.604 | 1.816000 | 46.62 |
| 5 | 130.7206 | d5 | | |
| 6* | 200.0000 | 0.150 | 1.553890 | 38.23 |

TABLE 9-continued

[General Data]

| 7 | 220.2039 | 1.200 | 1.772499 | 49.61 |
|---|---|---|---|---|
| 8 | 13.0490 | 7.071 | | |
| 9 | −46.1818 | 1.000 | 1.882997 | 40.76 |
| 10 | 66.5635 | 1.055 | | |
| 11 | 35.4681 | 5.226 | 1.846660 | 23.78 |
| 12 | −30.8403 | d12 | | |
| 13* | −28.9787 | 1.000 | 1.816000 | 46.62 |
| 14 | 109.6730 | d14 | | |
| 15 | ∞ | 0.400 | | Aperture stop S |
| 16 | 24.8684 | 1.000 | 1.902650 | 35.70 |
| 17 | 16.7163 | 4.400 | 1.562857 | 53.65 |
| 18 | −34.2463 | 0.100 | | |
| 19 | 18.0955 | 4.364 | 1.497820 | 82.51 |

TABLE 9-continued

[General Data]

| 20 | −31.4489 | 1.000 | 1.903660 | 31.27 |
|---|---|---|---|---|
| 21 | 91.7396 | 2.500 | | |
| 22* | −86.5271 | 1.000 | 1.729157 | 54.66 |
| 23 | 12.5188 | 2.748 | 1.850260 | 32.35 |
| 24 | 24.8338 | d24 | | |
| 25 | −402.7374 | 3.237 | 1.626788 | 59.07 |
| 26 | −29.3596 | 0.100 | | |
| 27 | 38.7545 | 7.834 | 1.487490 | 70.40 |
| 28 | −15.5000 | 1.301 | 1.882997 | 40.76 |
| 29 | −27.6430 | 0.263 | | |
| 30 | −40.1683 | 1.000 | 1.882997 | 40.76 |
| 31 | −74.5264 | BF | | |
| Image plane | ∞ | | | |

[Lens Group Focal Length]

| Lens group | First surface | Focal length |
|---|---|---|
| First lens group | 1 | 80.000 |
| Second lens group | 6 | −59.191 |
| Third lens group | 13 | −28.000 |
| Fourth lens group | 16 | 46.114 |
| Fifth lens group | 25 | 34.271 |

In this variable power optical system ZL3 according to Example 3, the lens surfaces of Surface 6, Surface 13 and Surface 22 are aspherical. Table 10 shows aspherical data, that is, the values of the conical coefficient K and each aspherical coefficient A4 to A10.

TABLE 10

[Aspherical Data]

| | K | A4 | A6 | A8 | A10 |
|---|---|---|---|---|---|
| Surface 6 | 22.2541 | 2.52148E−06 | −8.96525E−09 | −3.86729E−11 | 1.20386E−13 |
| Surface 13 | −0.0609 | 1.13314E−06 | −1.25083E−09 | 4.17478E−10 | −1.62820E−12 |
| Surface 22 | 0.5764 | 5.81857E−06 | 6.67215E−08 | −4.14394E−10 | 0.00000E+00 |

In the variable power optical system ZL3 according to Example 3, the axial air distance d5 between the first lens group G1 and the second lens group G2, the axial air distance d12 between the second lens group G2 and the third lens group G3, the axial air distance d14 between the third lens group G3 and the fourth lens group G4, the axial air distance d24 between the fourth lens group G4 and the fifth lens group G5, and the back focus BF change upon zooming, as mentioned above. Table 11 shows the variable distance and the back focus value in each focal length state of the wide-angle end state, the intermediate focal length state and the telephoto end state upon focusing on infinity and upon focusing on a close point.

TABLE 11

[Variable Distance Data]

|    | Focusing on infinity | | | Focusing on close point | | |
| --- | --- | --- | --- | --- | --- | --- |
|    | Wide-angle end | Intermediate | Telephoto end | Wide-angle end | Intermediate | Telephoto end |
| f   | 18.5   | 69.5   | 137.1  | 18.5   | 69.5   | 137.1  |
| d5  | 1.500  | 24.534 | 40.460 | 1.500  | 24.534 | 40.460 |
| d12 | 2.808  | 4.059  | 7.370  | 2.401  | 3.766  | 6.851  |
| d14 | 23.985 | 7.275  | 3.000  | 24.392 | 7.569  | 3.519  |
| d23 | 8.253  | 5.298  | 5.000  | 8.253  | 5.298  | 5.000  |
| BF  | 38.01  | 78.42  | 82.34  | 38.01  | 78.42  | 82.34  |

Table 12 shows each conditional expression correspondence value of the variable power optical system ZL3 according to Example 3.

TABLE 12

|    | Wide-angle end state | Intermediate focal length state | Telephoto end state |
| --- | --- | --- | --- |
| fb | 31.872 | 30.080 | 29.910 |
| β3 | 0.1149 | 0.0515 | −0.0829 |
| βb | −1.0734 | −2.4362 | −2.5771 |

[Conditional Expression Correspondence Value]

| (1) | f1/(−f2) = 1.352 |
| --- | --- |
| (2) | (A × B)/(C × D) = 1.0073 |
| (3) | f3/f2 = 0.473 |
| (4) | f1/fw = 4.325 |
| (5) | f4/f5 = 1.346 |
| (6) | (D45w − D45t)/fw = 0.176 |

Thus the variable power optical system ZL3 according to Example 3 satisfies all the conditional expressions (1) to (6).

Figure 8C:
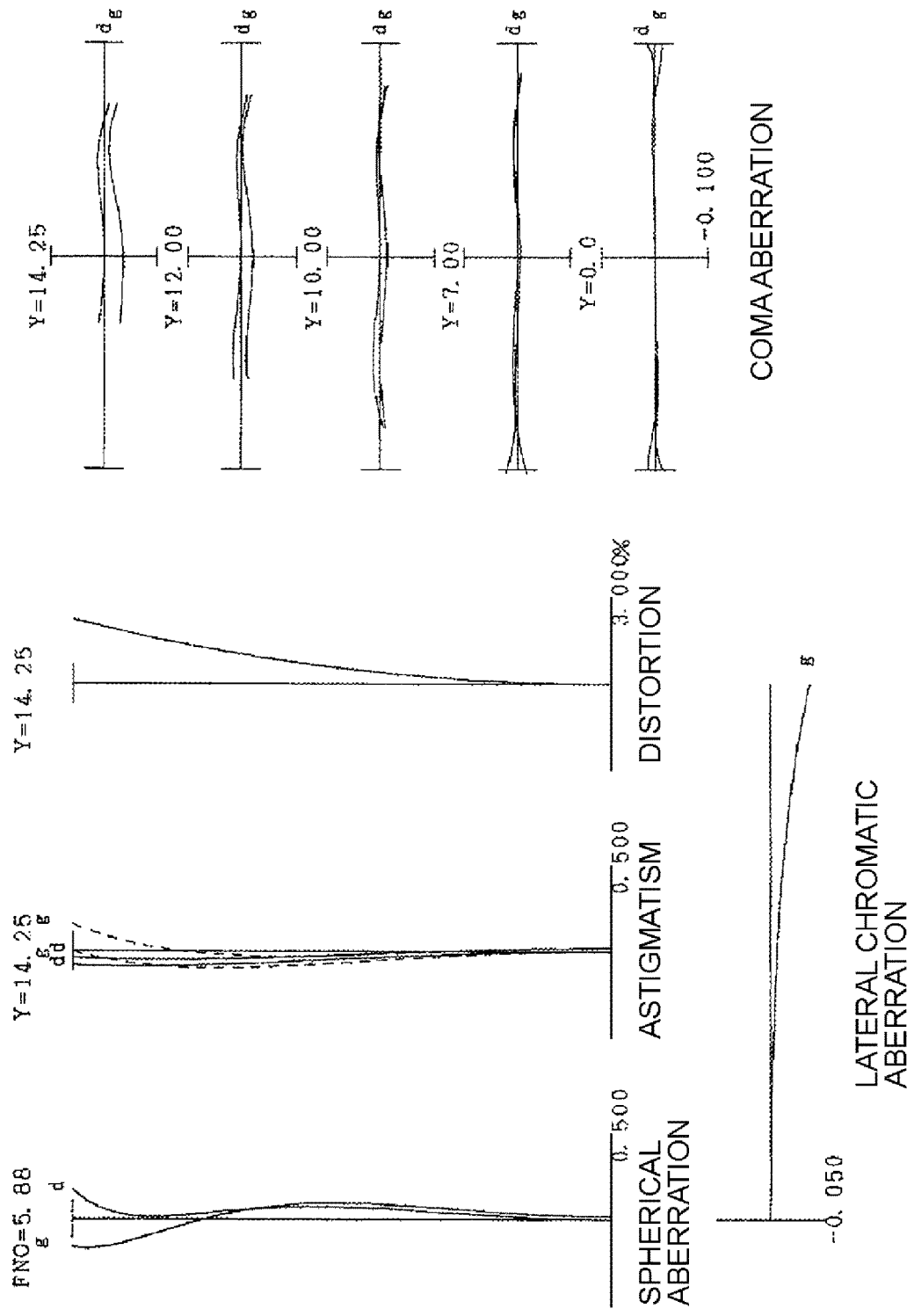
Figure 9A:
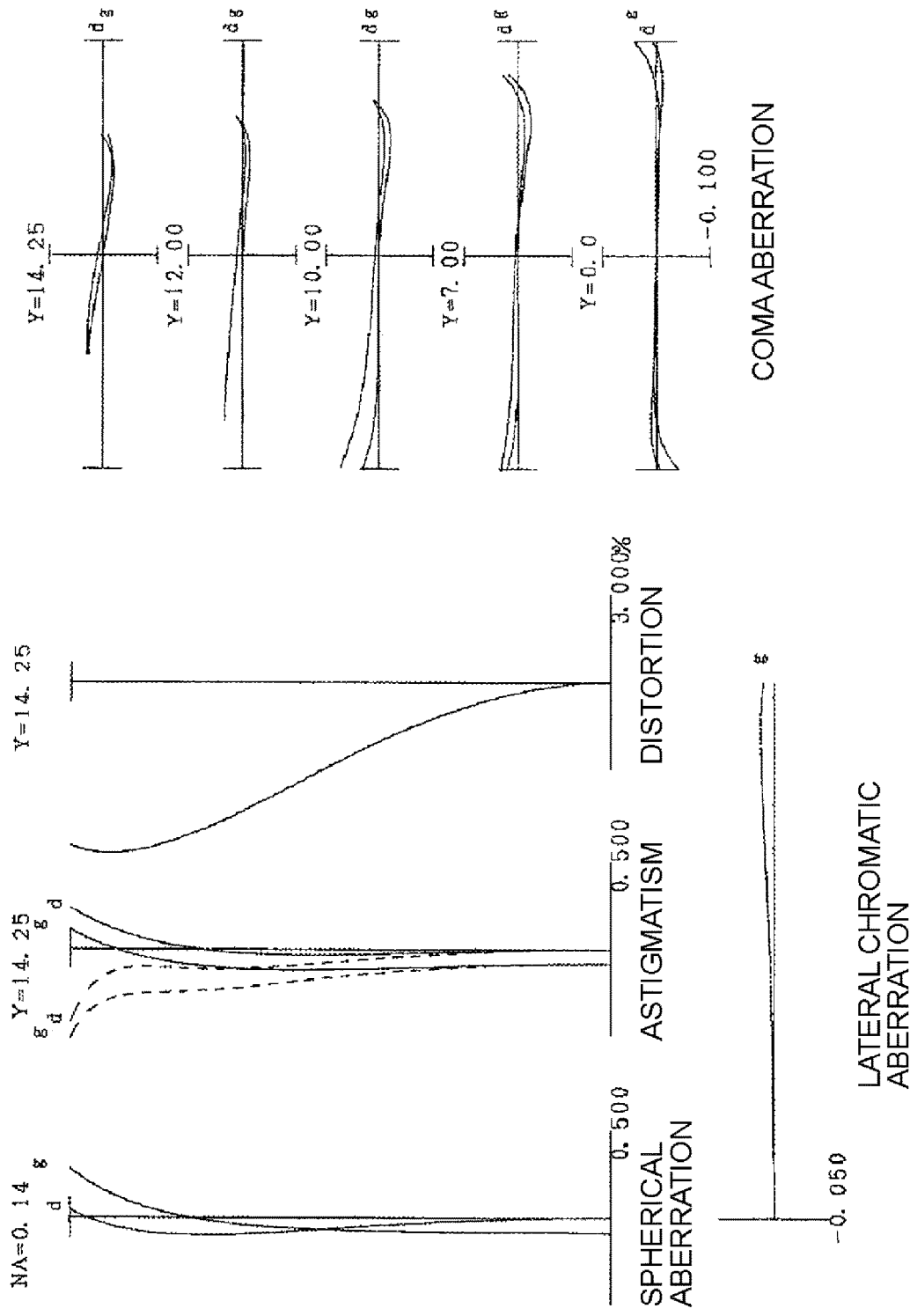

FIG. 8 is a set of graphs showing various aberrations of the variable power optical system ZL3 according to Example 3 upon focusing on infinity in the wide-angle end state, intermediate focal length state and telephoto end state, and FIG. 9 is a set of graphs showing various aberrations thereof upon focusing on a close point in the wide-angle end state, intermediate focal length state and telephoto end state. As these graphs showing various aberrations clarify, the variable power optical system ZL3 according to Example 3 has excellent image forming performance, with correcting various aberrations well throughout the wide-angle end state to the telephoto end state, and also demonstrates excellent image forming performance even upon focusing on a close point.

Figure 12:
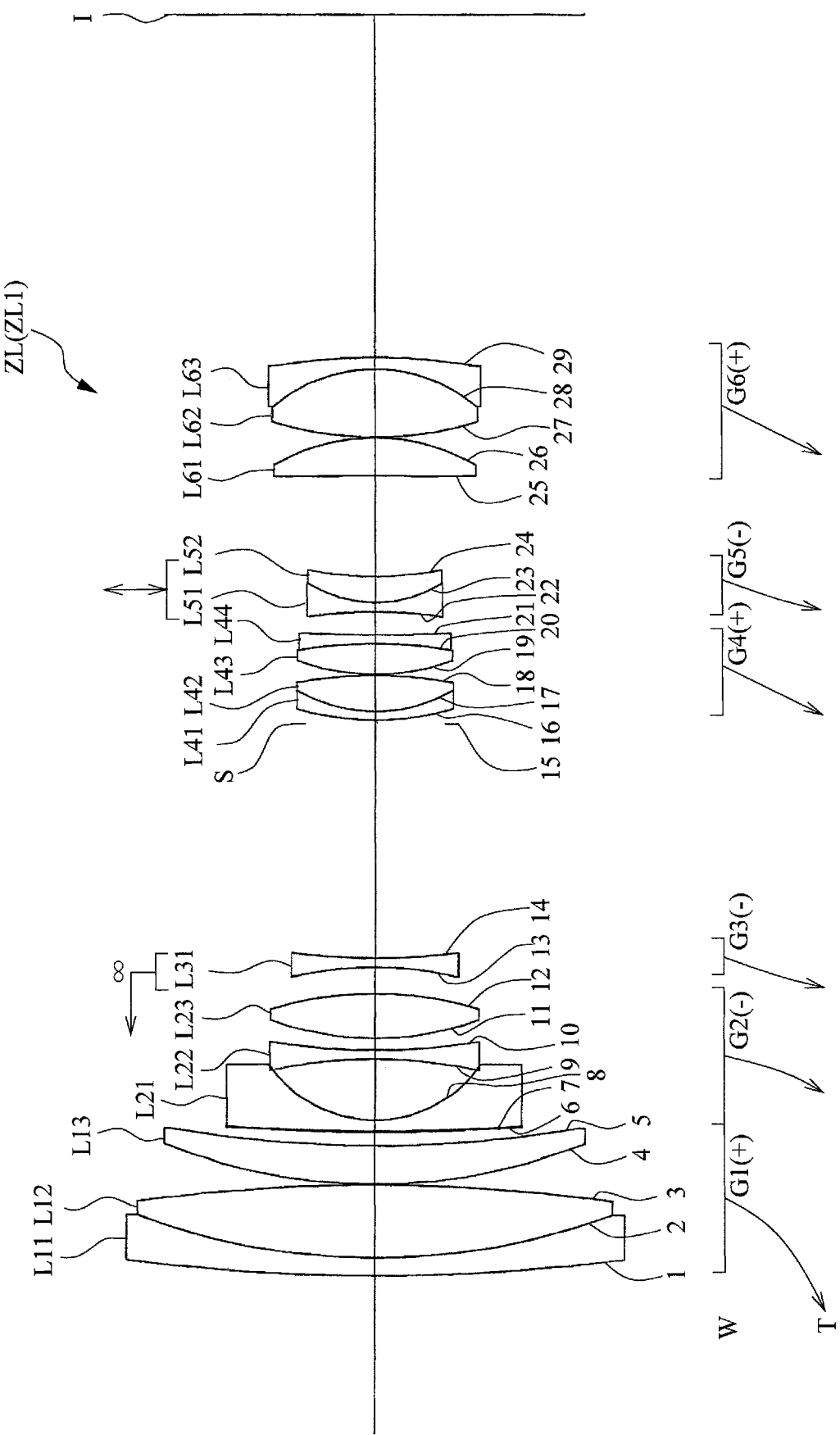
FIG. 12 is a cross-sectional view depicting a lens configuration of a variable power optical system according to Example 4.

Embodiment 2 of the present invention will be described next with reference to the drawings. As shown in FIG. 12, a variable power optical system ZL according to Embodiment 2 includes, in order from an object: a first lens group G1 having positive refractive power; a second lens group G2 having negative refractive power; a third lens group G3 having negative refractive power; a fourth lens group G4 having positive refractive power; a fifth group G5 having negative refractive power; and a sixth lens group G6 having positive refractive power. In this variable power optical system ZL, upon zooming from a wide-angle end state to a telephoto end state, the distance between the first lens group G1 and the second lens group G2 changes, the distance between the second lens group G2 and the third lens group G3 changes, the distance between the third lens group G3 and the fourth lens group G4 changes, the distance between the fourth lens group G4 and the fifth lens group G5 changes, and the distance between the fifth lens group G5 and the sixth lens group G6 changes, whereby aberrations upon zooming can be corrected well.

In this variable power optical system ZL, if, upon zooming from the wide-angle end state to the telephoto end state, the distance between the first lens group G1 and the second lens group G2 is increased, and the distance between the third lens group G3 and the fourth lens group G4 is decreased, an ×5 or higher zoom ratio can be obtained. Further, if the first lens group G1 is moved toward the object upon zooming from the wide-angle end state to the telephoto end state, the total lens length can be decreased in the wide-angle end state, and the effective diameter of the first lens group G1 can be reduced, and as a result, the variable power optical system ZL can be downsized.

In this variable power optical system ZL, if the fourth lens group G4 and the sixth lens group G6 are moved together upon zooming from the wide-angle end state to the telephoto end state, the change of mutual decentration between the fourth lens group G4 and the sixth lens group G6 can be minimized, and good image forming performance can be implemented with reducing the generation of decentration aberration.

In this variable power optical system ZL, if the third lens group G3 is moved in the optical axis direction upon focusing from an object at infinity to an object at a close distance, the change of size of the image upon focusing can be minimized, and the fluctuation of aberration, such as spherical aberration, can be minimized.

In this variable power optical system ZL, it is preferable that the following conditional expression (7) is satisfied.

$$-0.25 < ft/f12t < 0.10 \tag{7}$$

where
ft: focal length of the variable power optical system ZL in the telephoto end state
f12t: composite focal length of the first lens group G1 and the second lens group G2 in the telephoto end state.

The conditional expression (7) specifies an appropriate composite focal length of the first lens group G1 and the second lens group G2 in the telephoto end state, for minimizing the fluctuation of aberrations upon focusing from an object at infinity to an object at a close distance. If the upper limit value of the conditional expression (7) is exceeded or if the lower limit value thereof is not reached, the composite refractive power of the first lens group G1 and the second lens group G2 in the telephoto end state increases, and the change of spherical aberration upon focusing from an object at infinity to an object at a close distance in the telephoto end state increases. By setting the upper limit value of the conditional expression (7) to 0.06, the effect of the invention can be demonstrated with higher certainty. Further, by setting the lower limit value of the conditional expression (7) to −0.20, the effect of the invention can be demonstrated with higher certainty.

In the variable power optical system ZL according to Embodiment 2, it is preferable that, upon zooming from the wide-angle end state to the telephoto end state, the fourth lens group G4 and the sixth lens group G6 move toward the object, the distance between the second lens group G2 and the third lens group G3 increases, the distance between the fourth lens group G4 and the fifth lens group G5 increases, and the distance between the fifth lens group G5 and the sixth lens group G6 decreases. By this configuration, the aberrations upon zooming from the wide-angle end state to the telephoto end state can be corrected well, fluctuation of aberrations upon focusing from an object at infinity to an object at a close distance can be minimized, and a ×5 or higher zoom ratio can be obtained with hither certainty.

In this variable power optical system ZL, it is preferable that the following conditional expression (8) is satisfied.

$$2.00 < f12w/f3 < 5.00 \qquad (8)$$

where f12w: composite focal length of the first lens group G1 and the second lens group G2 in the wide-angle end state f3: focal length of the third lens group G3.

The conditional expression (8) specifies an appropriate ratio between the composite focal length of the first lens group G1 and the second lens group G2 and the focal length of the third lens group G3 in the wide-angle end state for minimizing the fluctuation of aberrations upon focusing from an object at infinity to an object at a close distance. If the upper limit value of the conditional expression (8) is exceeded, the refractive power of the third lens group G3 increases, and the change of the spherical aberration upon focusing from an object at infinity to an object at a close distance in the telephoto end state increases. By setting the upper limit value of the conditional expression (8) to 4.50, the effect of the invention can be demonstrated with higher certainty. If the lower limit value of the conditional expression (8) is not reached, on the other hand, the composite refractive power of the first lens group G1 and the second lens group G2 in the wide-angle end state increases, and fluctuation of various aberrations, including curvature of field, increases upon focusing from an object at infinity to an object at a close distance in the wide-angle end state. Moreover, the refractive power of the third lens group G3 decreases, and the moving distance of the third lens group G3 increases upon zooming from the wide-angle end state to the telephoto end or upon focusing from an object at infinity to an object at a close distance, which increases the size of the optical system. By setting the lower limit value of the conditional expression (8) to 2.50, the effect of the invention can be demonstrated with higher certainty.

In the variable power optical system ZL according to Embodiment 2, it is preferable that the third lens group G3 is constituted by one negative lens. By this configuration, the third lens group G3, which is the focusing lens group, becomes lighter, and high-speed autofocus and quietness during autofocus can be implemented without increasing the size of the lens barrel.

In the variable power optical system ZL according to Embodiment 2, it is preferable that the surface closest to the object in the third lens group G3 is aspherical. By this configuration, the third lens group G3, which is the focusing lens group, can be lighter, and at the same time, fluctuation of aberrations upon focusing from an object at infinity to an object at a close distance can be minimized, hence high-speed autofocus and quietness during autofocus can be implemented without increasing the size of the lens barrel.

In this variable power optical system ZL, it is preferable that the following conditional expression (9) is satisfied.

$$0.45 < f1/ft < 0.90 \qquad (9)$$

where ft: focal length of the variable power optical system ZL in the telephoto end state f1: focal length of the first lens group G1.

The conditional expression (9) satisfies an appropriate focal length of the first lens group G1 with respect to the focal length of the variable power optical system ZL in the telephoto end state. By satisfying the conditional expression (9), the variable power optical system ZL according to Embodiment 2 can decrease the total lens length and at the same time correct curvature of field, distortion and spherical aberration well. If the lower limit value of the conditional expression (9) is not reached, the refractive power of the first lens group G1 increases, and it becomes difficult to correct various aberrations, including spherical aberration, well. By setting the lower limit value of the conditional expression (9) to 0.55, the effect of the invention can be demonstrated with higher certainty. If the upper limit value of the conditional expression (9) is exceeded, on the other hand, the refractive power of the first lens group G1 decreases, and it becomes difficult to decrease the total lens length. By setting the upper limit value of the conditional expression (9) to 0.80, the effect of the invention can be demonstrated with higher certainty.

In the variable power optical system ZL of the Embodiment 2, the fourth lens group G4, the fifth lens group G5 and the sixth lens group G6 have a structure of convergence, divergence and convergence, and also has a structure to correct various aberrations well throughout the wide-angle end state to the telephoto end state by changing the distance of each lens group. The focal length of each lens group of the fourth lens group G4 to the sixth lens group G6 preferably satisfies the following conditions.

In this variable power optical system ZL, it is preferable that the following conditional expression (10) is satisfied.

$$1.00 < f4/fw < 1.70 \qquad (10)$$

where f4: focal length of the fourth lens group G4 fw: focal length of the variable power optical system ZL in the wide-angle end state.

The conditional expression (10) specifies an appropriate focal length of the fourth lens group G4 with respect to the focal length of the variable power optical system ZL in the wide-angle end state. By satisfying the conditional expression (10), the variable power optical system ZL according to Embodiment 2 can decrease the total lens length, and at the same time can correct curvature of field, distortion and spherical aberration well. If the lower limit value of the conditional expression (10) is not reached, the refractive power of the fourth lens group G4 increases, and it becomes difficult to correct various aberrations, including spherical aberration. By setting the lower limit value of the conditional expression (10) to 1.20, the effect of the invention can be demonstrated with higher certainty. If the upper limit value of the conditional expression (10) is exceeded, on the other hand, the refractive power of the fourth lens group G4 decreases, and it becomes difficult to decrease the total lens length. By setting the upper limit value of the conditional expression (10) to 1.50, the effect of the invention can be demonstrated with hither certainty.

In this variable power optical system ZL, it is preferable that the following conditional expression (11) is satisfied.

$$1.40 < (-f5)/fw < 2.30 \qquad (11)$$

where f5: focal length of the fifth lens group G5 fw: focal length of the variable power optical system ZL in the wide-angle end state.

The conditional expression (11) specifies an appropriate focal length of the fifth lens group G5 with respect to the focal length of the variable power optical system ZL in the wide-angel end state. By satisfying the conditional expression (11), the variable power optical system ZL according to Embodiment 2 can correct curvature of field, distortion and spherical aberration well. If the lower limit value of the conditional expression (11) is not reached, the refractive power of the fifth lens group G5 increases, and it becomes difficult to correct various aberrations, including spherical aberration. By setting the lower limit value of the conditional expression (11) to 1.60, the effect of the invention can be demonstrated with higher certainty. If the upper limit value of the conditional expression (11) is exceeded, on the other hand, the refractive power of the fifth lens group G5 decreases, and the effect of correcting various aberrations well by the structure of convergence, divergence and convergence, which the fifth lens group G5 implements with the fourth lens group G4 and the sixth lens group G6, diminishes, and it becomes difficult to maintain good aberration correction with minimizing the changes of curvature of field, distortion and spherical aberration upon zooming from the wide-angle end state to the telephoto end state. By setting the upper limit value of the conditional expression (11) to 2.20, the effect of the invention can be demonstrated with higher certainty.

In this variable power optical system ZL, it is preferable that the following conditional expression (12) is satisfied.

$$1.60 < f6/fw < 2.60 \quad (12)$$

where
f6: focal length of the sixth lens group G6
fw: focal length of the variable power optical system ZL in the wide-angle end state.

The conditional expression (12) specifies an appropriate focal length of the sixth lens group G6 with respect to the focal length of the variable power optical system ZL in the wide-angle end state. By satisfying the conditional expression (12), the variable power optical system ZL according to Embodiment 2 can correct various aberrations, including spherical aberration, well. If the lower limit value of the conditional expression (12) is not reached, the refractive power of the sixth lens group G6 increases, and it becomes difficult to correct various aberrations, including spherical aberration. By setting the lower limit value of the conditional expression (12) to 1.70, the effect of the invention can be demonstrated with higher certainty. If the upper limit value of the conditional expression (12) is exceeded, on the other hand, the refractive power of the sixth lens group G6 decreases, and the effect of correcting various aberrations well by the structure of convergence, divergence and convergence, which the sixth lens group G6 implements with the fourth lens group G4 and the fifth lens group G5, diminishes, and it becomes difficult to maintain good aberration correction with minimizing the changes of curvature of field, distortion and spherical aberration upon zooming from the wide-angle end state to the telephoto end state. By setting the upper limit value of the conditional expression (12) to 2.40, the effect of the invention can be demonstrated with higher certainty.

In the variable power optical system ZL according to Embodiment 2, it is preferable that at least a part of the fifth lens group G5 is moved so as to have a component in a direction orthogonal to the optical axis, so that displacement of the image forming position due to camera shake or the like is corrected. By this configuration, displacement of the image forming position due to camera shake or the like can be effectively corrected.

Figure 10:
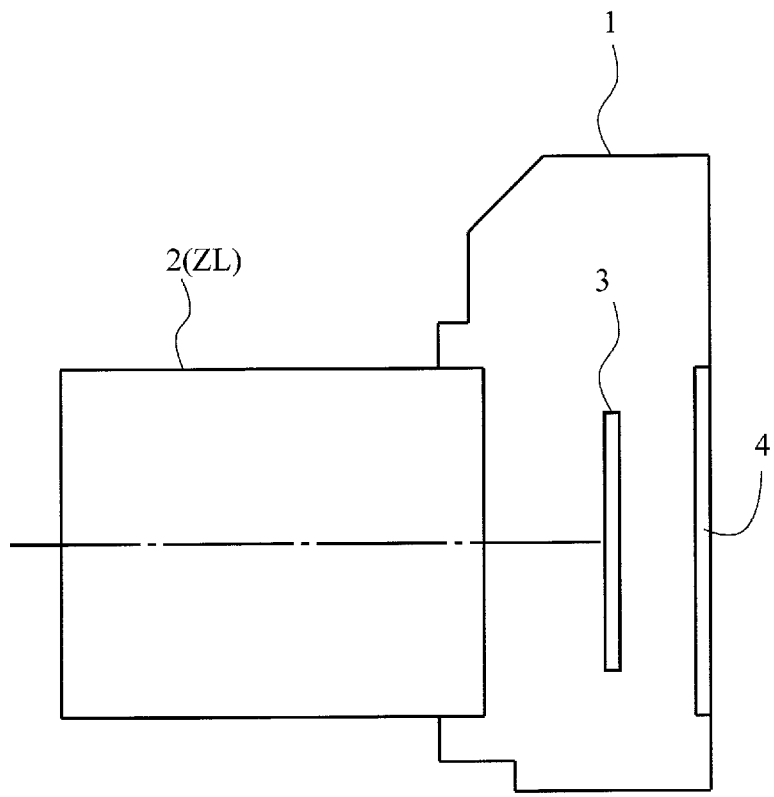
FIG. 10 is a cross-sectional view of a camera that includes the variable power optical system according to the later mentioned examples.

FIG. 10 shows a camera, which is an optical apparatus including the variable power optical system ZL according to Embodiment 2. The configuration thereof has already been described, hence description thereof will be omitted.

The optical apparatus according to Embodiment 2, which includes the variable power optical system ZL having the above mentioned configuration, can minimize the change of the size of the image upon focusing, and can implement an optical apparatus which can ideally control aberration fluctuation upon zooming and focusing.

The following content can be adopted within a range where the optical performance is not diminished.

In Embodiment 2, the variable power optical system ZL constituted by six lens groups was shown, but the above mentioned configuration conditions can also be applied to a configuration using a different number of lens groups, such as seven lens groups or eight lens groups. A lens or a lens group may be added to the configuration on the side closest to the object, or a lens or a lens group may be added to the configuration on the side closest to the image. "Lens group" refers to a portion having at least one lens isolated by air spaces which change upon zooming.

A single lens group or plurality of lens groups or a partial lens group may be designed to be a focusing lens group, which performs focusing from an object at infinity to an object at a close distance by moving in the optical axis direction. This focusing lens group can be applied to autofocus, and is suitable for driving a motor for autofocusing (driving using an ultrasonic motor or the like). It is particularly preferable that the third lens group G3 is designed to be the focusing lens group as mentioned above.

A lens group or a partial lens group may be designed to be a vibration-isolating lens group, which corrects image blurs generated by camera shake, by moving the lens group or the partial lens group so as to have a component in a direction orthogonal to the optical axis or rotating (oscillating) the lens group or the partial lens group in an in-plane direction that includes the optical axis. It is particularly preferable that at least a part of the fifth lens group G5 is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error generated in the processing, assembly and adjustment can be prevented, which is desirable. Even if the image plane is shifted, the drawing performance is not effected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or a plastic lens.

It is preferable that the aperture stop S is disposed near the fourth lens group G4, but the role of the aperture stop may be substituted by the frame of the lens without disposing a separate member as the aperture stop.

Each lens surface may be coated with an anti-reflection film, which has high transmittance in a wide wavelength region, in order to decrease flares and ghosts, and implement high optical performance with high contrast.

The zoom ratio of the variable power optical system ZL of Embodiment 2 is about 5 to 15.

An outline of a method for manufacturing the variable power optical system ZL according to Embodiment 2 will be described with reference to FIG. 18. Each lens is disposed to prepare the first to sixth lens groups G1 to G6 respectively (step S100). Each lens group is disposed so that upon zooming from the wide-angle end state to the telephoto end state, the distance between the first lens group G1 and the second lens group G2 changes, the distance between the second lens group G2 and the third lens group G3 changes, the distance between the third lens group G3 and the fourth lens group G4 changes, the distance between the fourth lens group G4 and the fifth lens group G5 changes, and the distance between the fifth lens group G5 and the sixth lens group G6 changes (step S200). Each lens group is disposed so that the third lens group G3 moves in the optical axis direction upon focusing from an object at infinity to an object at a close distance (step S300). Then each lens group G1 to G6 is disposed so as to satisfy the above mentioned conditional expression (7) (step S400).

As shown in FIG. 12, which is a concrete example of Embodiment 2, the first lens group G1 is prepared by disposing, in order from the object: a cemented positive lens where a negative meniscus lens L11 having a convex surface facing the object and a biconvex positive lens L12 are cemented; and a positive meniscus lens L13 having a convex surface facing the object. The second lens group G2 is prepared by disposing: a negative meniscus aspherical negative lens L21 having a convex surface facing the object; a biconcave negative lens L22; and a biconvex positive lens L23. The third lens group G3 is prepared by disposing a biconcave aspherical negative lens L31. The fourth lens group G4 is prepared by disposing: a cemented positive lens where a negative meniscus lens L41 having a convex surface facing the object and a biconvex positive lens L42 are cemented; and a cemented positive lens where a biconvex positive lens L43 and a biconcave negative lens L44 are cemented. The fifth lens group G5 is prepared by disposing a cemented negative lens where a biconcave aspherical negative lens L51 and a positive meniscus lens L52 having a convex surface facing the object are cemented. The sixth lens group G6 is prepared by disposing: a positive meniscus lens L61 having a concave surface facing the object; and a cemented positive lens where a biconvex positive lens L62 and a negative meniscus lens L63 having a concave surface facing the object are cemented. Each lens group prepared like this is disposed according to the above mentioned procedure, whereby the variable power optical system ZL is manufactured.

Examples of Embodiment 2

Figure 15:
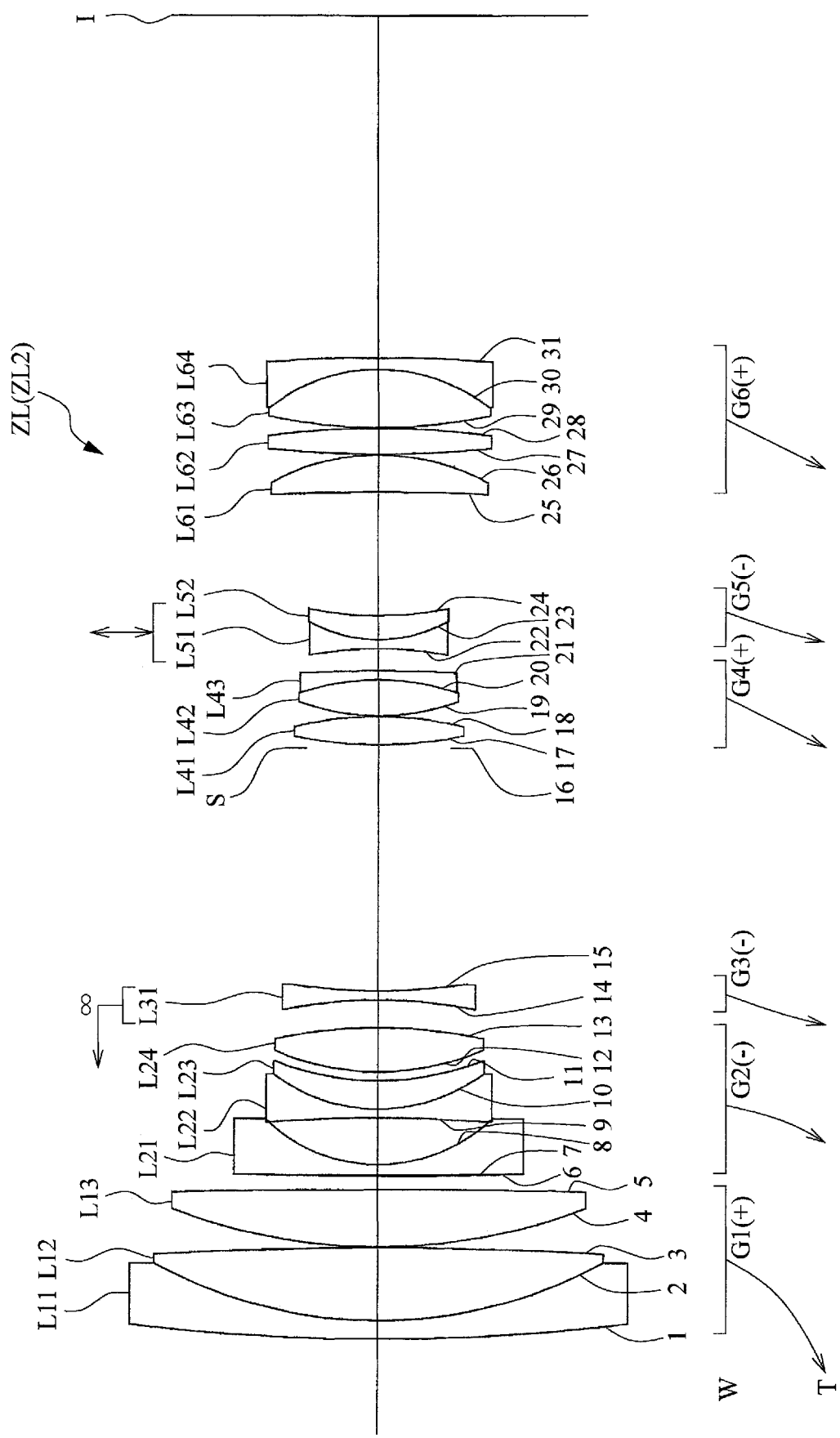
FIG. 15 is a cross-sectional view depicting a lens configuration of a variable power optical system according to Example 5.

Each example of the present embodiment will now be described with reference to the drawings. FIG. 12 and FIG. 15 are cross-sectional views depicting the configuration and refractive power allocation of the variable optical system ZL (ZL1, ZL2) according to each example. In the lower part of the cross-sectional views of the variable power optical systems ZL1 and ZL2, the moving direction of each lens group G1 to G6, along the optical axis upon zooming from the wide-angle end state (W) to the telephoto end state (T), is indicated by an arrow mark.

EXAMPLE 4

FIG. 12 shows a configuration of a variable power optical system ZL1 according to Example 4. The variable power optical system ZL1 shown in FIG. 12 includes, in order from an object: a first lens group G1 having positive refractive power; a second lens group G2 having negative refractive power; a third lens group G3 having negative refractive power; a fourth lens group G4 having positive refractive power; a fifth lens group G5 having negative refractive power; and a sixth lens group G6 having positive refractive power.

In the variable power optical system ZL1, the first lens group G1 is constituted by, in order from the object: a cemented positive lens where a negative meniscus lens L11 having a convex surface facing the object and a biconvex positive lens L12 are cemented; and a positive meniscus lens L13 having a convex surface facing the object. The second lens group G2 is constituted by, in order from the object: a negative meniscus aspherical negative lens L21 having a convex surface facing the object; a biconcave negative lens L22; and a biconvex positive lens L23. The aspherical negative lens L21 of the second lens group G2 has a thin aspherical plastic resin layer on the object side lens surface. The third lens group G3 is constituted by a biconcave aspherical negative lens L31. The object side lens surface of the aspherical negative lens L31 of the third lens group G3 is aspherical. The fourth lens group G4 is constituted by, in order from the object: a cemented positive lens where a negative meniscus lens L41 having a convex surface facing the object and a biconvex positive lens L42 are cemented; and a cemented positive lens where a biconvex positive lens L43 and a negative meniscus lens L44 having a concave surface facing the object are cemented. The fifth lens group G5 is constituted by, in order from the object: a cemented negative lens where a biconcave aspherical negative lens L51 and a positive meniscus lens L52 having a convex surface facing the object are cemented. The object side lens surface of the aspherical negative lens L51 of the fifth lens group G5 is aspherical. The sixth lens group G6 is constituted by, in order from the object: a positive meniscus lens L61 having a concave surface facing the object; and a cemented positive lens where a biconvex positive lens L62 and a negative meniscus lens L63 having a concave surface facing the object are cemented.

In the variable power optical system ZL1 according to Example 4, upon zooming from the wide-angle end state to the telephoto end state, the first lens group G1 to the sixth lens group G6 move toward the object respectively, so that the air distance between the first lens group G1 and the second lens group G2 increases, the air distance between the second lens group G2 and the third lens group G3 increases, the air distance between the third lens group G3 and the fourth lens group G4 decreases, the air distance between the fourth lens group G4 and the fifth lens group G5 increases, and the air distance between the fifth lens group G5 and the sixth lens group G6 decreases. The aperture stop S is disposed between the third lens group G3 and the fourth lens group G4, and the aperture stop S moves together with the fourth lens group G4 upon zooming. The fourth lens group G4 and the sixth lens group G6 move together upon zooming.

In the variable power optical system ZL1 according to Example 4, focusing from an object at a long distance to an object at a close distance is performed by moving the third lens group G3 toward the object.

In the variable power optical system ZL1 according to Example 4, the fifth lens group G5 is moved so as to have a component in a direction orthogonal to the optical axis, whereby displacement of the image forming position, due to camera shake or the like, is corrected.

Table 13 shows the data values of the variable power optical system ZL1 according to Example 4. In [General Data] in Table 13, f indicates a focal length of the variable power optical system, FNO indicates an F number, 2ω indicates an angle of view, Ymax indicates a maximum image height, and TL indicates a total length. The total length TL here indicates a distance on the optical axis from the first surface of the lenses to the image plane I upon focusing on infinity. The first column m in [Lens Data] indicates the sequential number assigned to the lens surface (surface number) counted from the object side along the light traveling direction, the second column r indicates a radius of curvature of each lens surface, the third column d indicates a distance from each optical surface to the next optical surface on the optical axis (surface distance), the fourth column νd and the fifth column nd indicate an Abbe number and a refractive index a d-line (λ=587.6 nm). The radius of curvature ∞ indicates a plane, and the refractive index of air 1.00000 is omitted. The surface numbers 1 to 29 in Table 13 correspond to the numbers 1 to 29 in FIG. 12. The [Lens Group Focal Length] indicates the first surface and the focal length of the first to sixth lens group G1 to G6 respectively.

For all the data values, "mm" is normally used as a unit of focal length f, radius of curvature r, surface distance d and other lengths, but unit is not limited to "mm" since an equivalent optical performance is acquired even if an optical system is proportionally expanded or proportionally reduced. The description on the symbols and the description on the data table are the same for the other examples herein below.

TABLE 13

[General Data]

Zoom ratio = 7.41

|  | Wide-angle end state | Intermediate focal length state | Telephoto end state |
|---|---|---|---|
| f = | 18.5~ | 69.8~ | 137.1 |
| FNO = | 3.37~ | 5.35~ | 5.87 |
| 2ω = | 78.0~ | 22.27~ | 11.45 |
| Ymax = | 14.25~ | 14.25~ | 14.25 |
| TL = | 140.30~ | 182.76~ | 206.23 |

[Lens Data]

| m | r | d | nd | νd |
|---|---|---|---|---|
| Object plane | ∞ | | | |
| 1 | 219.5586 | 2.000 | 1.846660 | 23.78 |
| 2 | 76.5672 | 8.100 | 1.593190 | 67.90 |
| 3 | −193.1433 | 0.100 | | |
| 4 | 62.9929 | 4.369 | 1.816000 | 46.62 |

TABLE 13-continued

[General Data]

| 5 | 135.2434 | d5 | | |
|---|---|---|---|---|
| 6* | 200.0000 | 0.150 | 1.553890 | 38.23 |
| 7 | 264.2433 | 1.200 | 1.772499 | 49.61 |
| 8 | 14.5524 | 6.639 | | |
| 9 | −55.9960 | 1.000 | 1.882997 | 40.76 |
| 10 | 70.0778 | 1.368 | | |
| 11 | 34.2278 | 4.994 | 1.846660 | 23.78 |
| 12 | −40.2215 | d12 | | |

TABLE 13-continued

[General Data]

| 13* | −38.0000 | 1.000 | 1.816000 | 46.62 | |
|---|---|---|---|---|---|
| 14 | 73.1158 | d14 | | | |
| 15 | ∞ | 0.400 | | | Aperture stop S |
| 16 | 31.3375 | 1.000 | 2.000690 | 25.45 | |
| 17 | 17.5382 | 4.020 | 1.696797 | 55.52 | |
| 18 | −45.2689 | 0.100 | | | |
| 19 | 25.2062 | 3.378 | 1.530784 | 53.99 | |
| 20 | −50.1174 | 1.000 | 1.902650 | 35.70 | |
| 21 | 221.7499 | d21 | | | |
| 22* | −49.6292 | 1.000 | 1.729157 | 54.66 | |
| 23 | 14.2070 | 2.838 | 1.850260 | 32.35 | |
| 24 | 37.8185 | d24 | | | |
| 25 | −987.2356 | 4.223 | 1.497820 | 82.51 | |
| 26 | −22.6220 | 0.100 | | | |
| 27 | 42.2054 | 7.527 | 1.487490 | 70.40 | |
| 28 | −17.4688 | 1.301 | 1.882997 | 40.76 | |
| 29 | −69.1566 | BF | | | |
| Image plane | ∞ | | | | |

[Lens Group Focal Length]

| Lens group | First surface | Focal length |
|---|---|---|
| First lens group | 1 | 93.305 |
| Second lens group | 6 | −59.998 |
| Third lens group | 13 | −30.519 |
| Fourth lens group | 15 | 25.075 |
| Fifth lens group | 22 | −34.507 |
| Sixth lens group | 25 | 40.427 |

In this variable power optical system ZL1 according to Example 4, the lens surfaces of Surface 6, Surface 13 and Surface 22 are aspherical. Table 14 shows aspherical data, that is, the values of the conical coefficient K and each aspherical coefficient A4 to A10.

TABLE 14

[Aspherical Data]

| | K | A4 | A6 | A8 | A10 |
|---|---|---|---|---|---|
| Surface 6 | 22.2541 | 2.73433E−06 | −3.40694E−08 | 8.73889E−11 | −1.04437E−13 |
| Surface 13 | 0.0119 | 1.07136E−06 | 1.36110E−08 | 9.05198E−11 | −2.63445E−13 |
| Surface 22 | 0.5764 | 2.56475E−06 | −5.34939E−09 | 1.12941E−10 | 0.00000E+00 |

In the variable power optical system ZL1 according to Example 4, the axial air distance d5 between the first lens group G1 and the second lens group G2, the axial air distance d12 between the second lens group G2 and the third lens group G3, the axial air distance d14 between the third lens group G3 and the fourth lens group G4, the axial air distance d21 between the fourth lens group G4 and the fifth lens group G5, the axial air distance d24 between the fifth lens group G5 and the sixth lens group G6, and the back focus BF change upon zooming, as mentioned above. Table 15 shows the variable distance and the back focus value in each focal length state of the wide-angle end state, the intermediate focal region state and the telephoto end state upon focusing on infinity and upon focusing on a close point. The back focus BF indicates a distance on the optical axis from the lens surface closest to the image (surface 29 in FIG. 12) to the image plane I. This description is the same for the other examples herein below.

TABLE 15

[Variable Distance Data]

|  | Focusing on infinity | | | Focusing on close point | | |
| --- | --- | --- | --- | --- | --- | --- |
|  | Wide-angle end | Inter-mediate | Telephoto end | Wide-angle end | Inter-mediate | Telephoto end |
| f | 18.5 | 69.8 | 137.1 | 18.5 | 69.8 | 137.1 |
| d5 | 1.500 | 28.674 | 46.349 | 1.500 | 28.674 | 46.349 |
| d12 | 2.962 | 4.304 | 7.318 | 2.481 | 3.970 | 6.822 |
| d14 | 26.115 | 7.463 | 3.000 | 26.596 | 7.797 | 3.496 |
| d21 | 2.500 | 7.495 | 8.806 | 2.500 | 7.495 | 8.806 |
| d24 | 11.306 | 6.311 | 5.000 | 11.306 | 6.311 | 5.000 |
| BF | 38.11 | 70.71 | 77.95 | 38.11 | 70.71 | 77.95 |

Table 16 shows each conditional expression correspondence value of the variable power optical system ZL1 according to Example 4. Table 16 shows the value of each focal length in the wide-angle end state, the intermediate focal length state and the telephoto end state, for f12 (composite focal length of the first lens group G1 and the second lens group G2). fw denotes a focal length of the variable power optical system ZL1 in the wide-angle end state, ft denotes a focal length of the variable power optical system ZL1 in the telephoto end state, f1 denotes a focal length of the first lens group G1, f12w denotes a composite focal length of the first lens group G1 and the second lens group G2 in the wide-angle end state, f12t denotes a composite focal length of the first lens group G1 and the second lens group G2 in the telephoto end state, f3 denotes a focal length of the third lens group G3, f4 denotes a focal length of the fourth lens group G4, f5 denotes a focal length of the fifth lens group G5, and f6 denotes a focal length of the sixth lens group G6. This description on the reference symbols is the same for the other examples herein below.

TABLE 16

| | Wide-angle end state | Intermediate focal length state | Telephoto end state |
| --- | --- | --- | --- |
| f12 | −131.84 | −366.17 | 2345.12 |

[Conditional Expression Correspondence Value]

| | |
| --- | --- |
| (7) | ft/f12t = 0.058 |
| (8) | f12w/f3 = 4.320 |
| (9) | f1/ft = 0.680 |
| (10) | f4/fw = 1.355 |
| (11) | (−f5)/fw = 1.865 |
| (12) | f6/fw = 2.185 |

Thus the variable power optical system ZL1 according to Example 4 satisfies all the conditional expressions (7) to (12).

Figure 13A:
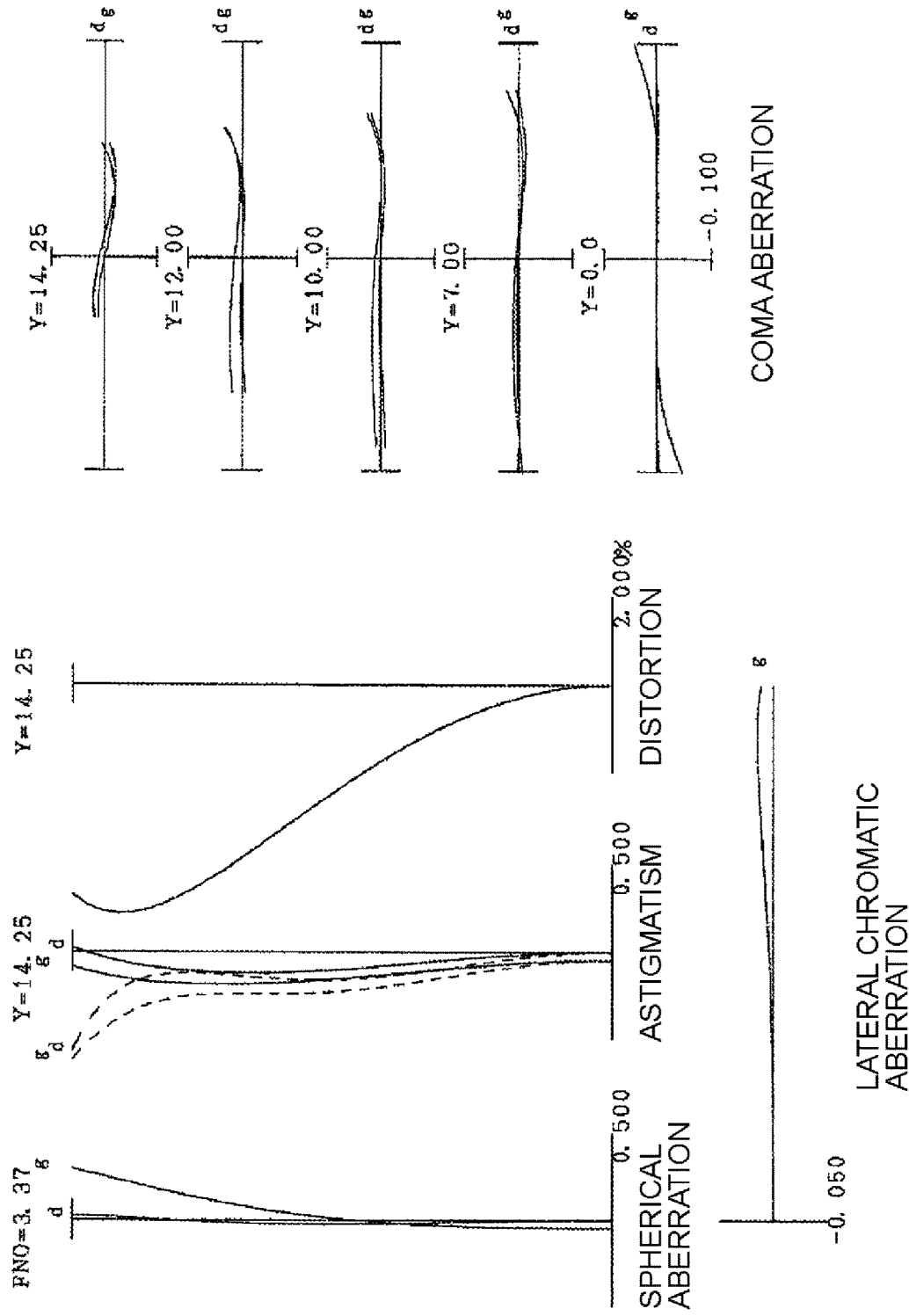
Figure 14A:
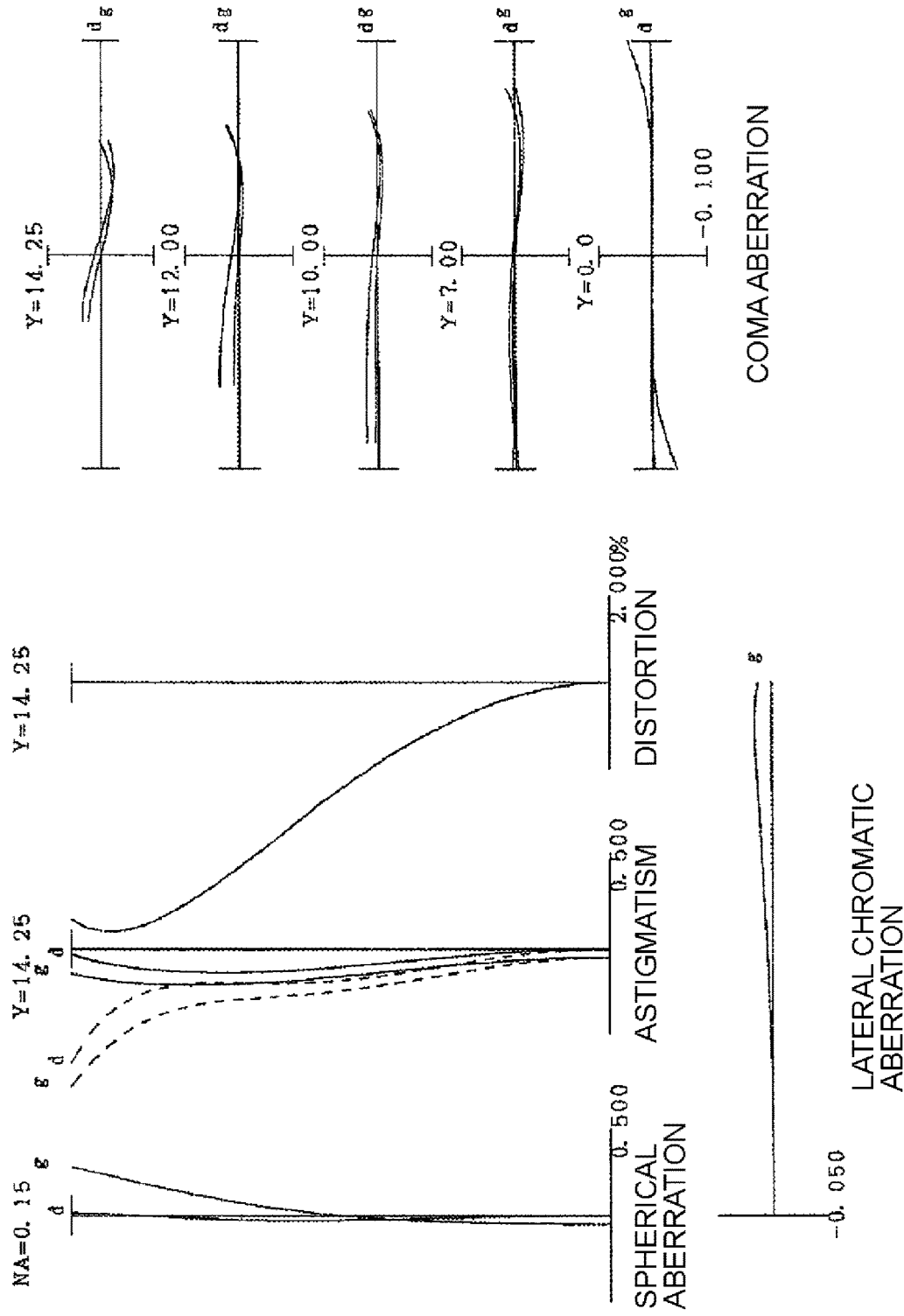
Figure 14B:
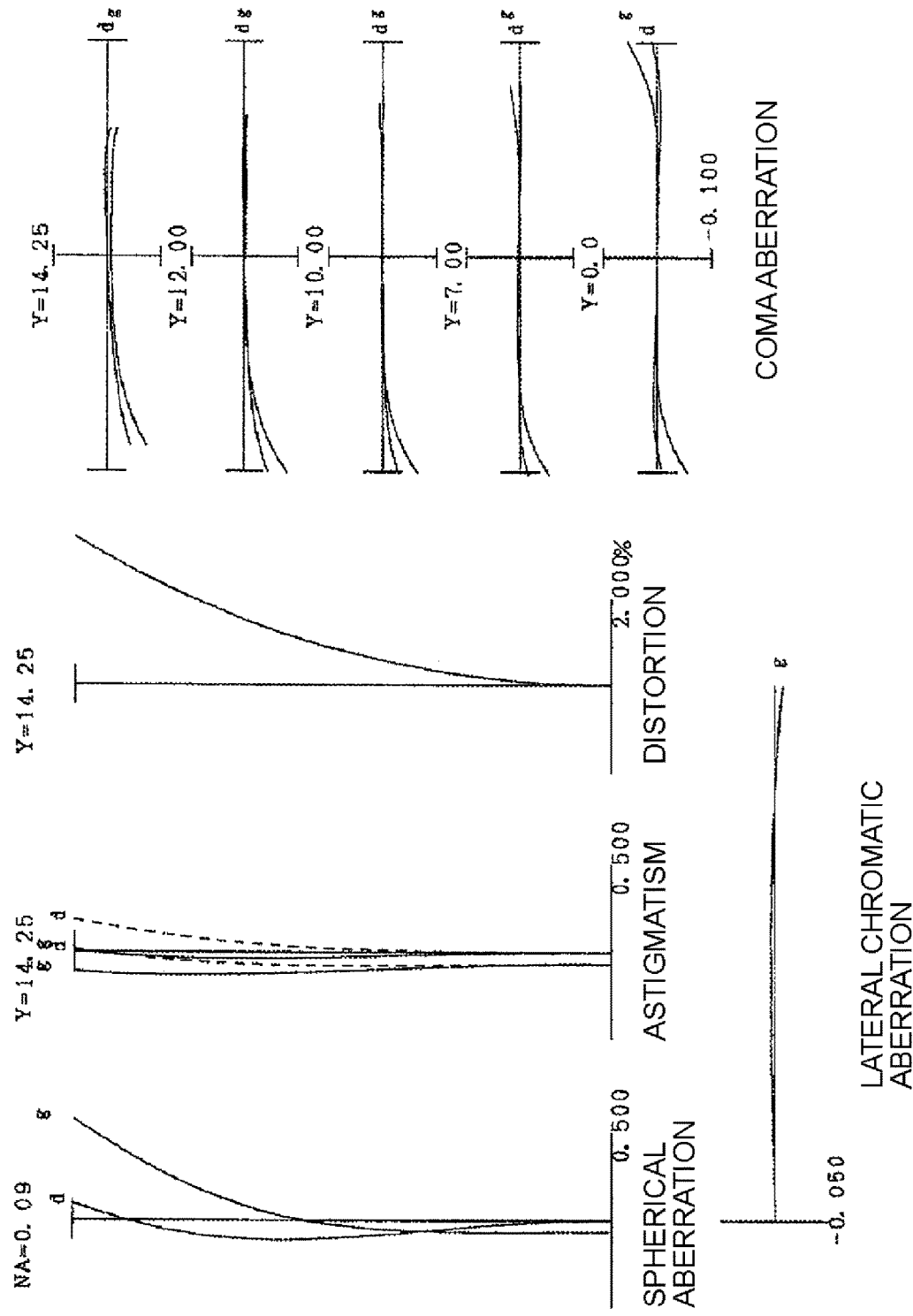

FIG. 13 is a set of graphs showing various aberrations of the variable power optical system ZL1 according to Example 4 upon focusing on infinity in the wide-angle end state, intermediate focal length state and telephoto end state, and FIG. 14 is a set of graphs showing various aberrations thereof upon focusing on a close point in the wide-angle end state, intermediate focal length state and telephoto end state. In each graph showing aberration, FNO indicates an F number, NA indicates a numerical aperture, and Y indicates an image height. In the graph showing spherical aberration, an F number or a value of a numerical aperture corresponding to the maximum aperture is shown, in the graphs showing astigmatism and distortion, the maximum value of the image height is shown, and in the graphs showing coma aberration, a value of each image height is shown. d indicates d-line (λ=587.6 nm) and g indicates g-line (λ=435.8 nm). In each graph showing astigmatism, the solid line indicates the sagittal image plane, and the broken line indicates the meridional image plan. The same reference symbols as this example are also used for the graphs showing aberration of the other examples herein below. As these graphs showing various aberrations clarify, the variable power optical system ZL1 according to Example 4 has excellent image forming performance, with correcting various aberrations well throughout the wide-angle end state to the telephoto end state, and also demonstrates excellent image forming performance even upon focusing on a close point.

EXAMPLE 5

FIG. 15 shows a configuration of a variable power optical system ZL2 according to Example 5. The variable power optical system ZL2 shown in FIG. 15 includes, in order from an object: a first lens group G1 having positive refractive power; a second lens group G2 having negative refractive power; a third lens group G3 having negative refractive power; a fourth lens group G4 having positive refractive power; a fifth lens group G5 having negative refractive power; and a sixth lens group G6 having positive refractive power.

In the variable power optical system ZL2, the first lens group G1 is constituted by, in order from the object: a cemented negative lens where a negative meniscus lens L11 having a convex surface facing the object and a biconvex positive lens L12 are cemented; and a biconvex positive lens L13. The second lens group G2 is constituted by, in order from the object: a negative meniscus aspherical negative lens L21 having a convex surface facing the object; a cemented negative lens where a biconcave negative lens L22 and a positive meniscus lens L23 having a biconvex surface facing the object are cemented; and a biconvex positive lens L24. The aspherical negative lens L21 of the second lens group G2 has a thin aspherical plastic resin layer on the object side lens surface. The third lens group G3 is constituted by a biconcave aspherical negative lens L31. The object side lens surface of the aspherical negative lens L31 of the third lens group G3 is aspherical. The fourth lens group G4 is constituted by, in order from the object: a biconvex positive lens L41; and a cemented positive lens where a biconvex positive lens L42 and a negative meniscus lens L43 having a concave surface facing the object are cemented. The fifth lens surface G5 is constituted by, in order from the object, a cemented negative lens where a biconcave aspherical negative lens L51 and a positive meniscus lens L52 having a convex surface facing the object are cemented. The object side lens surface of the aspherical negative lens L51 of the fifth lens group G5 is aspherical. The sixth lens group G6 is constituted by, in order from the object: a positive meniscus lens L61 having a concave surface facing the object; a biconvex positive lens L62; and a cemented negative lens where a biconvex positive lens L63 and a negative meniscus lens L64 having a concave surface facing the object are cemented.

In the variable power optical system ZL2 according to Example 5, upon zooming from the wide-angle end state to the telephoto end state, the first lens group G1 to the sixth lens group G6 move toward the object respectively, so that the air distance between the first lens group G1 and the second lens group G2 increases, the air distance between the second lens group G2 and the third lens group G3 increases, the air distance between the third lens group G3 and the fourth lens group G4 decreases, the air distance between the fourth lens group G4 and the fifth lens group G5 increases, and the air distance between the fifth lens group G5 and the sixth lens group G6 decreases. An aperture stop S is disposed between the third lens group G3 and the fourth lens group G4, and the aperture stop S moves together with the fourth lens group G4 upon zooming. Further, the fourth lens group G4 and the sixth lens group G6 move together upon zooming.

In the variable power optical system ZL2 according to Example 5, focusing from an object at a long distance to an object at a close distance is performed by moving the third lens group G3 toward the object.

In the variable power optical system ZL2 according to Example 5, the fifth lens group G5 is moved so as to have a component in a direction orthogonal to the optical axis, whereby displacement of the image forming position, due to camera shake or the like, is corrected.

Table 17 shows the data values of the variable power optical system ZL2 according to Example 5. The surface numbers 1 to 31 in Table 17 correspond to the numbers 1 to 31 in FIG. 15.

TABLE 17

[General Data]

Zoom ratio = 7.42

|  | Wide-angle end state | Intermediate focal length state | Telephoto end state |
|---|---|---|---|
| f = | 18.5~ | 69.5~ | 137.2 |
| FNO = | 3.23~ | 5.27~ | 5.94 |
| 2ω = | 78.1~ | 22.37~ | 11.44 |
| Ymax = | 14.25~ | 14.25~ | 14.25 |
| TL = | 147.44~ | 186.83~ | 213.32 |

TABLE 17-continued

[General Data]

[Lens Data]

| m | r | d | nd | vd |
|---|---|---|---|---|
| Object plane | ∞ | | | |
| 1 | 240.0000 | 2.000 | 1.800999 | 34.96 |
| 2 | 52.7117 | 8.100 | 1.497820 | 82.51 |
| 3 | -443.0237 | 0.100 | | |
| 4 | 64.5223 | 6.447 | 1.696797 | 55.52 |
| 5 | -936.2592 | d5 | | |
| 6* | 500.0000 | 0.150 | 1.553890 | 38.23 |
| 7 | 822.4858 | 1.200 | 1.772499 | 49.61 |
| 8 | 18.2758 | 5.256 | | |
| 9 | -165.4567 | 1.000 | 1.816000 | 46.62 |
| 10 | 19.8601 | 3.118 | 1.622049 | 36.15 |
| 11 | 32.0132 | 1.000 | | |
| 12 | 29.4566 | 4.897 | 1.846660 | 23.78 |
| 13 | -55.0484 | d13 | | |
| 14* | -49.4019 | 1.000 | 1.816000 | 46.62 |
| 15 | 61.9839 | d15 | | |
| 16 | ∞ | 0.400 | | Aperture stop S |
| 17 | 48.3794 | 3.113 | 1.639999 | 60.09 |
| 18 | -39.1683 | 0.100 | | |
| 19 | 26.2287 | 4.086 | 1.487490 | 70.40 |
| 20 | -26.5392 | 1.000 | 1.846660 | 23.78 |
| 21 | -148.2799 | d21 | | |
| 22* | -42.1109 | 1.000 | 1.729157 | 52.66 |
| 23 | 16.2392 | 2.676 | 1.850260 | 31.35 |
| 24 | 40.3742 | d24 | | |
| 25 | -302.1886 | 4.124 | 1.497820 | 82.51 |
| 26 | -25.5978 | 0.100 | | |
| 27 | 141.8594 | 2.868 | 1.557443 | 45.43 |
| 28 | -91.1593 | 0.100 | | |
| 29 | 62.4497 | 6.548 | 1.487490 | 70.40 |
| 30 | -19.7577 | 1.301 | 1.834807 | 44.72 |
| 31 | -154.3786 | BF | | |
| Image plane | ∞ | | | |

[Lens Group Focal Length]

| Lens group | First surface | Focal length |
|---|---|---|
| First lens group | 1 | 96.473 |
| Second lens group | 6 | -50.028 |
| Third lens group | 14 | -33.555 |
| Fourth lens group | 16 | 24.677 |
| Fifth lens group | 22 | -31.897 |
| Sixth lens group | 25 | 39.477 |

In this variable power optical system ZL2 according to Example 5, the lens surfaces of Surface 6, Surface 14 and Surface 22 are aspherical. Table 18 shows aspherical data, that is, the values of the conical coefficient K and each aspherical coefficient A4 to A10.

TABLE 18

[Aspherical Data]

| | K | A4 | A6 | A8 | A10 |
|---|---|---|---|---|---|
| Surface 6 | 1.0000 | 2.02178E-06 | -1.91245E-08 | 5.41632E-11 | -7.16953E-14 |
| Surface 14 | 1.0000 | 6.73106E-06 | 1.51641E-08 | -6.05979E-11 | 0.00000E+00 |
| Surface 22 | 1.0000 | 6.96942E-06 | 4.75469E-10 | 2.28841E-11 | 0.00000E+00 |

In the variable power optical system ZL2 according to Example 5, the axial air distance d5 between the first lens group G1 and the second lens group G2, the axial air distance d13 between the second lens group G2 and the third lens group G3, the axial air distance d15 between the third lens group G3 and the fourth lens group G4, the axial air distance d21 between the fourth lens group G4 and the fifth lens group G5, the axial air distance d24 between the fifth lens group G5 and the sixth lens group G6 and the back focus BF change upon zooming, as mentioned above. Table 19 shows the variable distance and the back focus value in each focal length state of the wide-angle end state, the intermediate focal length state and the telephoto end state upon focusing on infinity and upon focusing on a close point.

TABLE 19

[Variable Distance Data]

| | Focusing on infinity | | | Focusing on close point | | |
|---|---|---|---|---|---|---|
| | Wide-angle end | Intermediate | Telephoto end | Wide-angle end | Intermediate | Telephoto end |
| f | 18.5 | 69.5 | 137.2 | 18.5 | 69.5 | 137.2 |
| d5 | 1.500 | 27.643 | 46.848 | 1.500 | 27.643 | 46.848 |
| d13 | 3.056 | 4.300 | 7.199 | 2.535 | 3.977 | 6.751 |
| d15 | 27.000 | 7.501 | 3.000 | 27.521 | 7.823 | 3.448 |
| d21 | 2.500 | 9.585 | 11.183 | 2.500 | 9.585 | 11.183 |
| d24 | 13.683 | 6.598 | 5.000 | 13.683 | 6.598 | 5.000 |
| BF | 38.02 | 69.51 | 78.41 | 38.02 | 69.51 | 78.41 |

Table 20 shows each conditional expression correspondence value of the variable power optical system ZL2 according to Example 5.

TABLE 20

| | Wide-angle end state | Intermediate focal length state | Telephoto end state |
|---|---|---|---|
| f12 | −93.11 | −187.87 | −744.06 |

[Conditional Expression Correspondence Value]

| (7) | ft/f12t = −0.184 |
|---|---|
| (8) | f12w/f3 = 2.775 |
| (9) | f1/ft = 0.703 |
| (10) | f4/fw = 1.334 |
| (11) | (−f5)/fw = 1.724 |
| (12) | f6/fw = 2.134 |

Thus the variable power optical system ZL2 according to Example 5 satisfies all the conditional expressions (7) to (12).

Figure 17A:
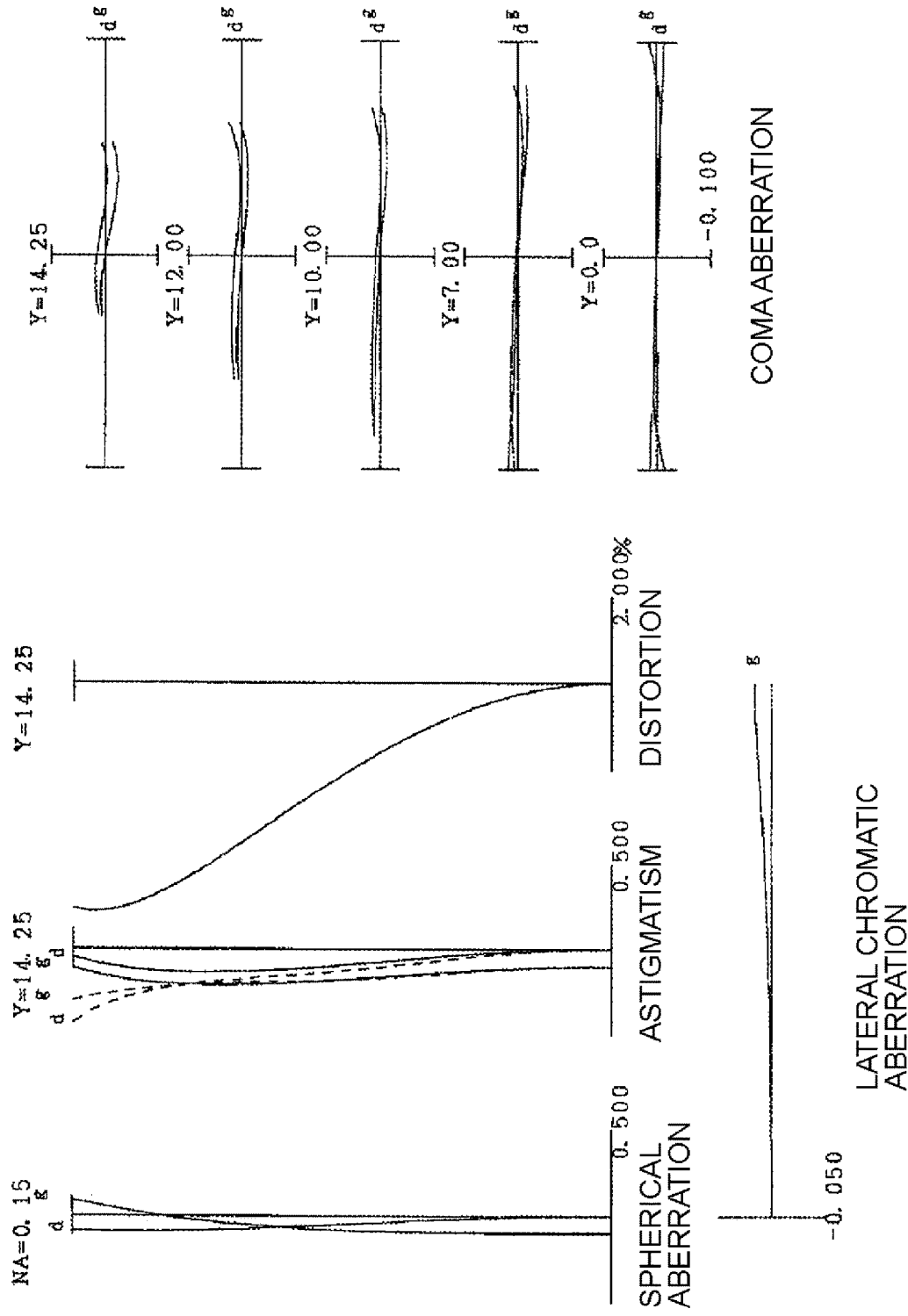
FIGS. 17A, 17B and 17C are sets of graphs showing various aberrations of the variable power optical system according to Example 5 upon focusing on a close point, where FIG. 17A indicates the wide-angle end state, FIG. 17B indicates the intermediate focal length state, and FIG. 17C indicates the telephoto end state.
Figure 17B:
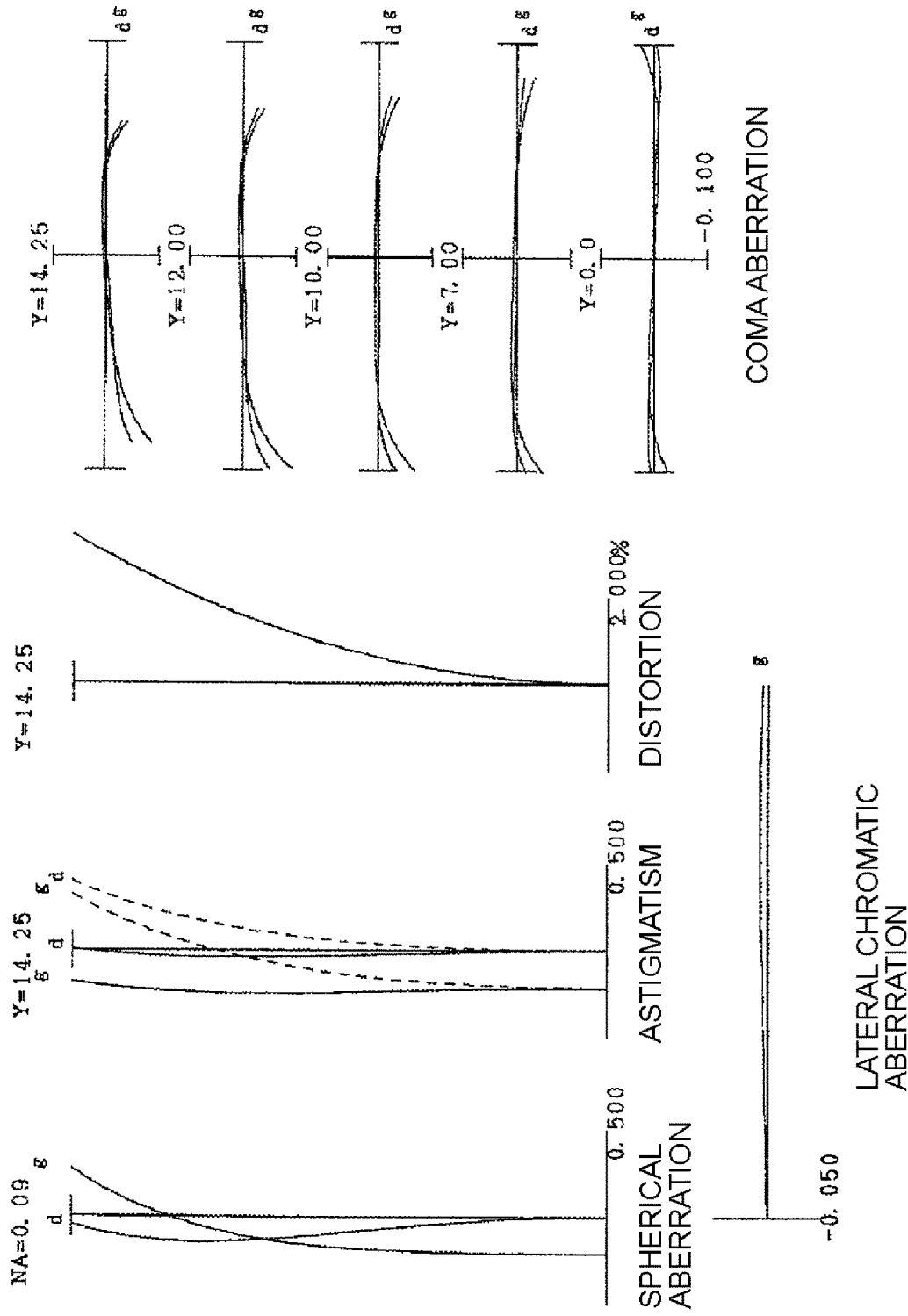
Figure 17C:
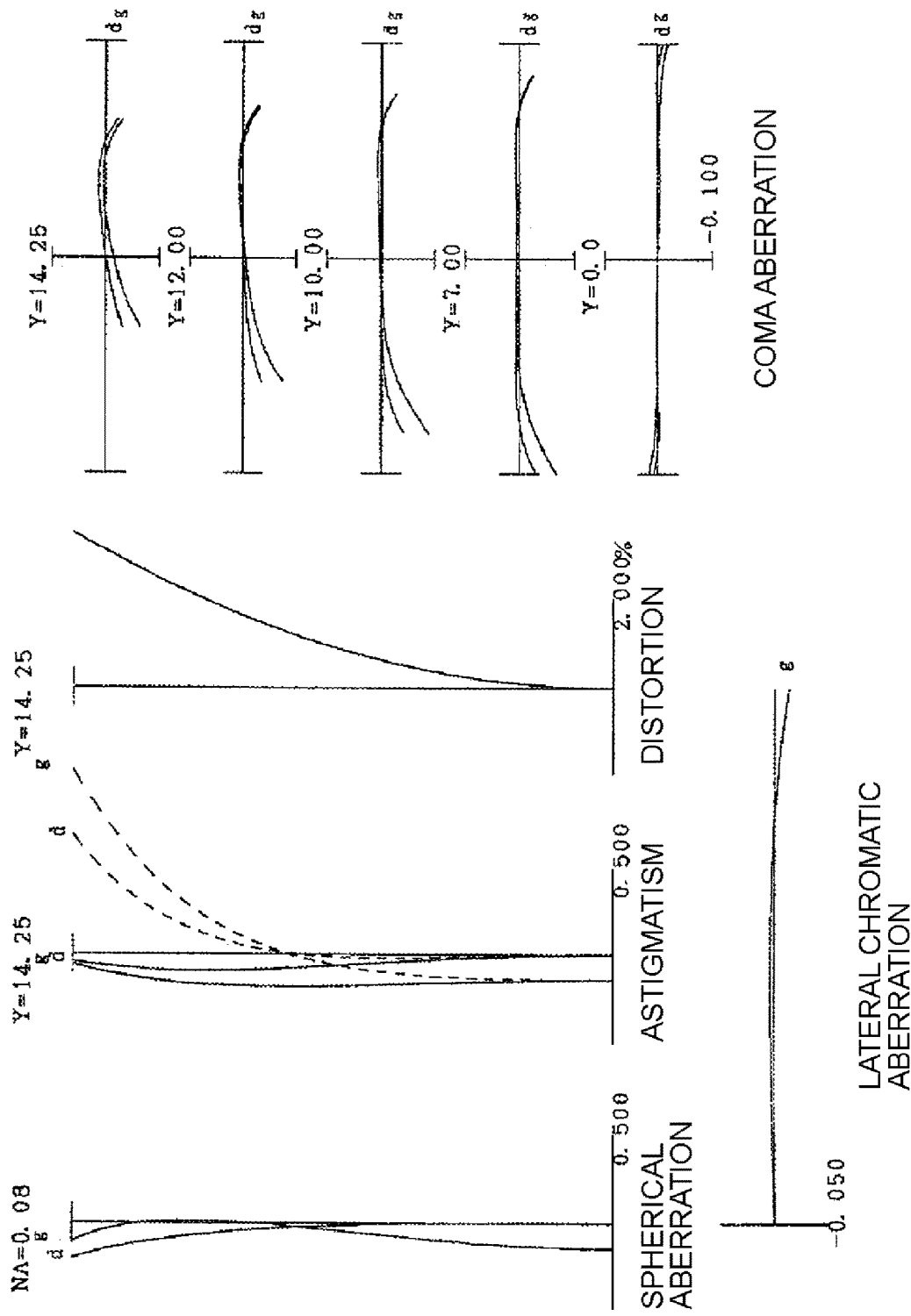

FIG. 16 is a set of graphs showing various aberrations of the variable power optical system ZL2 according to Example 5 upon focusing on infinity in the wide-angle end state, intermediate focal length state and telephoto end state, and FIG. 17 is a set of graphs showing various aberrations thereof upon focusing on a close point in the wide-angle end state, intermediate focal length state and telephoto end state. As these graphs showing various aberrations clarify, the variable power optical system ZL2 according to Example 5 has excellent image forming performance, with correcting various aberrations well throughout the wide-angle end state to the telephoto end state, and also demonstrates excellent image forming performance even upon focusing on a close point.

Embodiment 3 of the present invention will be described next with reference to the drawings. As shown in FIG. 19, a variable power optical system ZL according to Embodiment 3 includes, in order from an object: a first lens group G1 having positive refractive power; a second lens group G2 having negative refractive power; a third lens group G3 having negative refractive power; a fourth lens group G4 having positive refractive power; a fifth group G5 having negative refractive power; and a sixth lens group G6 having positive refractive power. In this variable power optical system ZL, upon zooming from a wide-angle end state to a telephoto end state, the distance between the first lens group G1 and the second lens group G2 changes, the distance between the second lens group G2 and the third lens group G3 changes, the distance between the third lens group G3 and the fourth lens group G4 changes, the distance between the fourth lens group G4 and the fifth lens group G5 changes, and the distance between the fifth lens group G5 and the sixth lens group G6 changes, whereby aberrations upon zooming can be corrected well.

In this variable power optical system ZL, if, upon zooming from the wide-angle end state to the telephoto end state, the distance between the first lens group G1 and the second lens group G2 is increased, and the distance between the third lens group G3 and the fourth lens group G4 is decreased, an ×5 or higher zoom ratio can be obtained. Further, if the first lens group G1 is moved toward the object upon zooming from the wide-angle end state to the telephoto end state, the total lens length can be decreased in the wide-angle end state, and the effective diameter of the first lens group G1 can be reduced, and as a result, the variable power optical system ZL can be downsized.

In this variable power optical system ZL, if the fourth lens group G4 and the sixth lens group G6 are moved together upon zooming from the wide-angle end state to the telephoto end state, the change of mutual decentration between the fourth lens group G4 and the sixth lens group G6 can be minimized, and good image forming performance can be implemented with reducing the generation of decentration aberration.

In this variable power optical system ZL, if the third lens group G3 is moved in the optical axis direction upon focusing from an object at infinity to an object at a close distance, the change of size of the image upon focusing can be minimized, and the fluctuation of aberration, such as spherical aberration, can be minimized.

In this variable power optical system ZL, at least a part of the fifth lens group G5 is moved so as to have a component in a direction orthogonal to the optical axis, whereby displacement of the image forming position, due to camera shake or the like, is corrected (vibration is isolated).

In this variable power optical system ZL, it is preferable that the following conditional expression (13) is satisfied.

$$0.80 < f5/f3 < 1.30 \tag{13}$$

where
f3: focal length of the third lens group G3
f5: focal length of the fifth lens group G5.

Conditional expression (13) specifies an appropriate ratio of the focal length of the third lens group G3 and that of the fifth lens group G5 for minimizing the aberration fluctuation during vibration isolation and keeping the size of the variable power optical system ZL small. If the upper limit value of the conditional expression (13) is exceeded, the refractive power of the fifth lens group G5 decreases, and the shift amount of the fifth lens group G5 required for camera shake correction increases, therefore it becomes difficult to simultaneously correct fluctuation of decentration field tilt in the wide-angle end state and decentration coma aberration in the telephoto end state when the shift decentration occurred to the fifth lens group G5. Further, the refractive power of the third lens group G3 becomes strong, and the change of spherical aberration upon focusing from an object at infinity to an object at a close distance in the telephoto end state increases. By setting the upper limit value of the conditional expression (13) to 1.15, the effect of the invention can be demonstrated with higher certainty. If the lower limit value of the conditional expression (13) is not reached, on the other hand, the refractive power of the third lens group G3 becomes weak, and it becomes difficult to ensure a predetermined zoom ratio. If the refractive power of the second lens group G2 is increased to compensate for this problem, it becomes difficult to correct curvature of field and astigmatism in the wide-angle end state, which is not desirable. By setting the lower limit value of the conditional expression (13) to 0.95, the effect of the invention can be demonstrated with higher certainty.

In the variable power optical system ZL according to Embodiment 3, it is preferable that, upon zooming from the wide-angle end state to the telephoto end state, the fourth lens group G4 and the sixth lens group G6 move toward the object, the distance between the second lens group G2 and the third lens group G3 increases, the distance between the fourth lens group G4 and the fifth lens group G5 increases, and the distance between the fifth lens group G5 and the sixth lens group G6 decreases. By this configuration, the aberrations upon zooming from the wide-angle end state to the telephoto end state can be corrected well, the aberration fluctuation upon focusing from an object at infinity to an object at a close distance can be minimized, and an ×5 or higher zoom ratio can be obtained with higher certainty.

In this variable power optical system ZL it is preferable that the following conditional expression (14) is satisfied.

$$2.00 < f12w/f3 < 5.00 \quad (14)$$

where
f12w: composite focal length of the first lens group G1 and the second lens group G2 in the wide-angle end state
f3: focal length of the third lens group G3.

Conditional expression (14) specifies an appropriate ratio between the composite focal length of the first lens group G1 and the second lens group G2 and the focal length of the third lens group G3 in the wide-angle end state for minimizing the fluctuation of aberrations upon focusing from an object at infinity to an object at a close distance. If the upper limit value of the conditional expression (14) is exceeded, the refractive power of the third lens group G3 increases, and the change of the spherical aberration upon focusing from an object at infinity to an object at a close distance in the telephoto end state increases. By setting the upper limit value of the conditional expression (14) to 4.50, the effect of the invention can be demonstrated with higher certainty. If the lower limit value of the conditional expression (14) is not reached, on the other hand, the composite refractive power of the first lens group G1 and the second lens group G2 in the wide-angle end state increases, and fluctuation of various aberrations, including curvature of field, increases upon focusing from an object at infinity to an object at a close distance in the wide-angle end state. Moreover, the refractive power of the third lens group G3 decreases, and the moving distance of the third lens group G3 increases upon zooming from the wide-angle end state to the telephoto end or upon focusing from an object at infinity to an object at a close distance, which increases the size of the optical system. By setting the lower limit value of the conditional expression (14) to 2.50, the effect of the invention can be demonstrated with higher certainty.

In the variable power optical system ZL according to Embodiment 3, it is preferable that the third lens group G3 is constituted by one negative lens. By this configuration, the third lens group G3, which is the focusing lens group, becomes lighter, and high-speed autofocus and quietness during autofocus can be implemented without increasing the size of the lens barrel.

In the variable power optical system ZL according to Embodiment 3, it is preferable that the surface closest to the object in the third lens group G3 is aspherical. By this configuration, the third lens group G3, which is the focusing lens group, can be lighter, and at the same time, fluctuation of aberrations upon focusing from an object at infinity to an object at a close distance can be minimized, hence high-speed autofocus and quietness during autofocus can be implemented without increasing the size of the lens barrel.

In the variable power optical system ZL according to Embodiment 3, displacement of the image forming position is corrected by moving at least a part of the fifth lens group G5 so as to have a component in a direction orthogonal to the optical axis, but aberration fluctuation when vibration is isolated can be minimized if the fifth lens group G5 is constituted by a cemented lens created by cementing a biconcave lens and a positive meniscus lens having a convex surface facing the object, in order from the object. Further, the aberration fluctuation when vibration is isolated can be controlled well if the object side surface of the fifth lens group G5 is aspherical.

In this variable power optical system ZL, it is preferable that the following conditional expression (15) is satisfied.

$$0.45 < f1/ft < 0.90 \quad (15)$$

where
ft: focal length of the variable power optical system ZL in the telephoto end state
f1: focal length of the first lens group G1.

The conditional expression (15) prescribes an appropriate focal length of the first lens group G1 with respect to the focal length of the variable power optical system ZL in the telephoto end state. By satisfying the conditional expression (15), the variable power optical system ZL according to Embodiment 3 can decrease the total lens length and at the same time correct curvature of field, distortion and spherical aberration well. If the lower limit value of the conditional expression (15) is not reached, the refractive power of the first lens group G1 increases, and it becomes difficult to correct various aberrations, including spherical aberration, well. By setting the lower limit value of the conditional expression (15) to 0.55, the effect of the invention can be demonstrated with higher certainty. If the upper limit value of the conditional expression (15) is exceeded, on the other hand, the refractive power of the first lens group G1 decreases, and it becomes difficult to decrease the total lens length. By setting the upper limit value of the conditional expression (15) to 0.80, the effect of the invention can be demonstrated with higher certainty.

In the variable power optical system ZL of the Embodiment 3, the fourth lens group G4, the fifth lens group G5 and the sixth lens group G6 have a structure of convergence, divergence and convergence, and also has a structure to correct various aberrations well throughout the wide-angle end state to the telephoto end state by changing the distance of each lens group. The focal length of each lens group of the fourth lens group G4 to the sixth lens group G6 preferably satisfies the following conditions.

In this variable power optical system ZL, it is preferable that the following conditional expression (16) is satisfied.

$$1.00<f4/fw<1.70 \quad (16)$$

where
f4: focal length of the fourth lens group G4
fw: focal length of the variable power optical system ZL in the wide-angle end state.

The conditional expression (16) specifies an appropriate focal length of the fourth lens group G4 with respect to the focal length of the variable power optical system ZL in the wide-angle end state. By satisfying the conditional expression (16), the variable power optical system ZL according to Embodiment 3 can decrease the total lens length, and at the same time can correct curvature of field, distortion and spherical aberration well. If the lower limit value of the conditional expression (16) is not reached, the refractive power of the fourth lens group G4 increases, and it becomes difficult to correct various aberrations, including spherical aberration. By setting the lower limit value of the conditional expression (16) to 1.20, the effect of the invention can be demonstrated with higher certainty. If the upper limit value of the conditional expression (16) is exceeded, on the other hand, the refractive power of the fourth lens group G4 decreases, and it becomes difficult to decrease the total lens length. By setting the upper limit value of the conditional expression (16) to 1.50, the effect of the invention can be demonstrated with hither certainty.

In this variable power optical system ZL, it is preferable that the following conditional expression (17) is satisfied.

$$1.40<(-f5)/fw<2.30 \quad (17)$$

where
f5: focal length of the fifth lens group G5
fw: focal length of the variable power optical system ZL in the wide-angle end state.

The conditional expression (17) specifies an appropriate focal length of the fifth lens group G5 with respect to the focal length of the variable power optical system ZL in the wide-angel end state. By satisfying the conditional expression (17), the variable power optical system ZL according to Embodiment 3 can correct curvature of field, distortion and spherical aberration well. If the lower limit value of the conditional expression (17) is not reached, the refractive power of the fifth lens group G5 increases, and it becomes difficult to correct various aberrations, including spherical aberration. By setting the lower limit value of the conditional expression (17) to 1.60, the effect of the invention can be demonstrated with higher certainty. If the upper limit value of the conditional expression (17) is exceeded, on the other hand, the refractive power of the fifth lens group G5 decreases, and the effect of correcting various aberrations well by the structure of convergence, divergence and convergence, which the fifth lens group G5 implements with the fourth lens group G4 and the sixth lens group G6, diminishes, and it becomes difficult to maintain good aberration correction with minimizing the changes of curvature of field, distortion and spherical aberration upon zooming from the wide-angle end state to the telephoto end state. By setting the upper limit value of the conditional expression (17) to 2.20, the effect of the invention can be demonstrated with higher certainty.

In this variable power optical system ZL, it is preferable that the following conditional expression (18) is satisfied.

$$1.60<f6/fw<2.60 \quad (18)$$

where
f6: focal length of the sixth lens group G6
fw: focal length of the variable power optical system ZL in the wide-angle end state.

The conditional expression (18) specifies an appropriate focal length of the sixth lens group G6 with respect to the focal length of the variable power optical system ZL in the wide-angle end state. By satisfying the conditional expression (18), the variable power optical system ZL according to Embodiment 3 can correct various aberrations, including spherical aberration, well. If the lower limit value of the conditional expression (18) is not reached, the refractive power of the sixth lens group G6 increases, and it becomes difficult to correct various aberrations, including spherical aberration. By setting the lower limit value of the conditional expression (18) to 1.70, the effect of the invention can be demonstrated with higher certainty. If the upper limit value of the conditional expression (18) is exceeded, on the other hand, the refractive power of the sixth lens group G6 decreases, and the effect of correcting various aberrations well by the structure of convergence, divergence and convergence, which the sixth lens group G6 implements with the fourth lens group G4 and the fifth lens group G5, diminishes, and it becomes difficult to maintain good aberration correction with minimizing the changes of curvature of field, distortion and spherical aberration upon zooming from the wide-angle end state to the telephoto end state. By setting the upper limit value of the conditional expression (18) to 2.40, the effect of the invention can be demonstrated with higher certainty.

FIG. 10 shows a camera, which is an optical apparatus including the variable power optical system ZL according to Embodiment 3. The configuration thereof has already been described, hence description thereof will be omitted.

The optical apparatus according to Embodiment 3, which includes the variable power optical system ZL having the above mentioned configuration, can minimize the change of the size of the image upon focusing, and can implement an optical apparatus which can ideally control aberration fluctuation upon zooming and focusing.

The following content can be adopted within a range where the optical performance is not diminished.

In Embodiment 3, the variable power optical system ZL constituted by six lens groups was shown, but the above mentioned configuration conditions can also be applied to a configuration using a different number of lens groups, such as seven lens groups or eight lens groups. A lens or a lens group may be added to the configuration on the side closest to the object, or a lens or a lens group may be added to the configuration on the side closest to the image. "Lens group" refers to a portion having at least one lens isolated by air spaces which change upon zooming.

A single lens group or plurality of lens groups or a partial lens group may be designed to be a focusing lens group, which performs focusing from an object at infinity to an object at a close distance by moving in the optical axis direction. This focusing lens group can be applied to autofocus, and is suitable for driving a motor for autofocusing (driving using an ultrasonic motor or the like). It is particularly preferable that the third lens group G3 is designed to be the focusing lens group as mentioned above.

A lens group or a partial lens group may be designed to be a vibration-isolating lens group, which corrects image blurs generated by camera shake, by moving the lens group or the partial lens group so as to have a component in a direction orthogonal to the optical axis or rotating (oscillating) the lens group or the partial lens group in an in-plane direction that includes the optical axis. It is particularly preferable that at least a part of the fifth lens group G5 is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error generated in the processing, assembly and adjustment can be prevented, which is desirable. Even if the image plane is shifted, the drawing performance is not effected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or a plastic lens.

It is preferable that the aperture stop S is disposed near the fourth lens group G4, but the role of the aperture stop may be substituted by the frame of the lens without disposing a separate member as the aperture stop.

Each lens surface may be coated with an anti-reflection film, which has high transmittance in a wide wavelength region, in order to decrease flares and ghosts, and implement high optical performance with high contrast.

The zoom ratio of the variable power optical system ZL of Embodiment 3 is about 5 to 15.

Figure 29:
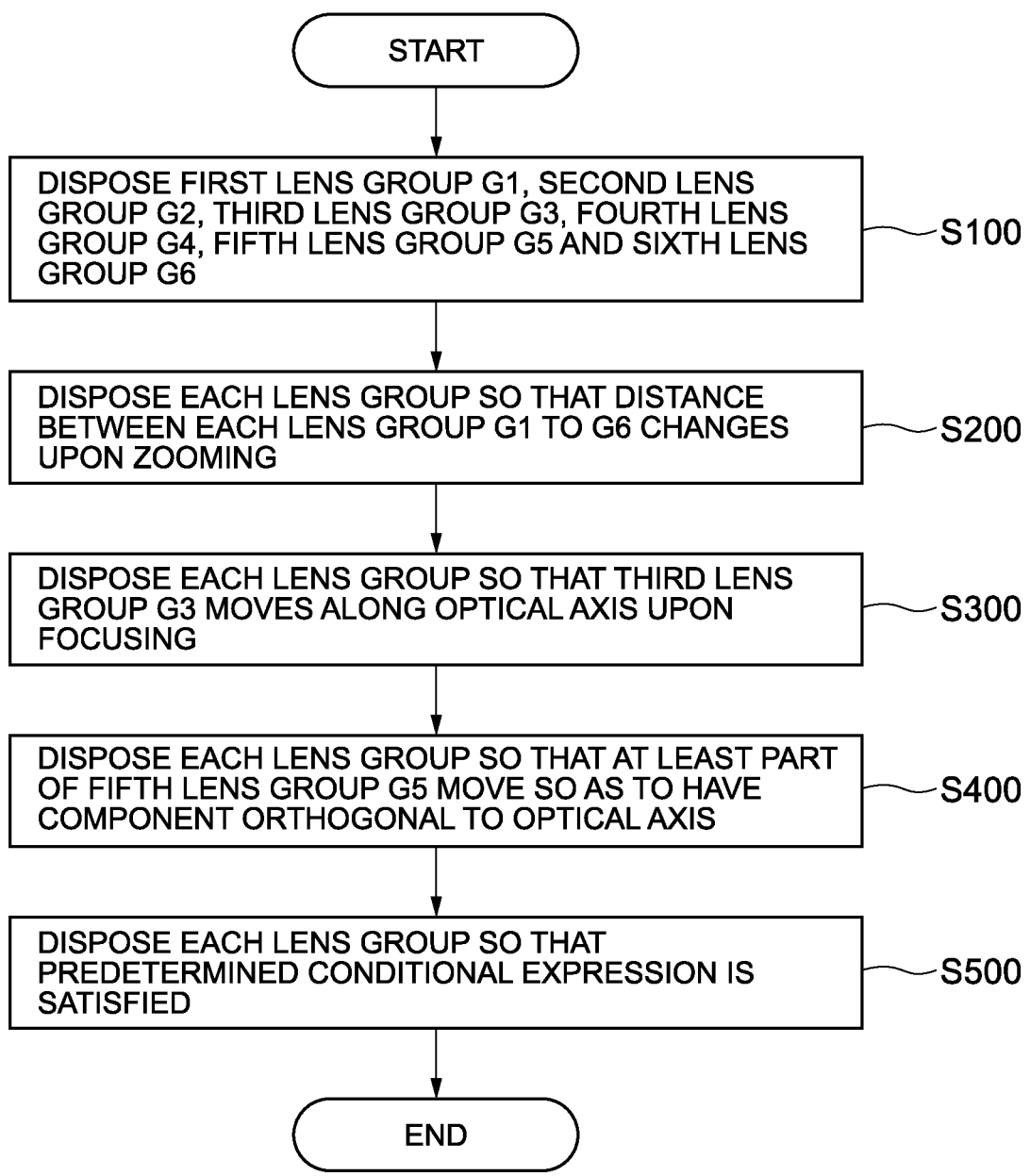
FIG. 29 is a flow chart depicting a method for manufacturing the variable power optical system according to Example 6 or 7.

An outline of a method for manufacturing the variable power optical system ZL according to Embodiment 3 will now be described with reference to FIG. 29. Each lens is disposed to prepare the first to sixth lens groups G1 to G6 respectively (step S100). Each lens group is disposed so that upon zooming from the wide-angle end state to the telephoto end state, the distance between the first lens group G1 and the second lens group G2 changes, the distance between the second lens group G2 and the third lens group G3 changes, the third lens group G3 and the fourth lens group G4 changes, the fourth lens group G4 and the fifth lens group G5 changes, and the fifth lens group G5 and the sixth lens group G6 changes (step S200). Each lens group is disposed so that the third lens group G3 moves in the optical axis direction upon focusing from an object at infinity to an object at a close distance (step S300). Further, each lens group is disposed so that at least a part of the fifth lens group G5 moves so as to have a component in a direction orthogonal to the optical axis (step S400). Then each lens group G1 to G6 is disposed so as to satisfy the above mentioned conditional expression (13) (step S500).

As shown in FIG. 19, which is a concrete example of Embodiment 3, the first lens group G1 is prepared by disposing, in order from the object: a cemented positive lens where a negative meniscus lens L11 having a convex surface facing the object and a biconvex positive lens L12 are cemented; and a positive meniscus lens L13 having a convex surface facing the object. The second lens group G2 is prepared by disposing: a negative meniscus aspherical negative lens L21 having a convex surface facing the object; a biconcave negative lens L22; and a biconvex positive lens L23. The third lens group G3 is prepared by disposing a biconcave aspherical negative lens L31. The fourth lens group G4 is prepared by disposing: a cemented positive lens where a negative meniscus lens L41 having a convex surface facing the object and a biconvex positive lens L42 are cemented; and a cemented positive lens where a biconvex positive lens L43 and a biconcave negative lens L44 are cemented. The fifth lens group G5 is prepared by disposing a cemented negative lens where a biconcave aspherical negative lens L51 and a positive meniscus lens L52 having a convex surface facing the object are cemented. The sixth lens group G6 is prepared by disposing: a positive meniscus lens L61 having a concave surface facing the object; and a cemented positive lens where a biconvex positive lens L62 and a negative meniscus lens L63 having a concave surface facing the object are cemented. Each lens group prepared like this is disposed according to the above mentioned procedure, whereby the variable power optical system ZL is manufactured.

Examples of Embodiment 3

Figure 24:
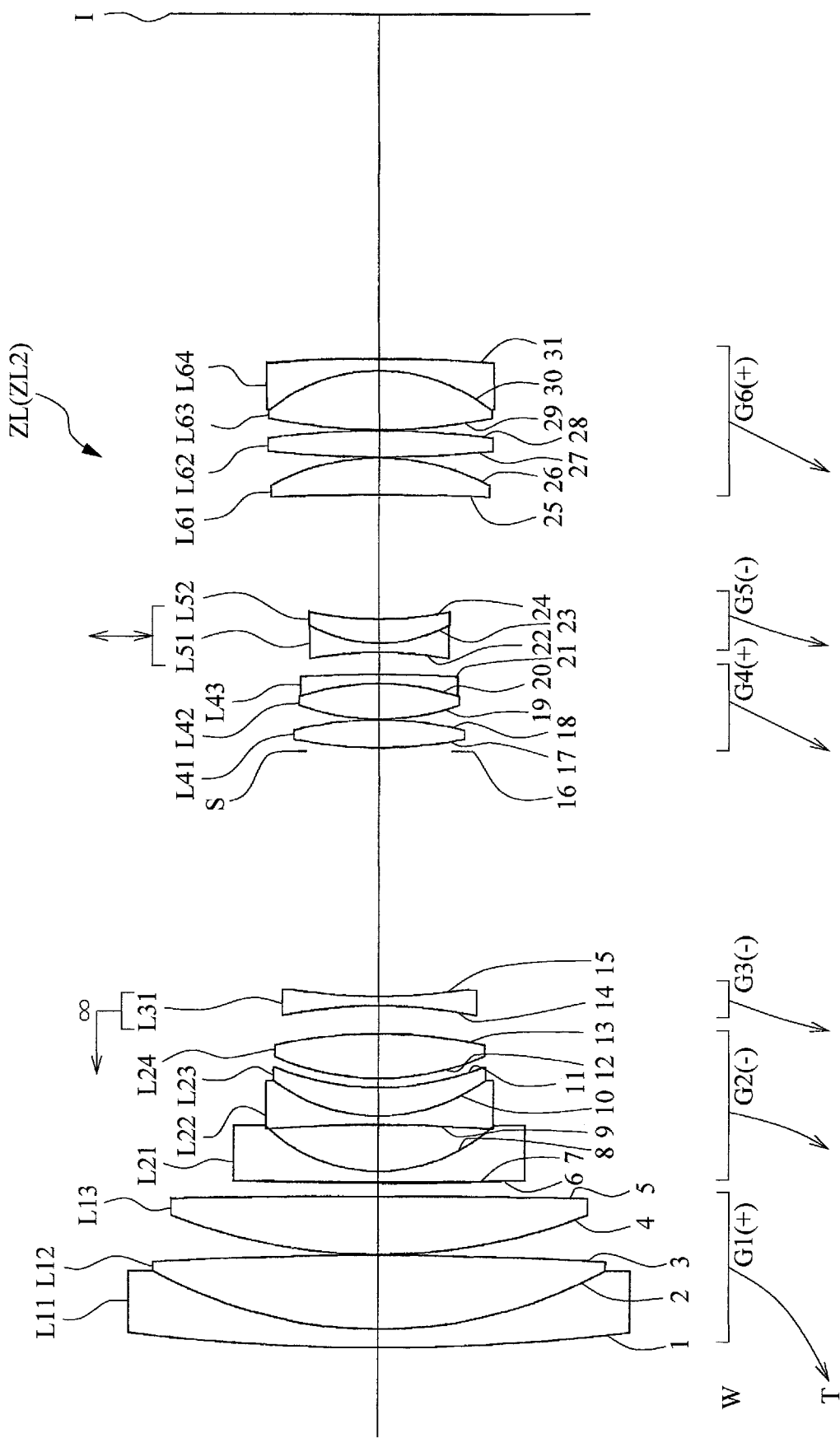
FIG. 24 is a cross-sectional view depicting a lens configuration of a variable power optical system according to Example 7.

Each example of the present embodiment will now be described with reference to the drawings. FIG. 19 and FIG. 24 are cross-sectional views depicting the configuration and refractive power allocation of the variable optical systems ZL (ZL1, ZL2) according to each example. In the lower part of the cross-sectional views of the variable power optical systems ZL1 and ZL2, the moving direction of each lens group G1 to G6, along the optical axis upon zooming from the wide-angle end state (W) to the telephoto end state (T), is indicated by an arrow mark.

EXAMPLE 6

FIG. 19 shows a configuration of a variable power optical system ZL1 according to Example 6. The variable power optical system ZL1 shown in FIG. 19 includes, in order from an object: a first lens group G1 having positive refractive power; a second lens group G2 having negative refractive power; a third lens group G3 having negative refractive power; a fourth lens group G4 having positive refractive power; a fifth lens group G5 having negative refractive power; and a sixth lens group G6 having positive refractive power.

In the variable power optical system ZL1, the first lens group G1 is constituted by, in order from the object: a cemented positive lens where a negative meniscus lens L11 having a convex surface facing the object and a biconvex positive lens L12 are cemented; and a positive meniscus lens L13 having a convex surface facing the object. The second lens group G2 is constituted by, in order from the object: a negative meniscus aspherical negative lens L21 having a convex surface facing the object; a biconcave negative lens L22; and a biconvex positive lens L23. The aspherical negative lens L21 of the second lens group G2 has a thin aspherical plastic resin layer on the object side lens surface. The third lens group G3 is constituted by a biconcave aspherical negative lens L31. The object side lens surface of the aspherical negative lens L31 of the third lens group G3 is aspherical. The fourth lens group G4 is constituted by, in order from the object: a cemented positive lens where a negative meniscus lens L41 having a convex surface facing the object and a biconvex positive lens L42 are cemented; and a cemented positive lens where a biconvex positive lens L43 and a negative meniscus lens L44 having a concave surface facing the object are cemented. The fifth lens group G5 is constituted by, in order from the object: a cemented negative lens where a biconcave aspherical negative lens L51 and a positive meniscus lens L52 having a convex surface facing the object are cemented. The object side lens surface of the aspherical negative lens L51 of the fifth lens group G5 is aspherical. The sixth lens group G6 is constituted by, in order from the object: a positive meniscus lens L61 having a concave surface facing the object; and a cemented positive lens where a biconvex positive lens L62 and a negative meniscus lens L63 having a concave surface facing the object are cemented.

In the variable power optical system ZL1 according to Example 6, upon zooming from the wide-angle end state to the telephoto end state, the first lens group G1 to the sixth lens group G6 move toward the object respectively, so that the air distance between the first lens group G1 and the second lens group G2 increases, the air distance between the second lens group G2 and the third lens group G3 increases, the air distance between the third lens group G3 and the fourth lens group G4 decreases, the air distance between the fourth lens group G4 and the fifth lens group G5 increases, and the air distance between the fifth lens group G5 and the sixth lens group G6 decreases. The aperture stop S is disposed between the third lens group G3 and the fourth lens group G4, and the aperture stop S moves together with the fourth lens group G4 upon zooming. The fourth lens group G4 and the sixth lens group G6 move together upon zooming.

In the variable power optical system ZL1 according to Example 6, focusing from an object at a long distance to an object at a close distance is performed by moving the third lens group G3 toward the object.

In the variable power optical system ZL1 according to Example 6, the fifth lens group G5 is moved so as to have a component in a direction orthogonal to the optical axis, whereby displacement of the image forming position, due to camera shake or the like, is corrected.

To correct an angle θ of rotation blur using a lens system of which the focal length is f and the vibration isolation coefficient (ratio of the moving distance of an image on the image plane with respect to the moving distance of the moving lens group to correct blur) is K, the moving lens group for blur correction is moved in a direction orthogonal to the optical axis by (f·tan θ)/K. In the case of the variable power optical system ZL1 according to Example 6 in the wide-angle end state, the vibration-isolation coefficient is 1.27 and the focal length is 18.5 mm, hence the moving distance of the fifth lens group G5 to correct a 0.60° rotation blur is 0.15 mm. In the case of the variable power optical system ZL1 according to Example 6 in the telephoto end state, the vibration-isolation coefficient is 2.25 and the focal length is 137.1 mm, hence the moving distance of the fifth lens group to correct a 0.20° rotation blur is 0.21 mm.

Table 21 shows the data values of the variable power optical system ZL1 according to Example 6. In [General Data] in Table 21, f indicates a focal length of the variable power optical system, FNO indicates an F number, 2ω indicates an angle of view, Ymax indicates a maximum image height, and TL indicates a total length. The total length TL here indicates a distance on the optical axis from the first surface of the lenses to the image plane I upon focusing on infinity. The first column m in [Lens Data] indicates the sequential number assigned to the lens surface (surface number) counted from the object side along the light traveling direction, the second column r indicates a radius of curvature of each lens surface, the third column d indicates a distance from each optical surface to the next optical surface on the optical axis (surface distance), and the fourth column νd and the fifth column nd indicate an Abbe number and a refractive index a d-line (λ=587.6 nm). The radius of curvature ∞ indicates a plane, and the refractive index of air 1.00000 is omitted. The surface numbers 1 to 29 in Table 21 correspond to the numbers 1 to 29 in FIG. 19.

The [Lens Group Focal Length] indicates the first surface and the focal length of the first to sixth lens group G1 to G6 respectively.

For all the data values, "mm" is normally used as a unit of focal length f, radius of curvature r, surface distance d and other lengths, but unit is not limited to "mm" since an equivalent optical performance is acquired even if an optical system is proportionally expanded or proportionally reduced. The description on the symbols and the description on the data table are the same for the other examples herein below.

TABLE 21

[General Data]

Zoom ratio = 7.41

|  | Wide-angle end state | Intermediate focal length state | Telephoto end state |
|---|---|---|---|
| f = | 18.5~ | 69.8~ | 137.1 |
| FNO = | 3.37~ | 5.35~ | 5.87 |
| 2ω = | 78.0~ | 22.27~ | 11.45 |
| Ymax = | 14.25~ | 14.25~ | 14.25 |
| TL = | 140.30~ | 182.76~ | 206.23 |

[Lens Data]

| m | r | d | nd | νd |  |
|---|---|---|---|---|---|
| Object plane | ∞ |  |  |  |  |
| 1 | 219.5586 | 2.000 | 1.846660 | 23.78 |  |
| 2 | 76.5672 | 8.100 | 1.593190 | 67.90 |  |
| 3 | −193.1433 | 0.100 |  |  |  |
| 4 | 62.9929 | 4.369 | 1.816000 | 46.62 |  |
| 5 | 135.2434 | d5 |  |  |  |
| 6* | 200.0000 | 0.150 | 1.553890 | 38.23 |  |
| 7 | 264.2433 | 1.200 | 1.772499 | 49.61 |  |
| 8 | 14.5524 | 6.639 |  |  |  |
| 9 | −55.9960 | 1.000 | 1.882997 | 40.76 |  |
| 10 | 70.0778 | 1.368 |  |  |  |
| 11 | 34.2278 | 4.994 | 1.846660 | 23.78 |  |
| 12 | −40.2215 | d12 |  |  |  |
| 13* | −38.0000 | 1.000 | 1.816000 | 46.62 |  |
| 14 | 73.1158 | d14 |  |  |  |
| 15 | ∞ | 0.400 |  |  | Aperture stop S |
| 16 | 31.3375 | 1.000 | 2.000690 | 25.45 |  |
| 17 | 17.5382 | 4.020 | 1.696797 | 55.52 |  |
| 18 | −45.2689 | 0.100 |  |  |  |
| 19 | 25.2062 | 3.378 | 1.530784 | 53.99 |  |
| 20 | −50.1174 | 1.000 | 1.902650 | 35.70 |  |
| 21 | 221.7499 | d21 |  |  |  |
| 22* | −49.6292 | 1.000 | 1.729157 | 54.66 |  |
| 23 | 14.2070 | 2.838 | 1.850260 | 32.35 |  |
| 24 | 37.8185 | d24 |  |  |  |
| 25 | −987.2356 | 4.223 | 1.497820 | 82.51 |  |
| 26 | −22.6220 | 0.100 |  |  |  |
| 27 | 42.2054 | 7.527 | 1.487490 | 70.40 |  |
| 28 | −17.4688 | 1.301 | 1.882997 | 40.76 |  |
| 29 | −69.1566 | BF |  |  |  |
| Image plane | ∞ |  |  |  |  |

[Lens Group Focal Length]

| Lens group | First surface | Focal length |
|---|---|---|
| First lens group | 1 | 93.305 |
| Second lens group | 6 | −59.998 |
| Third lens group | 13 | −30.519 |
| Fourth lens group | 15 | 25.075 |
| Fifth lens group | 22 | −34.507 |
| Sixth lens group | 25 | 40.427 |

In this variable power optical system ZL1 according to Example 6, the lens surfaces of Surface 6, Surface 13 and Surface 22 are aspherical. Table 22 shows aspherical data, that is, the values of the conical coefficient K and each aspherical coefficient A4 to A10.

TABLE 22

[Aspherical Data]

|  | K | A4 | A6 | A8 | A10 |
|---|---|---|---|---|---|
| Surface 6 | 22.2541 | 2.73433E−06 | −3.40694E−08 | 8.73889E−11 | −1.04437E−13 |
| Surface 13 | 0.0119 | 1.07136E−06 | 1.36110E−08 | 9.05198E−11 | −2.63445E−13 |
| Surface 22 | 0.5764 | 2.56475E−06 | −5.34939E−09 | 1.12941E−10 | 0.00000E+00 |

In the variable power optical system ZL1 according to Example 6, the axial air distance d5 between the first lens group G1 and the second lens group G2, the axial air distance d12 between the second lens group G2 and the third lens group G3, the axial air distance d14 between the third lens group G3 and the fourth lens group G4, the axial air distance d21 between the fourth lens group G4 and the fifth lens group G5, the axial air distance d24 between the fifth lens group G5 and the sixth lens group G6 and the back focus BF change upon zooming, as mentioned above. Table 23 shows the variable distance and the back focus value in each focal length state of the wide-angle end state, the intermediate focal region state and the telephoto end state upon focusing on infinity and upon focusing on a close point. The back focus BF indicates a distance on the optical axis from the lens surface closest to the image (surface 29 in FIG. 19) to the image plane I. This description is the same for the other examples herein below.

TABLE 23

[Variable Distance Data]

| | Focusing on infinity | | | Focusing on close point | | |
|---|---|---|---|---|---|---|
| | Wide-angle end | Intermediate | Telephoto end | Wide-angle end | Intermediate | Telephoto end |
| f | 18.5 | 69.8 | 137.1 | 18.5 | 69.8 | 137.1 |
| d5 | 1.500 | 28.674 | 46.349 | 1.500 | 28.674 | 46.349 |
| d12 | 2.962 | 4.304 | 7.318 | 2.481 | 3.970 | 6.822 |
| d14 | 26.115 | 7.463 | 3.000 | 26.596 | 7.797 | 3.496 |
| d21 | 2.500 | 7.495 | 8.806 | 2.500 | 7.495 | 8.806 |
| d24 | 11.306 | 6.311 | 5.000 | 11.306 | 6.311 | 5.000 |
| BF | 38.11 | 70.71 | 77.95 | 38.11 | 70.71 | 77.95 |

Table 24 shows each conditional expression correspondence value of the variable power optical system ZL1 according to Example 6. Table 24 shows the value of each focal length in the wide-angle end state, the intermediate focal length state and the telephoto end state, for f12 (composite focal length of the first lens group G1 and the second lens group G2). fw denotes a focal length of the variable power optical system ZL1 in the wide-angle end state, ft denotes a focal length of the variable power optical system ZL1 in the telephoto end state, f1 denotes a focal length of the first lens group G1, f12w denotes a composite focal length of the first lens group G1 and the second lens group G2 in the wide-angle end state, f3 denotes a focal length of the third lens group G3, f4 denotes a focal length of the fourth lens group G4, f5 denotes a focal length of the fifth lens group G5, and f6 denotes a focal length of the sixth lens group G6. This description on the reference symbols is the same for the other examples herein below.

TABLE 24

| | Wide-angle end state | Intermediate focal length state | Telephoto end state |
|---|---|---|---|
| f12 | −131.84 | −366.17 | 2345.12 |

[Conditional Expression Correspondence Value]

| (13) | f5/f3 = 1.131 |
| (14) | f12w/f3 = 4.320 |
| (15) | f1/ft = 0.680 |
| (16) | f4/fw = 1.355 |
| (17) | (−f5)/fw = 1.865 |
| (18) | f6/fw = 2.185 |

Thus the variable power optical system ZL1 according to Example 6 satisfies all the conditional expressions (13) to (18).

Figure 20B:
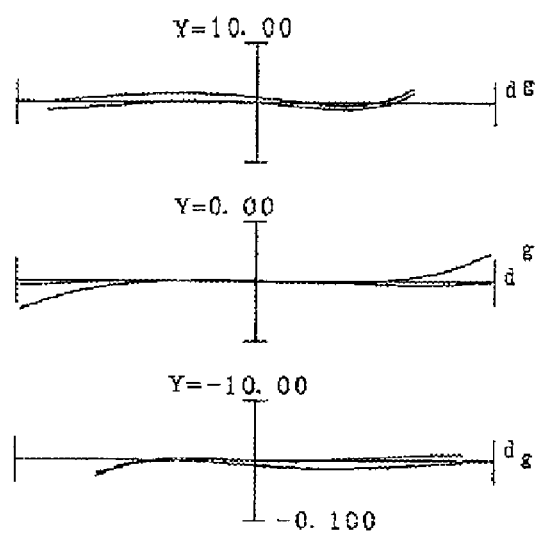
Figure 21:
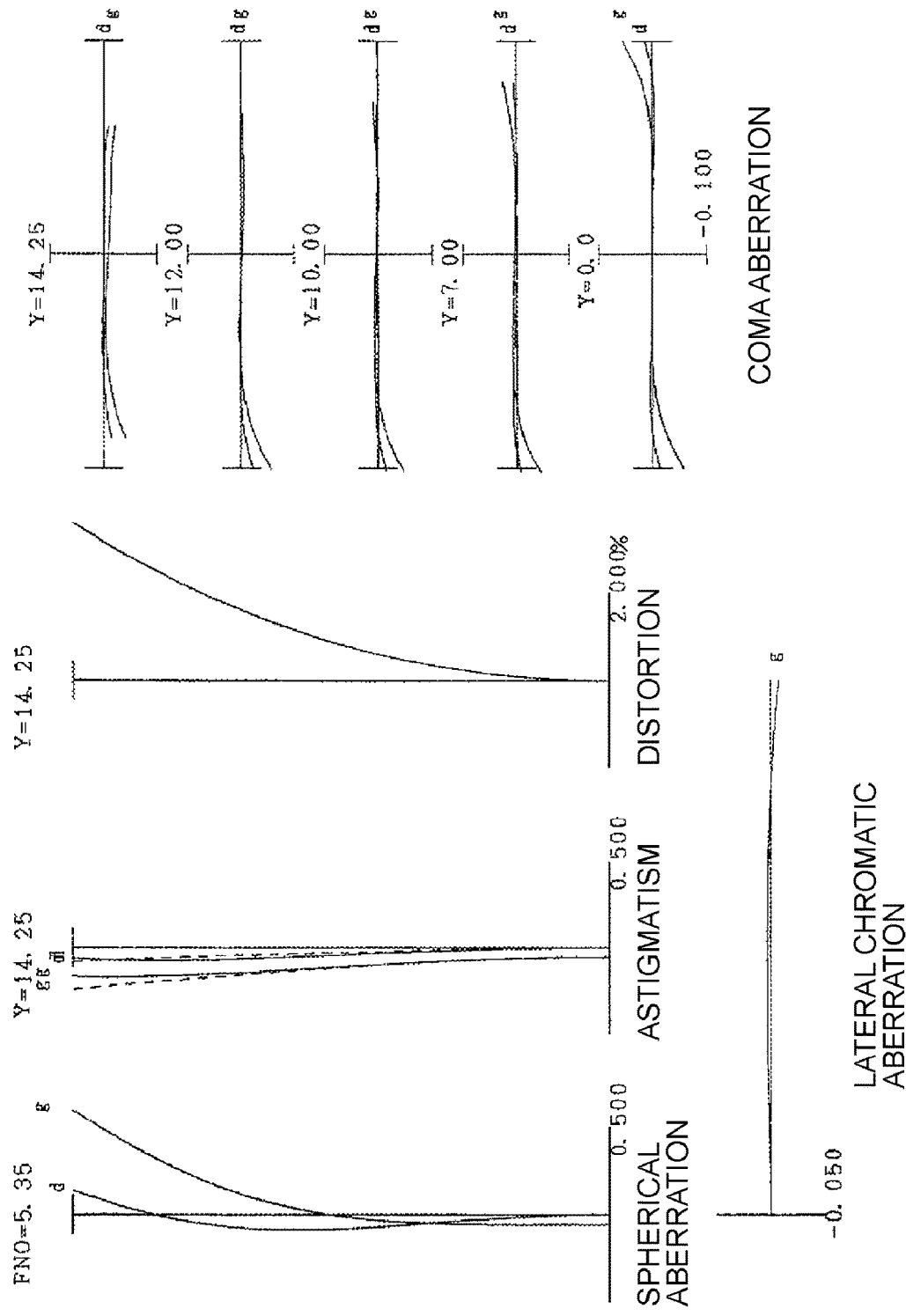
FIG. 21 is a set of graphs showing various aberrations of the variable power optical system according to Example 6 upon focusing on infinity in the intermediate focal length state, indicating spherical aberration, astigmatism, distortion, lateral chromatic aberration and coma aberration.
Figure 22B:
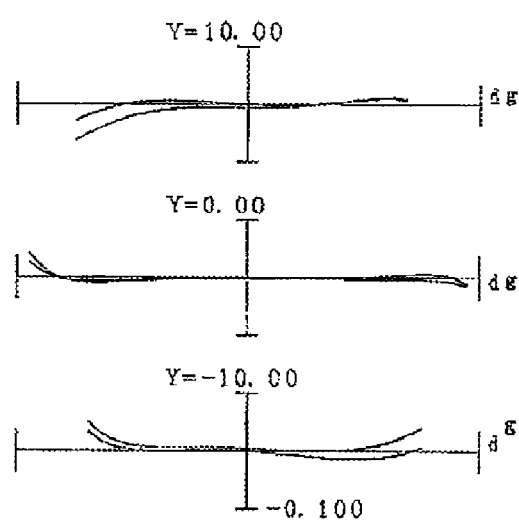
Figure 23A:
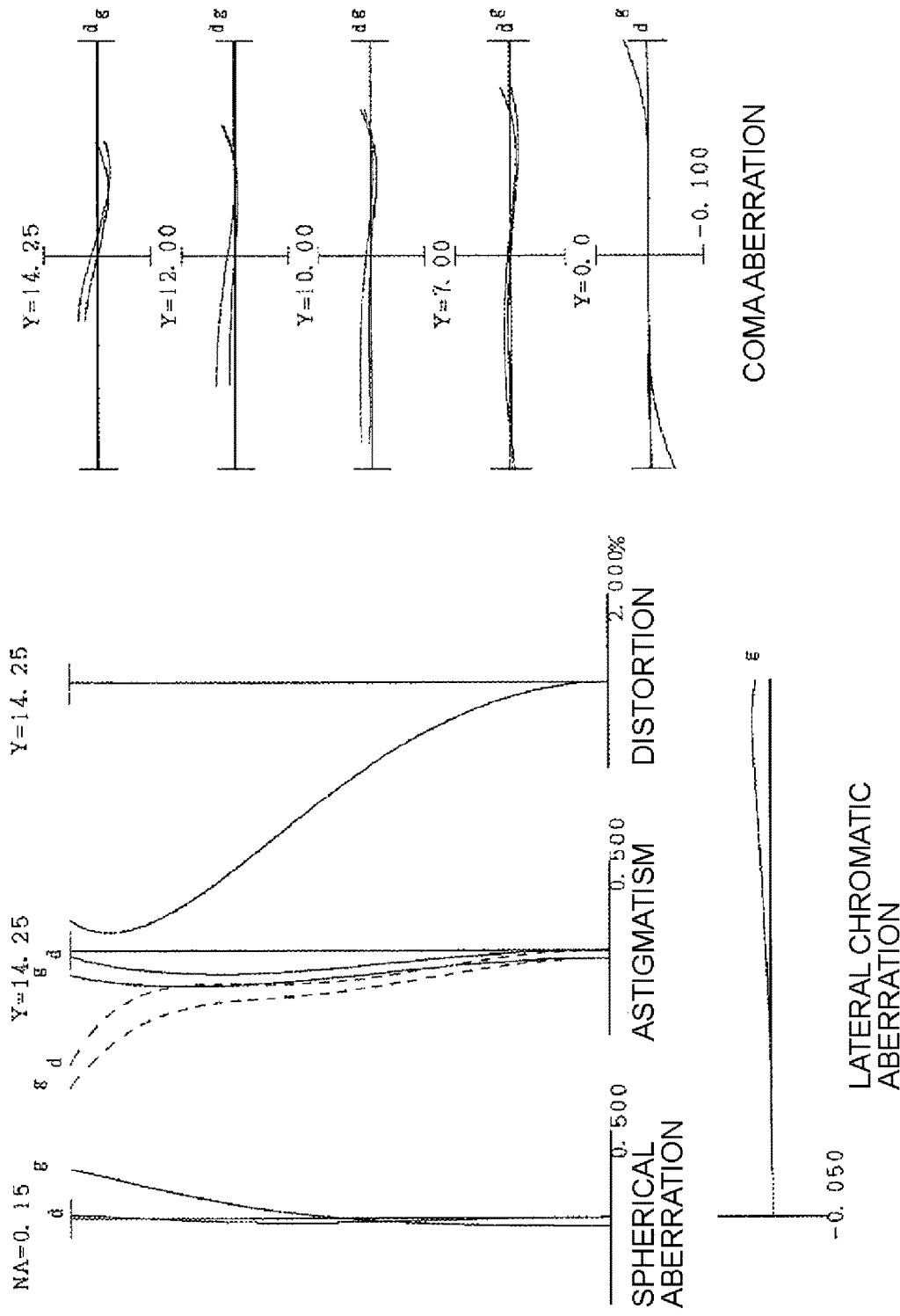
FIGS. 23A, 23B and 23C are sets of graphs showing various aberrations of the variable power optical system according to Example 6 upon focusing on a close point, indicating spherical aberration, astigmatism, distortion, lateral chromatic aberration and coma aberration, where FIG. 23A indicates the wide-angle end state, FIG. 23B indicates the intermediate focal length state, and FIG. 23C indicates the telephoto end state.
Figure 23B:
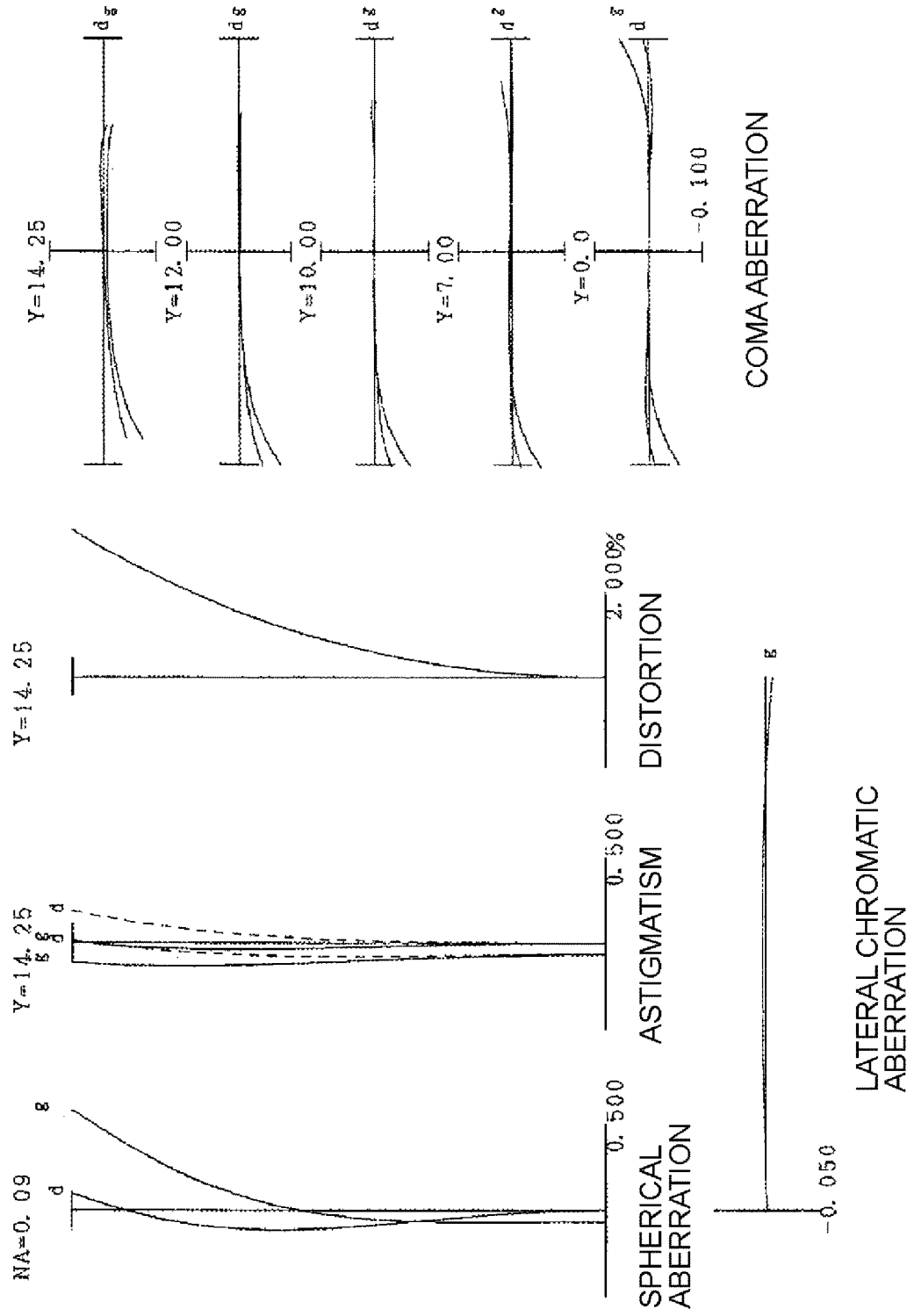
Figure 23C:
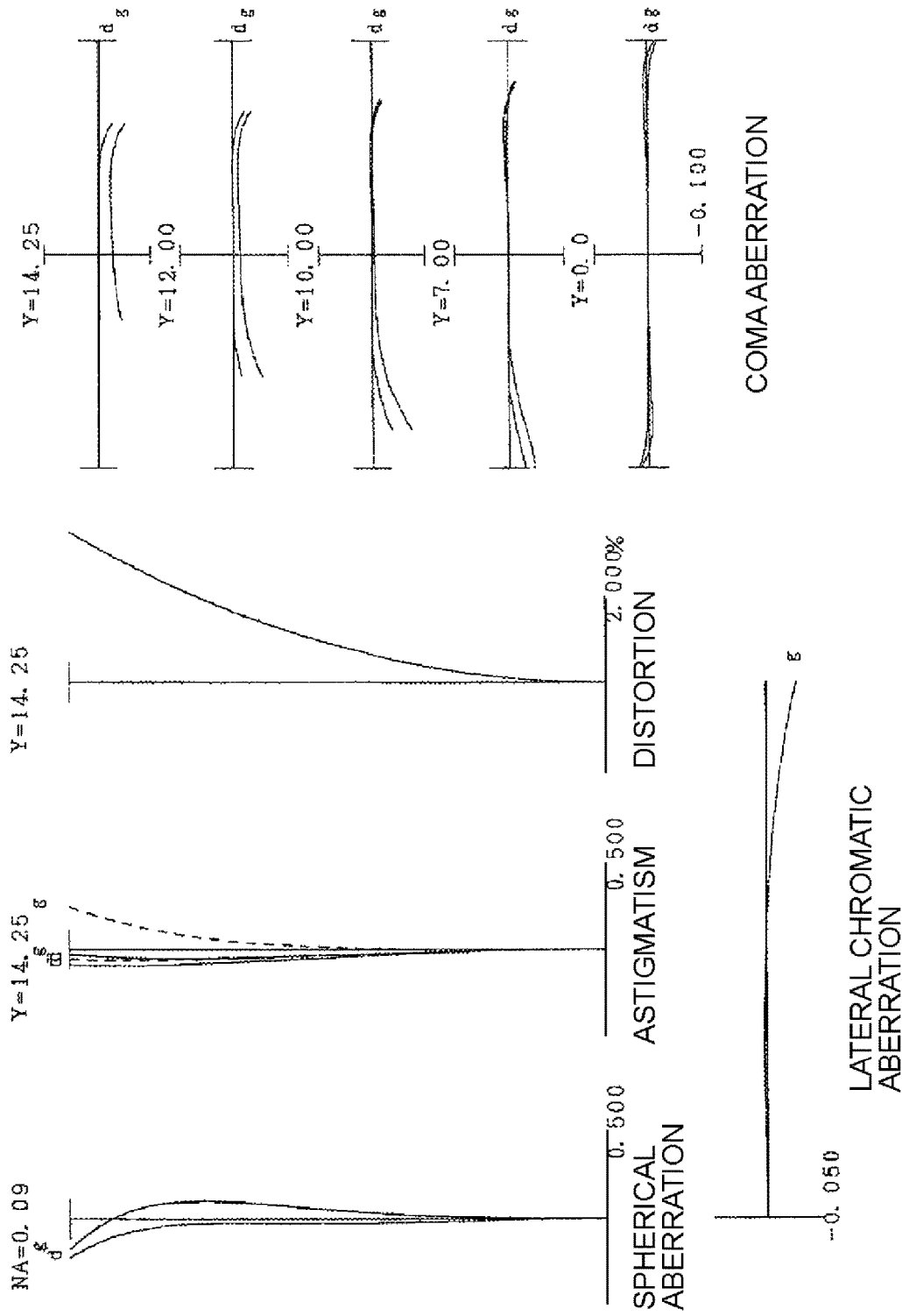

FIG. 20A is a set of graphs showing various aberrations of the variable power optical system ZL1 according to Example 6 upon focusing on infinity in the wide-angle end state, FIG. 21 is a set of graphs showing various aberrations thereof upon focusing on infinity in the intermediate focal length state, and FIG. 22A is a set of graphs showing various aberrations thereof upon focusing on infinity in the telephoto end state. FIG. 20B is a set of graphs showing coma aberration of the variable power optical system ZL1 of Example 6 after blur correction is performed upon focusing on infinity in the wide-angle end state, and FIG. 22B is a set of graphs showing coma aberration thereof after blur correction is performed upon focusing on infinity in the telephoto end state. FIG. 23A to FIG. 23C is a set of graphs showing various aberrations of the variable power optical system ZL1 of Example 6 upon focusing on a close point in the wide-angle end state, the intermediate focal length state and the telephoto end state respectively. In each graph showing aberration, FNO indicates an F number, NA indicates a numerical aperture, and Y indicates an image height. In the graph showing spherical aberration, an F number or a value of a numerical aperture corresponding to the maximum aperture is shown, in the graphs showing astigmatism and distortion, the maximum value of the image height is shown, and in the graphs showing coma aberration, a value of each image height is shown. d indicates d-line ($\lambda$=587.6 nm) and g indicates g-line ($\lambda$=435.8 nm). In each graph showing astigmatism, the solid line indicates the sagittal image plane, and the broken line indicates the meridional image plan. The same reference symbols as this example are also used for the graphs showing aberration of the other examples herein below. As these graphs showing various aberrations clarify, the variable power optical system ZL1 according to Example 6 has excellent image forming performance, with correcting various aberrations well throughout the wide-angle end state to the telephoto end state, and also demonstrates excellent image forming performance even upon focusing on a close point.

EXAMPLE 7

FIG. 24 shows a configuration of a variable power optical system ZL2 according to Example 7. The variable power optical system ZL2 shown in FIG. 24 includes, in order from an object: a first lens group G1 having positive refractive power; a second lens group G2 having negative refractive power; a third lens group G3 having negative refractive power; a fourth lens group G4 having positive refractive power; a fifth lens group G5 having negative refractive power; and a sixth lens group G6 having positive refractive power.

In the variable power optical system ZL2, the first lens group G1 is constituted by, in order from the object: a cemented negative lens where a negative meniscus lens L11 having a convex surface facing the object and a biconvex positive lens L12 are cemented; and a biconvex positive lens L13. The second lens group G2 is constituted by, in order from the object: a negative meniscus aspherical negative lens L21 having a convex surface facing the object; a cemented negative lens where a biconvex negative lens L22 and a positive meniscus lens L23 having a biconvex surface facing the object are cemented; and a biconvex positive lens L24. The aspherical negative lens L21 of the second lens group G2 has a thin aspherical plastic resin layer on the object side lens surface. The third lens group G3 is constituted by a biconcave aspherical negative lens L31. The object side lens surface of the aspherical negative lens L31 of the third lens group G3 is aspherical. The fourth lens group G4 is constituted by, in order from the object: a biconvex positive lens L41; and a cemented positive lens where a biconvex positive lens L42 and a negative meniscus lens L43 having a concave surface facing the object are cemented. The fifth lens group G5 is constituted by, in order from the object: a cemented negative lens where a biconcave aspherical negative lens L51 and a positive meniscus lens L52 having a convex surface facing the object are cemented. The object side lens surface of the aspherical negative lens L51 of the fifth lens group G5 is aspherical. The sixth lens group G6 is constituted by, in order from the object: a positive meniscus lens L61 having a concave surface facing the object; a biconvex positive lens L62; and a cemented negative lens where a biconvex positive lens L63 and a negative meniscus lens L64 having a concave surface facing the object are cemented.

In the variable power optical system ZL2 according to Example 7, upon zooming from the wide-angle end state to the telephoto end state, the first lens group G1 to the sixth lens group G6 move toward the object respectively, so that the air distance between the first lens group G1 and the second lens group G2 increases, the air distance between the second lens group G2 and the third lens group G3 increases, the air distance between the third lens group G3 and the fourth lens group G4 decreases, the air distance between the fourth lens group G4 and the fifth lens group G5 increases, and the air distance between the fifth lens group G5 and the sixth lens group G6 decreases. An aperture stop S is disposed between the third lens group G3 and the fourth lens group G4, and the aperture stop S moves together with the fourth lens group G4 upon zooming. Further, the fourth lens group G4 and the sixth lens group G6 move together upon zooming.

In the variable power optical system ZL2 according to Example 7, focusing from an object at a long distance to an object at a close distance is performed by moving the third lens group G3 toward the object.

In the variable power optical system ZL2 according to Example 7, the fifth lens group G5 is moved so as to have a component in a direction orthogonal to the optical axis, whereby displacement of the image forming position, due to camera shake or the like, is corrected. In the case of the variable power optical system ZL2 according to Example 7 in the wide-angle end state, the vibration-isolation coefficient is 1.37 and the focal length is 18.5 mm, hence the moving distance of the fifth lens group G5 to correct a 0.60° rotation blur is 0.14 mm. In the case of the variable power optical system ZL2 according to Example 7 in the telephoto end state, the vibration-isolation coefficient is 2.46 and the focal length is 137.2 mm, hence the moving distance of the fifth lens group to correct a 0.20° rotation blur is 0.19 mm.

Table 25 shows the data values of the variable power optical system ZL2 according to Example 7. The surface numbers 1 to 31 in Table 25 correspond to the numbers 1 to 31 in FIG. 24.

TABLE 25

[General Data]

Zoom ratio = 7.42

| | Wide-angle end state | Intermediate focal length state | Telephoto end state |
|---|---|---|---|
| f = | 18.5~ | 69.5~ | 137.2 |
| FNO = | 3.23~ | 5.27~ | 5.94 |
| 2ω = | 78.1~ | 22.37~ | 11.44 |
| Ymax = | 14.25~ | 14.25~ | 14.25 |
| TL = | 147.44~ | 186.83~ | 213.32 |

[Lens Data]

| m | r | d | nd | νd |
|---|---|---|---|---|
| Object plane | ∞ | | | |
| 1 | 240.0000 | 2.000 | 1.800999 | 34.96 |
| 2 | 52.7117 | 8.100 | 1.497820 | 82.51 |
| 3 | −443.0237 | 0.100 | | |
| 4 | 64.5223 | 6.447 | 1.696797 | 55.52 |
| 5 | −936.2592 | d5 | | |
| 6* | 500.0000 | 0.150 | 1.553890 | 38.23 |
| 7 | 822.4858 | 1.200 | 1.772499 | 49.61 |
| 8 | 18.2758 | 5.256 | | |
| 9 | −165.4567 | 1.000 | 1.816000 | 46.62 |
| 10 | 19.8601 | 3.118 | 1.622049 | 36.15 |
| 11 | 32.0132 | 1.000 | | |
| 12 | 29.4566 | 4.897 | 1.846660 | 23.78 |
| 13 | −55.0484 | d13 | | |
| 14* | −49.4019 | 1.000 | 1.816000 | 46.62 |
| 15 | 61.9839 | d15 | | |
| 16 | ∞ | 0.400 | | Aperture stop S |
| 17 | 48.3794 | 3.113 | 1.639999 | 60.09 |
| 18 | −39.1683 | 0.100 | | |
| 19 | 26.2287 | 4.086 | 1.487490 | 70.40 |
| 20 | −26.5392 | 1.000 | 1.846660 | 23.78 |
| 21 | −148.2799 | d21 | | |
| 22* | −42.1109 | 1.000 | 1.729157 | 52.66 |
| 23 | 16.2392 | 2.676 | 1.850260 | 31.35 |
| 24 | 40.3742 | d24 | | |
| 25 | −302.1886 | 4.124 | 1.497820 | 82.51 |
| 26 | −25.5978 | 0.100 | | |
| 27 | 141.8594 | 2.868 | 1.557443 | 45.43 |
| 28 | −91.1593 | 0.100 | | |
| 29 | 62.4497 | 6.548 | 1.487490 | 70.40 |
| 30 | −19.7577 | 1.301 | 1.834807 | 44.72 |
| 31 | −154.3786 | BF | | |
| Image plane | ∞ | | | |

TABLE 25-continued

[General Data]

[Lens Group Focal Length]

| Lens group | First surface | Focal length |
|---|---|---|
| First lens group | 1 | 96.473 |
| Second lens group | 6 | −50.028 |
| Third lens group | 14 | −33.555 |
| Fourth lens group | 16 | 24.677 |
| Fifth lens group | 22 | −31.897 |
| Sixth lens group | 25 | 39.477 |

In this variable power optical system ZL2 according to Example 7, the lens surfaces of Surface 6, Surface 14 and Surface 22 are aspherical. Table 26 shows aspherical data, that is, the values of the conical coefficient K and each aspherical coefficient A4 to A10.

TABLE 26

[Aspherical Data]

| | K | A4 | A6 | A8 | A10 |
|---|---|---|---|---|---|
| Surface 6 | 1.0000 | 2.02178E−06 | −1.91245E−08 | 5.41632E−11 | −7.16953E−14 |
| Surface 14 | 1.0000 | 6.73106E−06 | 1.51641E−08 | −6.05979E−11 | 0.00000E+00 |
| Surface 22 | 1.0000 | 6.96942E−06 | 4.75469E−10 | 2.28841E−11 | 0.00000E+00 |

In the variable power optical system ZL2 according to Example 7, the axial air distance d5 between the first lens group G1 and the second lens group G2, the axial air distance d13 between the second lens group G2 and the third lens group G3, the axial air distance d15 between the third lens group G3 and the fourth lens group G4, the axial air distance d21 between the fourth lens group G4 and the fifth lens group G5, the axial air distance d24 between the fifth lens group G5 and the sixth lens group G6 and the back focus BF change upon zooming, as mentioned above. Table 27 shows the variable distance and the back focus value in each focal length state of the wide-angle end state, the intermediate focal region state and the telephoto end state upon focusing on infinity and upon focusing on a close point.

TABLE 27

[Variable Distance Data]

| | Focusing on infinity | | | Focusing on close point | | |
|---|---|---|---|---|---|---|
| | Wide-angle end | Inter-mediate | Telephoto end | Wide-angle end | Inter-mediate | Telephoto end |
| f | 18.5 | 69.5 | 137.2 | 18.5 | 69.5 | 137.2 |
| d5 | 1.500 | 27.643 | 46.848 | 1.500 | 27.643 | 46.848 |
| d13 | 3.056 | 4.300 | 7.199 | 2.535 | 3.977 | 6.751 |
| d15 | 27.000 | 7.501 | 3.000 | 27.521 | 7.823 | 3.448 |
| d21 | 2.500 | 9.585 | 11.183 | 2.500 | 9.585 | 11.183 |
| d24 | 13.683 | 6.598 | 5.000 | 13.683 | 6.598 | 5.000 |
| BF | 38.02 | 69.51 | 78.41 | 38.02 | 69.51 | 78.41 |

Table 28 shows each conditional expression correspondence value of the variable power optical system ZL2 according to Example 7.

TABLE 28

| | Wide-angle end state | Intermediate focal length state | Telephoto end state |
|---|---|---|---|
| f12 | −93.11 | −187.87 | −744.06 |

[Conditional Expression Correspondence Value]

| (13) | f5/f3 = 0.951 |
|---|---|
| (14) | f12w/f3 = 2.775 |
| (15) | f1/ft = 0.703 |
| (16) | f4/fw = 1.334 |
| (17) | (−f5)/fw = 1.724 |
| (18) | f6/fw = 2.134 |

Thus the variable power optical system ZL2 according to Example 7 satisfies all the conditional expressions (13) to (18).

Figure 25A:
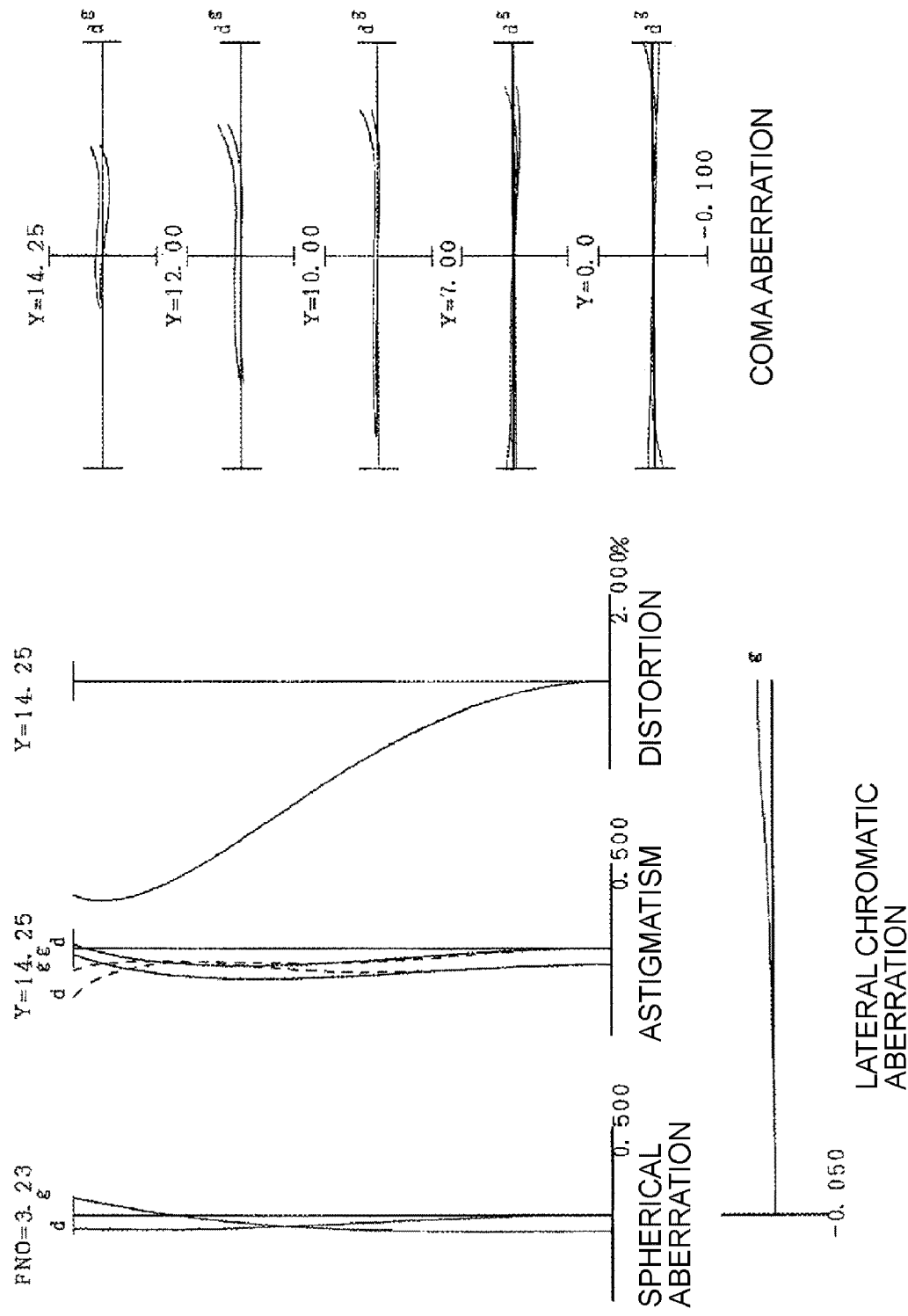
FIGS. 25A and 25B are sets of graphs showing various aberrations of the variable power optical system according to Example 7 upon focusing on infinity in the wide-angle end state, where FIG. 25A indicates each graph showing spherical aberration, astigmatism, distortion, lateral chromatic aberration and coma aberration, and FIG. 25B indicates a graph showing coma aberration after blur correction is performed for a 0.60° rotation blur.
Figure 25B:
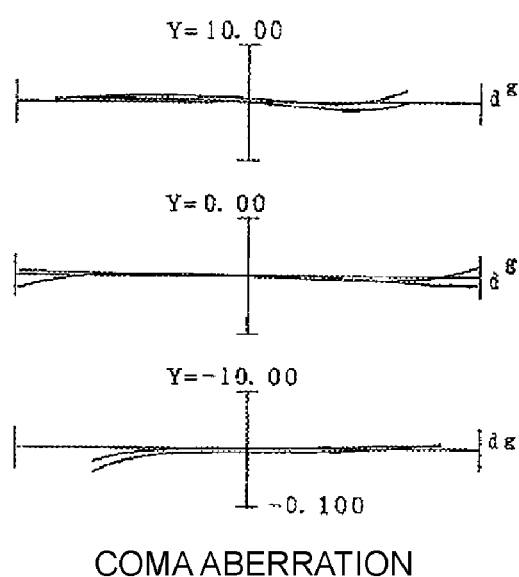
Figure 26:
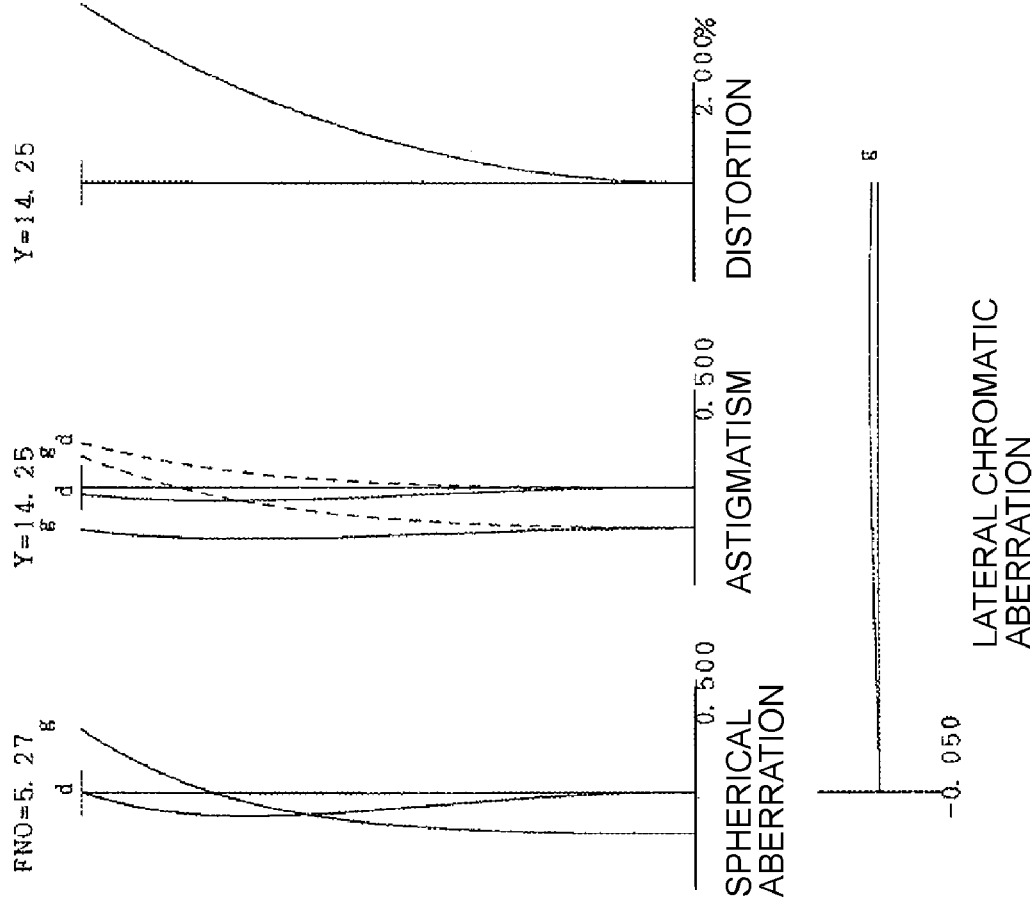
FIG. 26 is a set of graphs showing various aberrations of the variable power optical system according to Example 7 upon focusing on infinity in the intermediate focal length state, indicating spherical aberration, astigmatism, distortion, lateral chromatic aberration and coma aberration.
Figure 27B:
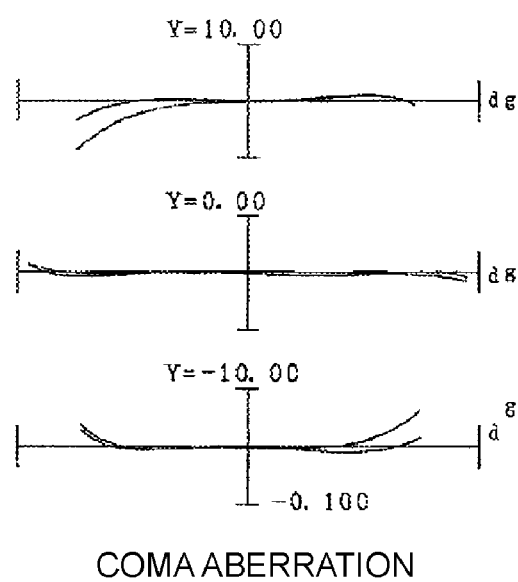
Figure 28A:
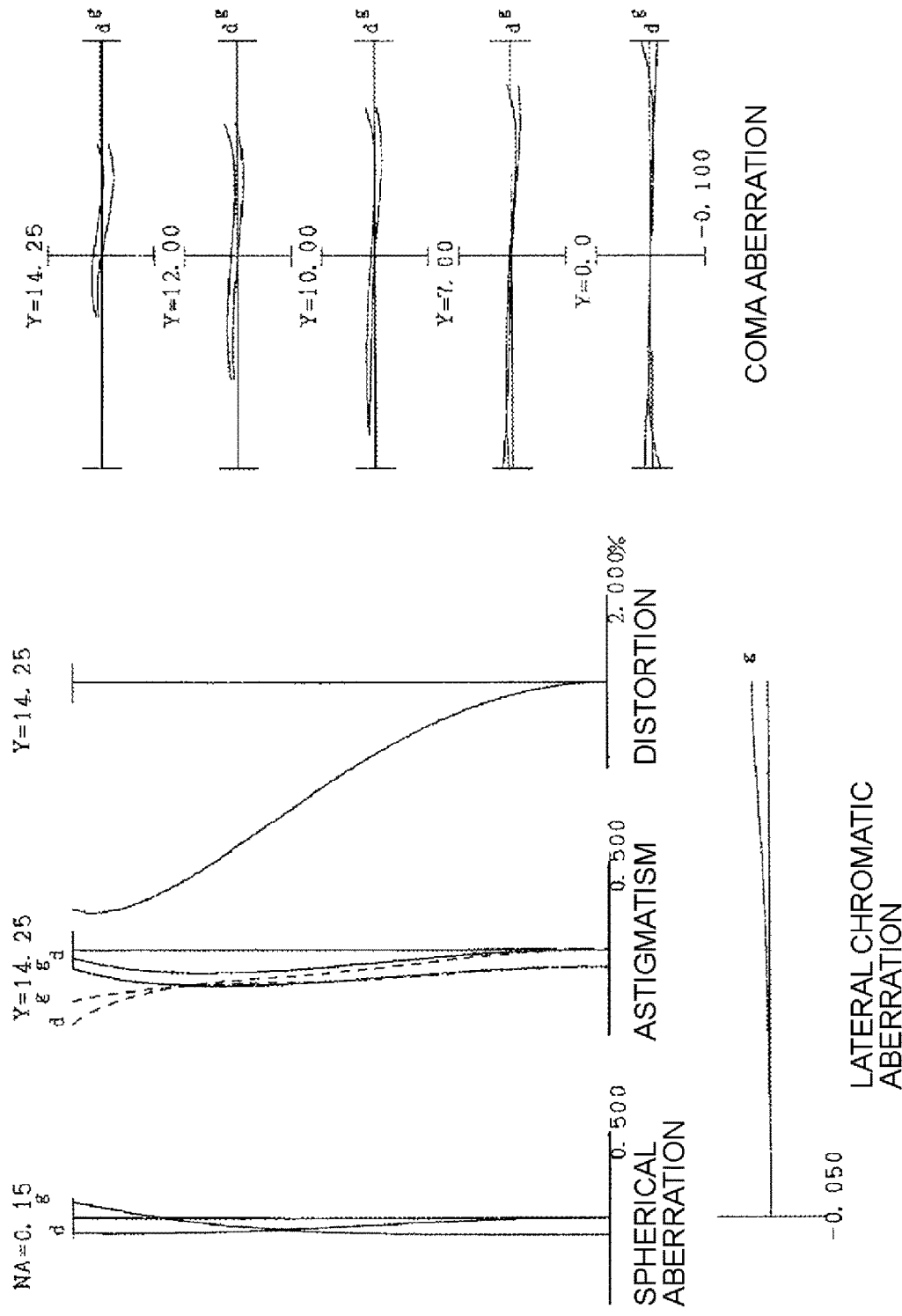
FIGS. 28A, 28B and 28C are sets of graphs showing various aberrations of the variable power optical system according to Example 7 upon focusing on a close point, indicating spherical aberration, astigmatism, distortion, lateral chromatic aberration and coma aberration, where FIG. 28A indicates the wide-angle end state, FIG. 28B indicates the intermediate focal length state, and FIG. 28C indicates the telephoto end state.
Figure 28B:
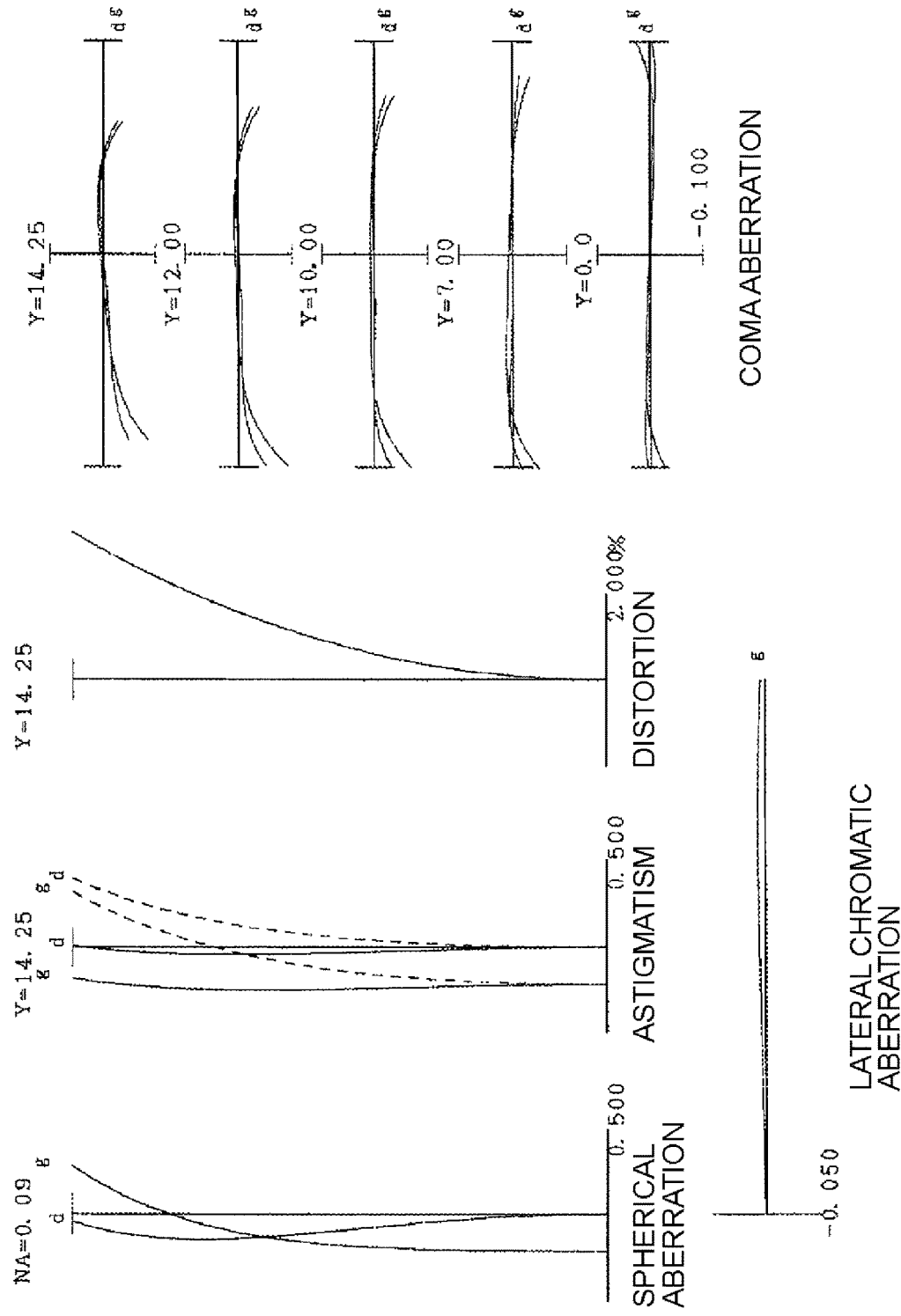
Figure 28C:
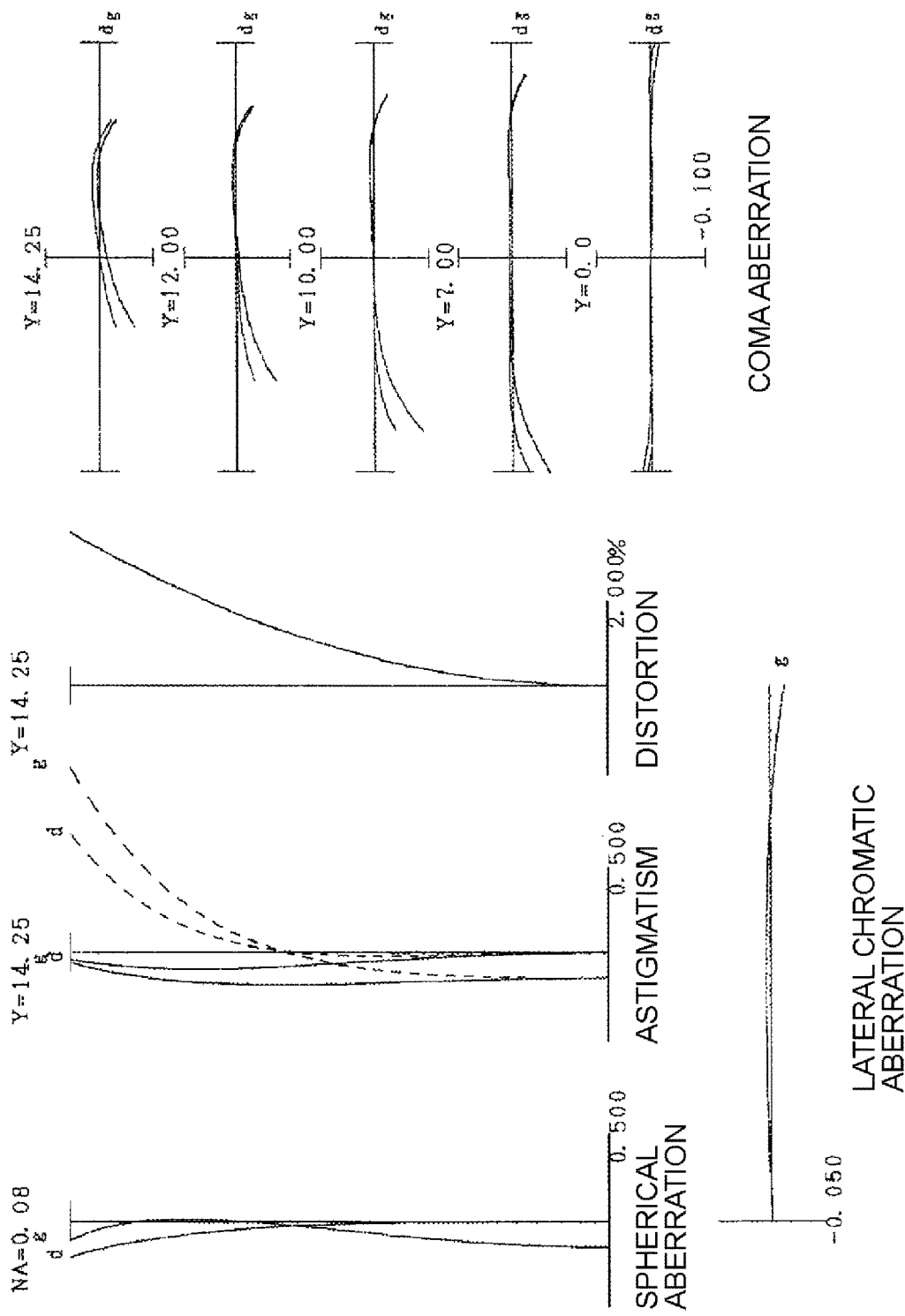

FIG. 25A is a set of graphs showing various aberrations of the variable power optical system ZL2 according to Example 7 upon focusing on infinity in the wide-angle end state, FIG. 26 is a set of graphs showing various aberrations thereof upon focusing on infinity in the intermediate focal length state, and FIG. 27A is a set of graphs showing various aberrations thereof upon focusing on infinity in the telephoto end state. FIG. 25B is a set of graphs showing coma aberration of the variable power optical system ZL2 of Example 7 after blur correction is performed upon focusing on infinity in the wide-angle end state, and FIG. 27B is a set of graphs showing coma aberration thereof after blur correction is performed upon focusing on infinity in the telephoto end state. FIG. 28A to FIG. 28C is a set of graphs showing various aberrations of the variable power optical system ZL2 of Example 7 upon focusing on a close point in the wide-angle end state, the intermediate focal length state and the telephoto end state respectively. As these graphs showing various aberrations clarify, the variable power optical system ZL2 according to Example 7 has excellent image forming performance, with correcting various aberrations well throughout the wide-angle end state to the telephoto end state, and also demonstrates excellent image forming performance even upon focusing on a close point.

Each of the above examples is merely a preferred embodiment of the invention, and the present invention is not limited to these examples.

EXPLANATION OF NUMERALS AND CHARACTERS

1 camera (optical apparatus)
ZL (ZL1, ZL2) variable power optical system
G1 first lens group
G2 second lens group
G3 third lens group
G4 fourth lens group
G5 fifth lens group
G6 sixth lens group

RELATED APPLICATIONS

This is a continuation of PCT International Application No. PCT/JP2014/003955, filed on Jul. 28, 2014, which is hereby incorporated by reference. This application also claims the benefit of Japanese Patent Application Nos. 2013-157106, 2013-157108 and 2013-157109 filed in Japan on Jul. 29, 2013, which are hereby incorporated by reference.

The invention claimed is:

1. A variable power optical system comprising, in order from an object:
   a first lens group having positive refractive power;
   a second lens group having negative refractive power;
   a third lens group having negative refractive power;
   a fourth lens group having positive refractive power; and
   a fifth lens group,
   upon zooming from a wide-angle end state to a telephoto end state, a distance between the first lens group and the second lens group changing, a distance between the second lens group and the third lens group changing, a distance between the third lens group and the fourth lens group changing, and a distance between the fourth lens group and the fifth lens group changing,
   the first lens group consisting of a cemented lens and a single lens arranged in order from the object, and
   the following conditional expression being satisfied:

$$3.80 < f1/fw \leq 4.325$$

where
f1: focal length of the first lens group
fw: focal length of the variable power optical system in the wide-angle end state.

2. The variable power optical system according to claim 1, wherein the fifth lens group has positive refractive power.

3. The variable power optical system according to claim 1, wherein upon zooming from the wide-angle end state to the telephoto end state, the first lens group moves toward the object.

4. The variable power optical system according to claim 1, wherein upon zooming from the wide-angle end state to the telephoto end state, the distance between the first lens group and the second lens group increases, and the distance between the third lens group and the fourth lens group decreases.

5. The variable power optical system according to claim 1, wherein
   the following conditional expression is satisfied:

$$0.990 < (A \times B)/(C \times D) < 1.013$$

where
$A = f3 \times (1-\beta 3w)^2 \times (1+\beta 3w) \times \beta bw^2 - \Delta \times \beta 3w^2$
$B = fbw \times (1-\beta bw) + \Delta$
$C = f3 \times (1-\beta 3w)^2 \times (1+\beta 3w) \times \beta bw^2 - \Delta \times \beta 3w$
$D = fbw \times (1-\beta bw) + \Delta/\beta bw$
$\Delta = Ymax/50$
β3w: imaging magnification of the third lens group in the wide-angle end state
βbw: composite imaging magnification of the fourth and later lens groups in the wide-angle end state
Ymax: maximum image height
f3: focal length of the third lens group
fbw: composite focal length of the fourth and later lens groups in the wide-angle end state.

6. The variable power optical system according to claim 1, wherein upon zooming from the wide-angle end state to the telephoto end state, the fourth lens group and the fifth lens group move toward the object.

7. The variable power optical system according to claim 1, wherein upon zooming from the wide-angle end state to the telephoto end state, the distance between the second lens group and the third lens group increases, and the distance between the fourth lens group and the fifth lens group decreases.

8. The variable power optical system according to claim 1, wherein
   the following conditional expression is satisfied:

$$0.35 < f3/f2 < 0.90$$

where
f2: focal length of the second lens group
f3: focal length of the third lens group.

9. The variable power optical system according to claim 1, wherein
   the following conditional expression is satisfied:

$$1.10 < f1/(-f2) < 2.00$$

where
f2: focal length of the second lens group.

10. The variable power optical system according to claim 1, wherein
    the following conditional expression is satisfied:

$$0.72 < f4/f5 < 1.45$$

where
f4: focal length of the fourth lens group
f5: focal length of the fifth lens group.

11. The variable power optical system according to claim 1, wherein
    the following conditional expression is satisfied:

$$0.15 < (D45w - D45t)/fw < 0.40$$

where
D45w: distance between the fourth lens group and the fifth lens group in the wide-angle end state
D45t: distance between the fourth lens group and the fifth lens group in the telephoto end state
fw: focal length of the variable power optical system in the wide-angle end state.

12. The variable power optical system according to claim 1, further comprising a sixth lens group having positive refractive power, wherein the fifth lens group has negative refractive power.

13. An optical apparatus comprising the variable power optical system according to claim 1.

14. The variable power optical system according to claim 1, wherein
    the following conditional expression is satisfied:

$$0.45 < f1/ft < 0.90$$

where
f1: focal length of the first lens group
ft: focal length of the variable power optical system in the telephoto end state.

15. The variable power optical system according to claim 1, wherein, the fifth lens group comprises a cemented lens.

16. The variable power optical system according to claim 1, wherein, upon focusing from an object at infinity to an object at a close distance, the third lens group moving in the optical axis direction.

17. A variable power optical system comprising, in order from an object:
   a first lens group having positive refractive power;
   a second lens group having negative refractive power;
   a third lens group having negative refractive power;
   a fourth lens group having positive refractive power; and
   a fifth lens group,
   upon zooming from a wide-angle end state to a telephoto end state, a distance between the first lens group and the second lens group changing, a distance between the second lens group and the third lens group changing, a distance between the third lens group and the fourth lens group changing, and a distance between the fourth lens group and the fifth lens group changing,
   the first lens group consisting of a cemented lens and a single lens arranged in order from the object,
   the fourth lens group comprising six lenses, and
   the following conditional expression being satisfied:

$$0.72 < f4/f5 < 1.45$$

where
   f4: focal length of the fourth lens group
   f5: focal length of the fifth lens group.

18. A method for manufacturing a variable power optical system including, in order from an object:
   a first lens group having positive refractive power;
   a second lens group having negative refractive power;
   a third lens group having negative refractive power;
   a fourth lens group having positive refractive power; and
   a fifth lens group,
   the method comprising:
   disposing each lens group so that, upon zooming from a wide-angle end state to a telephoto end state, a distance between the first lens group and the second lens group changes, a distance between the second lens group and the third lens group changes, a distance between the third lens group and the fourth lens group changes, and a distance between the fourth lens group and the fifth lens group changes; and
   configured the first lens group to consist of a cemented lens and a single lens arranged in order from the object,
   the method further comprising at least one of the following features (A) and (B):
   (A) satisfying the following conditional expression:

$$3.80 < f1/fw \leq 4.325$$

where
   f1: focal length of the first lens group
   fw: focal length of the variable power optical system in the wide-angle end state;
   (B) configuring the fourth lens group to comprise six lenses, and satisfying the following conditional expression:

$$0.72 < f4/f5 < 1.45$$

where
   f4: focal length of the fourth lens group
   f5: focal length of the fifth lens group.

* * * * *